(12) United States Patent
Ogawa et al.

(10) Patent No.: US 9,672,411 B2
(45) Date of Patent: *Jun. 6, 2017

(54) INFORMATION PROCESSING APPARATUS AND METHOD, AND PROGRAM

(71) Applicant: Sony Corporation, Tokyo (JP)

(72) Inventors: Kaname Ogawa, Kanagawa (JP); Hiroshi Jinno, Kanagawa (JP); Makoto Yamada, Tokyo (JP); Keiji Kanota, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,113

(22) Filed: Mar. 9, 2015

(65) Prior Publication Data

US 2015/0178551 A1 Jun. 25, 2015

Related U.S. Application Data

(63) Continuation of application No. 11/825,117, filed on Jul. 3, 2007, now Pat. No. 9,014,537.

(30) Foreign Application Priority Data

Jul. 4, 2006 (JP) .............................. P2006-184686

(51) Int. Cl.
*H04N 9/80* (2006.01)
*G06K 9/00* (2006.01)
(Continued)

(52) U.S. Cl.
CPC ... *G06K 9/00241* (2013.01); *G06F 17/30793* (2013.01); *G06F 17/30817* (2013.01);
(Continued)

(58) Field of Classification Search
CPC ......... G06F 17/30793; G06F 17/30817; G06F 17/30852; G06K 9/00288; G06K 9/00241; G11B 27/28
(Continued)

(56) References Cited

U.S. PATENT DOCUMENTS 7,508,961 B2 3/2009 Chen et al.
7,668,401 B2 2/2010 Marugame
(Continued)

FOREIGN PATENT DOCUMENTS

JP 2001167110 A 6/2001
JP 3315888 B2 6/2002
(Continued)

OTHER PUBLICATIONS

Office Action from Japanese Application No. 2006-184686, dated Jul. 6, 2010.
(Continued)

*Primary Examiner* — Thai Tran
*Assistant Examiner* — Jose Mesa
(74) *Attorney, Agent, or Firm* — Lerner, David, Littenberg, Krumholz & Mentlik, LLP

(57) ABSTRACT

An information processing apparatus may generate resource information used for playing back image content that can be divided into a plurality of zones. The information processing apparatus may include an image generator generating a still image from each of the plurality of zones, a face processor setting each of the plurality of zones to be a target zone and determining whether a face of a specific character which is determined to continuously appear in at least one zone before the target zone is contained in the still image generated from the target zone, and an information generator specifying, on the basis of a determination result obtained for each of the plurality of zones by the face processor, at
(Continued)

least one zone in which the face of the specific character continuously appears as a face zone, and generating information concerning the face zone as one item of the resource information.

11 Claims, 41 Drawing Sheets

(51) Int. Cl.
  *G06F 17/30* (2006.01)
  *G11B 27/28* (2006.01)
(52) U.S. Cl.
  CPC ... *G06F 17/30852* (2013.01); *G06K 9/00288* (2013.01); *G11B 27/28* (2013.01)
(58) Field of Classification Search
  USPC ......................................................... 386/241
  See application file for complete search history.

(56) References Cited

U.S. PATENT DOCUMENTS

| 2002/0171648 | A1* | 11/2002 | Inoue ..................... G06T 15/04 345/474 |
| 2002/0175997 | A1 | 11/2002 | Takata et al. |
| 2004/0109587 | A1* | 6/2004 | Segawa ............. G06F 17/30265 382/115 |
| 2006/0025968 | A1 | 2/2006 | Sano |
| 2006/0035259 | A1 | 2/2006 | Yokouchi et al. |
| 2006/0093189 | A1* | 5/2006 | Kato .................. G06K 9/00335 382/107 |
| 2006/0168298 | A1 | 7/2006 | Aoki et al. |
| 2006/0192784 | A1 | 8/2006 | Yamaji et al. |
| 2006/0280445 | A1 | 12/2006 | Masaki et al. |
| 2007/0053660 | A1* | 3/2007 | Abe .................. G06K 9/00228 386/241 |
| 2009/0309897 | A1 | 12/2009 | Morita et al. |

FOREIGN PATENT DOCUMENTS

| JP | 2002342357 A | 11/2002 |
| JP | 2004173112 A | 6/2004 |
| JP | 2004-363775 A | 12/2004 |
| JP | 2005333381 A | 12/2005 |
| JP | 2006-133946 A | 5/2006 |
| JP | 2006178516 A | 7/2006 |
| JP | 2007280325 | 10/2007 |
| JP | 2008017042 A | 1/2008 |
| WO | 2006025272 | 3/2006 |

OTHER PUBLICATIONS

Office Action from Japanese Application No. 2008-318543, dated Oct. 12, 2010.
Office Action from Japanese Application No. 2008-318543, dated Nov. 10, 2011.

* cited by examiner

FIG. 5

| FACE-ZONE META INFORMATION |
|---|
| PLAYBACK INFORMATION |
| START TIME |
| PLAYBACK TIME |
| RECORDING POSITION |

FIG. 16
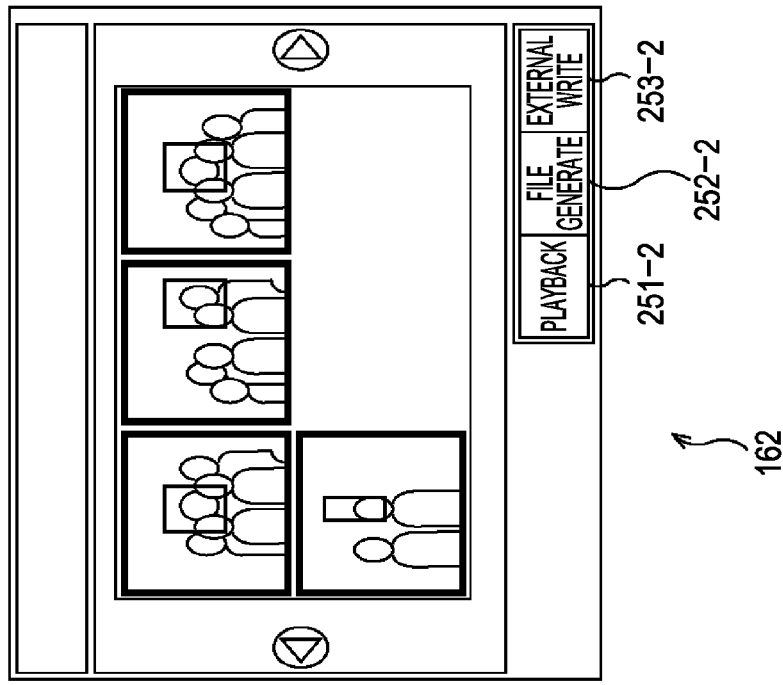
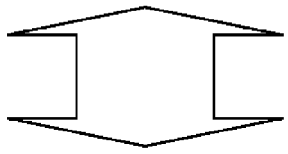
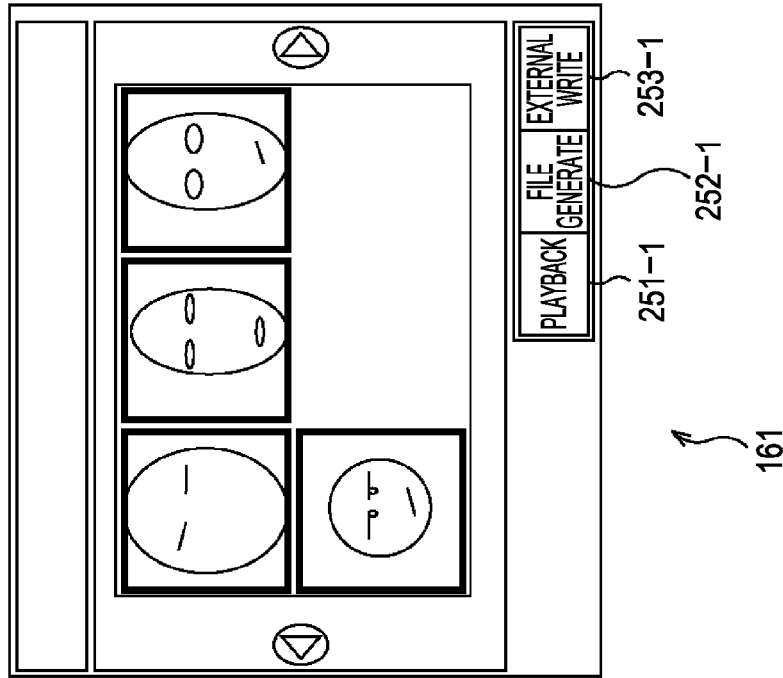

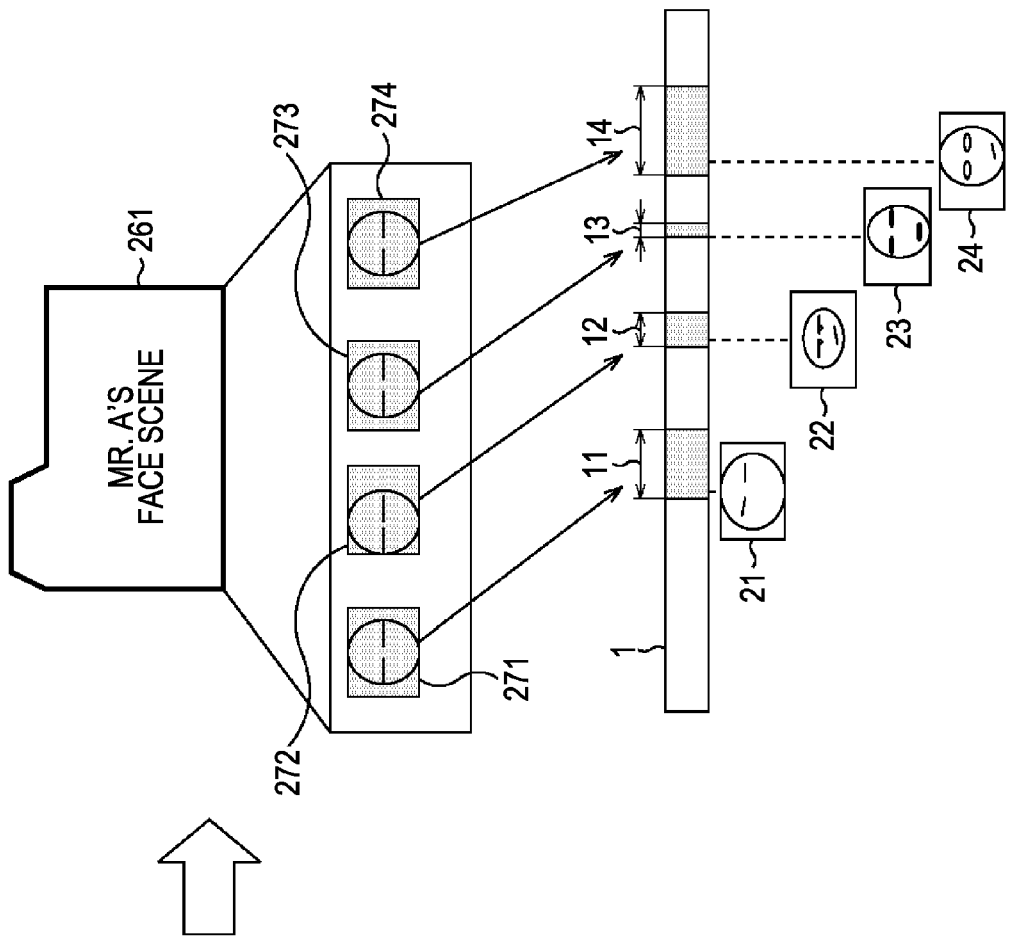
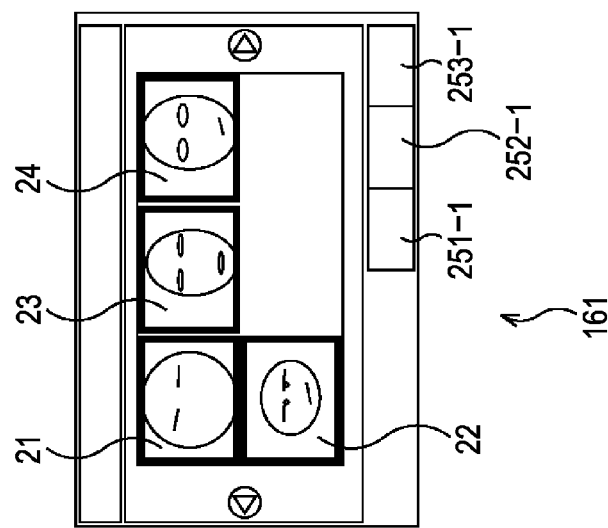
FIG. 19

FIG. 35

| CHARACTER NAME / TYPICAL FACE IMAGE<br>GOP NO. | A | B | C | D | E | F | G | H |
|---|---|---|---|---|---|---|---|---|
| 1 | NO FACE INFORMATION | FACE INFORMATION | NO FACE INFORMATION | FACE INFORMATION | NO FACE INFORMATION | NO FACE INFORMATION | FACE INFORMATION | FACE INFORMATION |
| 2 | FACE INFORMATION | FACE INFORMATION | FACE INFORMATION | FACE INFORMATION | NO FACE INFORMATION | FACE INFORMATION | FACE INFORMATION | FACE INFORMATION |
| 3 | FACE INFORMATION | FACE INFORMATION | FACE INFORMATION | FACE INFORMATION | NO FACE INFORMATION | NO FACE INFORMATION | FACE INFORMATION | FACE INFORMATION |
| 4 | NO FACE INFORMATION | NO FACE INFORMATION | FACE INFORMATION | FACE INFORMATION | NO FACE INFORMATION | NO FACE INFORMATION | FACE INFORMATION | FACE INFORMATION |
| 5 | FACE INFORMATION | NO FACE INFORMATION | FACE INFORMATION | | NO FACE INFORMATION | | | |
| ... | | | | | | | | |
| n-4 | NO FACE INFORMATION | NO FACE INFORMATION | FACE INFORMATION | NO FACE INFORMATION | FACE INFORMATION | NO FACE INFORMATION | FACE INFORMATION | FACE INFORMATION |
| n-3 | NO FACE INFORMATION | NO FACE INFORMATION | FACE INFORMATION | NO FACE INFORMATION | FACE INFORMATION | NO FACE INFORMATION | NO FACE INFORMATION | FACE INFORMATION |
| n-2 | NO FACE INFORMATION | NO FACE INFORMATION | FACE INFORMATION | NO FACE INFORMATION | FACE INFORMATION | NO FACE INFORMATION | FACE INFORMATION | FACE INFORMATION |
| n-1 | NO FACE INFORMATION | NO FACE INFORMATION | FACE INFORMATION | NO FACE INFORMATION | NO FACE INFORMATION | NO FACE INFORMATION | FACE INFORMATION | FACE INFORMATION |
| n | NO FACE INFORMATION | NO FACE INFORMATION | FACE INFORMATION | NO FACE INFORMATION | NO FACE INFORMATION | NO FACE INFORMATION | NO FACE INFORMATION | FACE INFORMATION |

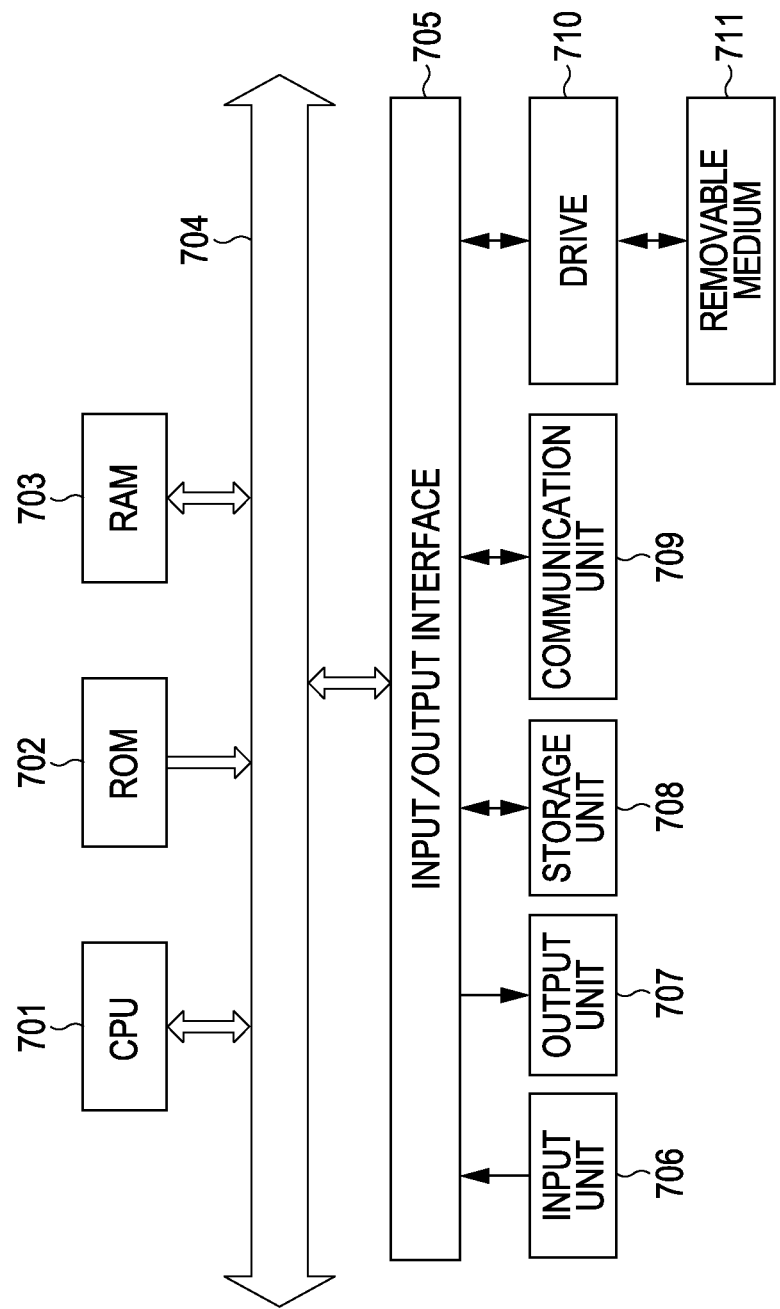

INFORMATION PROCESSING APPARATUS AND METHOD, AND PROGRAM

CROSS-REFERENCE TO RELATED APPLICATIONS

This application is a continuation of U.S. patent application Ser. No. 11/825,117, filed on Jul. 3, 2007, which claims priority from Japanese Patent Application No. JP 2006-184686 filed in the Japanese Patent Office on Jul. 4, 2006, the entire content of which is incorporated herein by reference.

BACKGROUND OF THE INVENTION

Field of the Invention

The present invention relates to information processing apparatuses and methods, and programs, and more particularly, to an information processing apparatus and method, and a program in which it is possible to provide information for presenting characters appearing in moving picture content and positions of the characters to users such that the users can easily understand and recognize them.

Description of the Related Art

In most cases, moving picture content includes various characters. Accordingly, the demand that users understand the type of content from characters or search for scenes of a specific character from among various characters and play them back is increasing.

For handling moving picture content including various characters, as discussed above, the following techniques, for example, disclosed in U.S. Pat. No. 3,315,888 and Japanese Unexamined Patent Application Publication No. 2004-363775 are known.

SUMMARY OF THE INVENTION

In the known techniques disclosed in those publications, however, it is difficult to respond to the above-described demand sufficiently. With a mere combination of known techniques disclosed in the above-described publications, it is difficult to present characters appearing in moving picture content and positions of the characters to users such that the users can easily understand and recognize them.

It is thus desirable to provide information for presenting characters appearing in moving picture content and positions of the characters to users such that the users can easily understand and recognize them.

According to an embodiment of the present invention, there is provided an information processing apparatus that may generate resource information used for playing back image content that can be divided into a plurality of zones. The information processing apparatus may include image generating means for generating a still image from each of the plurality of zones, face processing means for setting each of the plurality of zones to be a target zone and for determining whether a face of a specific character which is determined to continuously appear in at least one zone before the target zone is contained in the still image generated from the target zone by the image generating means, and information generating means for specifying, on the basis of a determination result obtained for each of the plurality of zones by the face processing means, at least one zone in which the face of the specific character continuously appears as a face zone, and for generating information concerning the face zone as one item of the resource information.

The information generating means may generate, as another item of the resource information, a face thumbnail image, which serves as an index of the face zone, on the basis of the face of the specific character contained in a predetermined one of at least one still image generated by the image generating means from each of at least one zone included in the face zone.

If at least one zone which is determined to contain the face of the specific character by the face processing means is continues, the information generating means may specify at least one continuous zone as the face zone.

If a third continuous zone including at least one zone which is determined not to contain the face of the specific character by the face processing means is present between a first continuous zone and a second continuous zone, each including at least one zone which is determined to contain the face of the specific character by the face processing means, and if a length of the third continuous zone is smaller than or equal to a threshold, the information generating means may specify the first continuous zone, the third continuous zone, and the second continuous zone as one face zone, and, if the length of the third continuous zone exceeds the threshold, the information generating means may specify the first continuous zone and the second continuous zone as different face zones.

The face processing means may attempt to detect a face of a specific character from the still image generated from the target zone, and if a face is detected, the face processing means may generate a face image by extracting an area containing the detected face from the still image generated from the target zone. Then, the face processing means may set the face image generated from the target zone to be a first comparison subject and may set the latest face image selected from among face images of the specific character generated from zones before the target zone to be a second comparison subject, and may compare the first comparison subject with the second comparison subject, and may determine on the basis of comparison results whether the specific character is contained in the still image generated from the target zone.

The face processing means may include a table representing information concerning the specific character and may list information concerning whether the specific character is contained in the still image generated from the target zone in the table. The information generating means may specify the face zone on the basis of the information of the table listed by the face processing means.

Information concerning each of at least one specific character may be listed in the table. If at least one face image is generated as a result of detecting at least one face from the still image generated from the target zone, the face processing means may set each of at least one face image generated from the still image generated from the target zone to be the first comparison subject and may set each of at least one face image of at least one specific character contained in the table to be the second comparison subject. The face processing means may perform matching processing on all combinations of at least one face image in the first comparison subject and at least one face image in the second comparison subject to calculate scores as a result of the matching processing, and may select at least one matching pair which is determined to be a combination of face images of an identical person from all the combinations. The face processing means may determine that, among at least one specific character contained in the table, a specific character of each of at least one matching pair corresponding to the second comparison subject is contained in the still image generated from the target zone, and may determine that other characters are not contained in the still image, and may list determination results in the table.

Concerning a combination which is not selected as a matching pair, the face processing means may add a character corresponding to a face image contained in the first comparison subject to the table as a new character.

The face processing means may exclude, among all the combinations, a combination whose score is smaller than or equal to a predetermined threshold from selection candidates of the matching pair.

If a zone in which a first comparison subject is generated and a zone in which a second comparison subject is generated are separated from each other by a predetermined interval or greater, the face processing means may exclude a combination including the first comparison subject and the second comparison subject from selection candidates of the matching pair.

According to another embodiment of the present invention, there is provided an information processing method for an information processing apparatus that may generate resource information used for playing back image content that can be divided into a plurality of zones. The information processing method may include setting each of the plurality of zones to be a target zone, generating a still image from the target zone, determining whether a face of a specific character which is determined to continuously appear in at least one zone before the target zone is contained in the still image generated from the target zone, and specifying, on the basis of a determination result obtained for each of the plurality of zones, at least one zone in which the face of the specific character continuously appears as a face zone and generating information concerning the face zone as one item of the resource information.

According to another embodiment of the present invention, there is provided a program corresponding to the above-described information processing method.

According to the information processing apparatus and method and program, resource information used for playing back image content that can be divided into a plurality of zones may be generated as follows. Each of the plurality of zones is set to be a target zone, and a still image is generated from the target zone. It is determined whether a face of a specific character which is determined to continuously appear in at least one zone before the target zone is contained in the still image generated from the target zone. On the basis of a determination result obtained for each of the plurality of zones, at least one zone in which the face of the specific character continuously appears is specified as a face zone and information concerning the face zone is generated as one item of the resource information.

According to an embodiment of the present invention, resource information can be provided as information for presenting characters appearing in moving picture content and positions of the characters to users. In particular, it is possible to provide resource information for presenting characters appearing in moving picture content and positions of the characters to users so that the users can easily understand and recognize them.

BRIEF DESCRIPTION OF THE DRAWINGS

FIG. 5 illustrates an example of the structure of face-zone-meta information included in a meta-file of the recording medium shown in FIG. 4;

FIG. 16 illustrates an example of images when a collective write/transfer technique is applied to the images shown in FIG. 12;

FIG. 19 illustrates a specific example of a processing result obtained by the collective write processing shown in FIG. 18;

FIG. 35 illustrates an example of a face image table to be generated/updated by face image table generating/updating processing of the resource data generating/recording processing shown in FIG. 31;

FIG. 44 is a block diagram illustrating an example of the configuration of a personal computer, which serves as an information processing apparatus according to an embodiment of the present invention is applied.

DETAILED DESCRIPTION

Before describing an embodiment of the present invention, the correspondence between the features of the claims and the embodiment disclosed in the present invention is discussed below. This description is intended to assure that the embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 2:
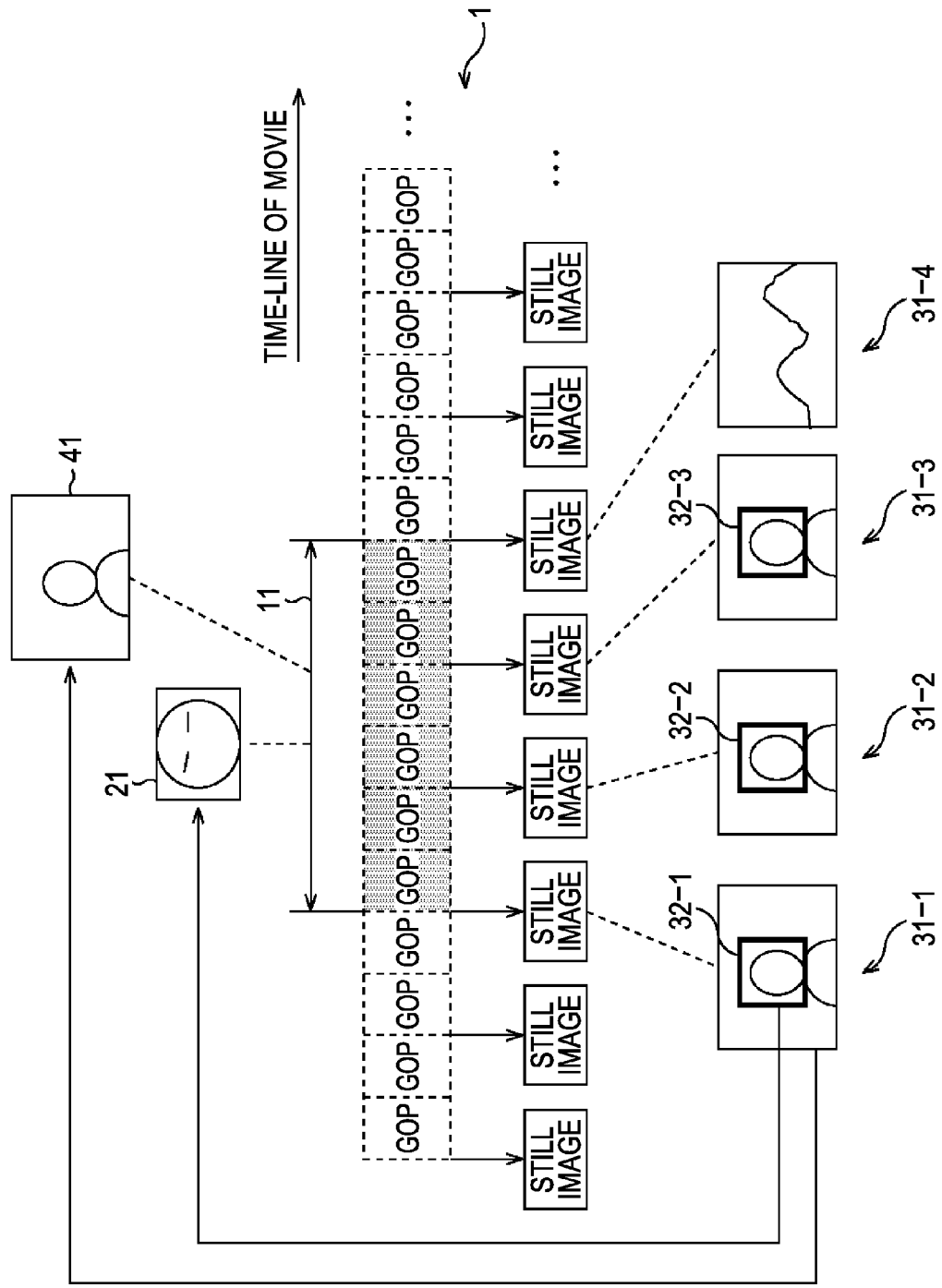
FIG. 2 illustrates an example of a technique for specifying face zones and an example of a technique for creating face thumbnail images.

An information processing apparatus (e.g., an image recording apparatus 401 shown in FIG. 28 including an image information detector 427 shown in FIG. 30) according to an embodiment of the present invention generates resource information (e.g., resource data 65-1 for playing back content 64-1 in FIG. 4, in particular, face-zone-meta information) used for playing back image content that can be divided into a plurality of zones (e.g., zones, each including an integral multiple of GOPs in FIG. 2). The information processing apparatus includes image generating means (e.g., a still image generator 431 shown in FIG. 30) for generating a still image (i.e., a still image 502 shown in FIG. 32) from each of the plurality of zones (e.g., GOPs shown in FIG. 32), face processing means (e.g., a face image processor 432 shown in FIG. 30 for generating a face image table shown in FIG. 35) for setting each of the plurality of zones to be a target zone and for determining whether a face of a specific character which is determined to continuously appear in at least one zone before the target zone is contained in the still image generated from the target zone by the image generating means, and information generating means (e.g., a thumbnail image generator 433 shown in FIG. 30) for specifying, on the basis of a determination result (e.g., results shown in FIG. 36 based on the face image table shown in FIG. 35) obtained for each of the plurality of zones (e.g., face zones 521-A through 521-E shown in FIG. 37) by the face processing means, at least one zone in which the face of the specific character continuously appears as a face zone, and for generating information concerning the face zone as one item of the resource information.

The information generating means may generate, as another item of the resource information, a face thumbnail image (e.g., face thumbnail images 522-A through 522-E shown in FIG. 37), which serves as an index of the face zone, on the basis of the face (e.g., faces 502-1 and 502-2 shown in FIG. 33, i.e., face images 511-1 and 511-2 corresponding to the faces 502-1 and 502-2, respectively, shown in FIG. 34) of the specific character contained in a predetermined one of at least one still image generated by the image generating means from each of at least one zone included in the face zone.

Figure 36:
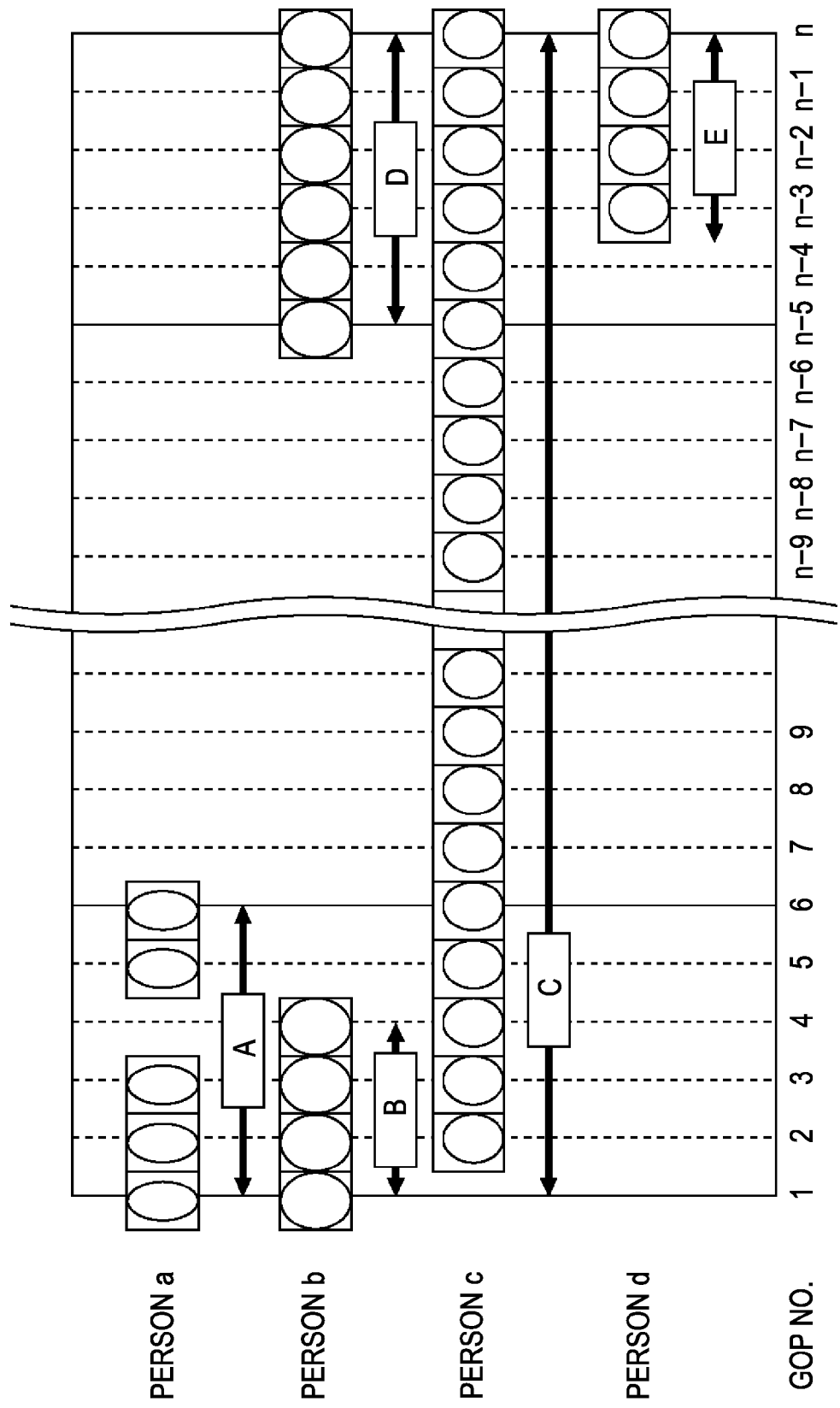
FIGS. 36 and 37 illustrate specific examples of processing results of the resource data generating/recording processing shown in FIG. 31.
Figure 37:
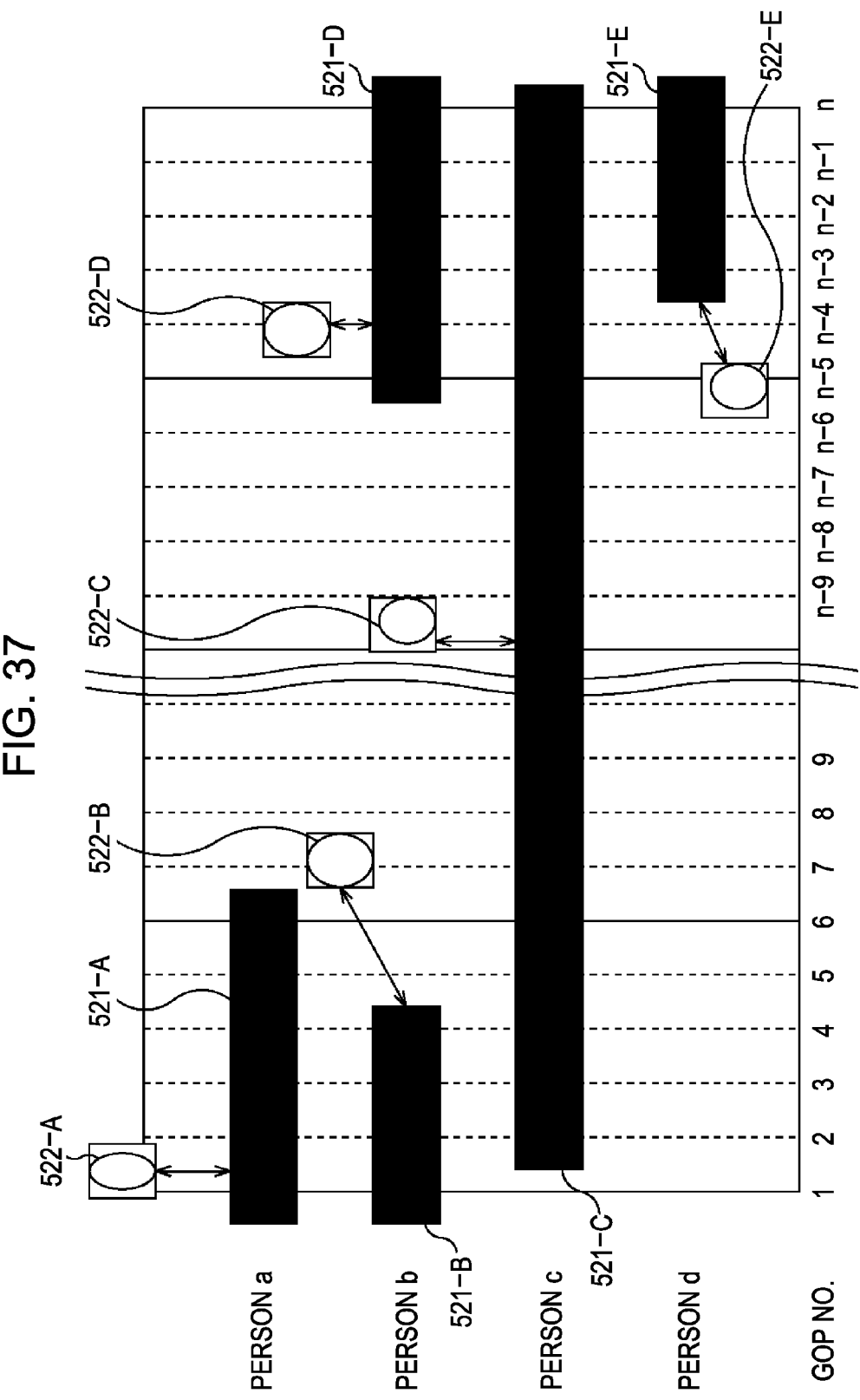

If at least one zone which is determined to contain the face of the specific character by the face processing means is continues (e.g., in the example shown in FIGS. 35 and 36, concerning character C, "face information" in FIG. 35, i.e., "rectangles with oval shapes therein" shown in FIG. 36 are continuous in a range from GOP number 2 to GOP number n), the information generating means may specify at least one continuous zone as the face zone (e.g., as a face zone 521-C shown in FIG. 37).

If a third continuous zone including at least one zone which is determined not to contain the face of the specific character by the face processing means is present between a first continuous zone and a second continuous zone, each including at least one zone which is determined to contain the face of the specific character by the face processing means, and if a length of the third continuous zone is smaller than or equal to a threshold (e.g., concerning person a in FIG. 36, if GOPs from GOP number 1 to GOP number 3 are set to be the first period, and if only one GOP, i.e., GOP number 4, is set to be the third period, and if GOPs from GOP number 5 to GOP number 6 are set to be the second period), the information generating means may specify the first continuous zone, the third continuous zone, and the second continuous zone as one face zone (e.g., as a face zone 521-A concerning character A, as shown in FIG. 37), and, if the length of the third continuous zone exceeds the threshold (e.g., concerning person b in FIG. 36, if GOPs from GOP number 1 to GOP number 4 are set to be the first period, and if GOPs from GOP number 5 to GOP number n−6 is set to be the third period, and if GOPs from GOP number n−5 to GOP number n are set to be the second period), the information generating means may specify the first continuous zone and the second continuous zone as different face zones (e.g., as a face zone 521-B concerning character B and a face zone 521-D concerning character D).

Figure 31:
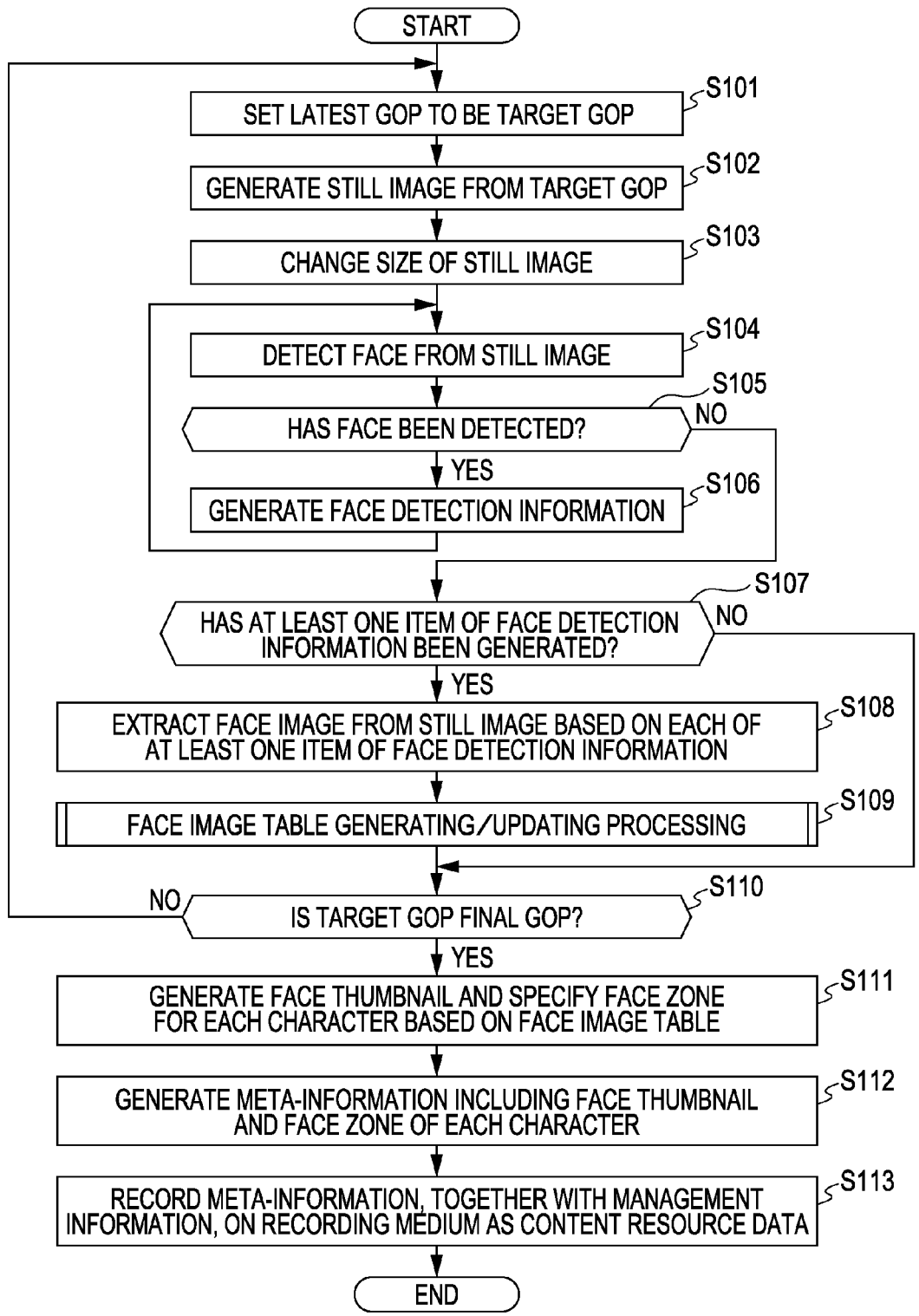
FIG. 31 is a flowchart illustrating an example of resource data generating/recording processing executed by the image information detector shown in FIG. 30.

The face processing means may attempt to detect a face of a specific character from the still image generated from the target zone (e.g., executing step S104 in FIG. 31), and if a face is detected (e.g., if step S106 shown in FIG. 31 is executed and if a determination result in step S107 is YES), the face processing means may generate a face image by extracting an area containing the detected face from the still image generated from the target zone (e.g., executing step S108 in FIG. 31). Then, the face processing means may set the face image generated from the target zone to be a first comparison subject and may set the latest face image selected from among face images of the specific character generated from zones before the target zone to be a second comparison subject, and may compare the first comparison subject with the second comparison subject, and may determine on the basis of comparison results whether the specific character is contained in the still image generated from the target zone (e.g., executing step S109 in FIG. 31, i.e., face image table generating/updating processing in FIG. 42).

The face processing means may include a table representing information concerning the specific character (e.g., a face image table including specific characters A through H shown in FIG. 35) and may list information concerning whether the specific character is contained in the still image generated from the target zone in the table (e.g., in the example shown in FIG. 35, "face information" is listed when a specific character is contained and "no face information" is listed when a specific character is not contained). The information generating means may specify the face zone on the basis of the information of the table listed by the face processing means.

Information concerning each of at least one specific character (e.g., in the example shown in FIG. 35, information concerning eight characters A through H) may be listed in the table. If at least one face image (e.g., faces 602-1 through 602-3 in FIG. 38) is generated as a result of detecting at least one face (e.g., face images 612-1 through 612-3 in FIG. 38) from the still image generated from the target zone (e.g., in the example in FIG. 38, a still image 602 for the GOP number i), the face processing means may set each of at least one face image generated from the still image generated from the target zone to be the first comparison subject (e.g., in the example in FIG. 40, face images 612-1 and 612-2) and may set each of at least one face image of at least one specific character contained in the table to be the second comparison subject (e.g., in the example in FIG. 40, a face image 611-1 of character A, a face image 611-2 of character B, and a face image 609-3 of character C). The face processing means may perform matching processing on all combinations of at least one face image in the first comparison subject and at least one face image in the second comparison subject to calculate scores as a result of the matching processing, and may select at least one matching pair (e.g., in the example in FIG. 40, a matching pair of face images 611-1 and 612-1 and a matching pair of face images 611-2 and 612-2) which is determined to be a combination of face images of an identical person from all the combinations. The face processing means may determine that, among at least one specific character contained in the table, a specific character of each of at least one matching pair corresponding to the second comparison subject (e.g., in the example in FIG. 40, character A corresponding to the face image 611-1 and character B corresponding to the face image 610-2) is contained in the still image generated from the target zone, and may determine that other characters (e.g., in the example in FIG. 40, character C) are not contained in the still image, and may list determination results in the table.

Figure 41:
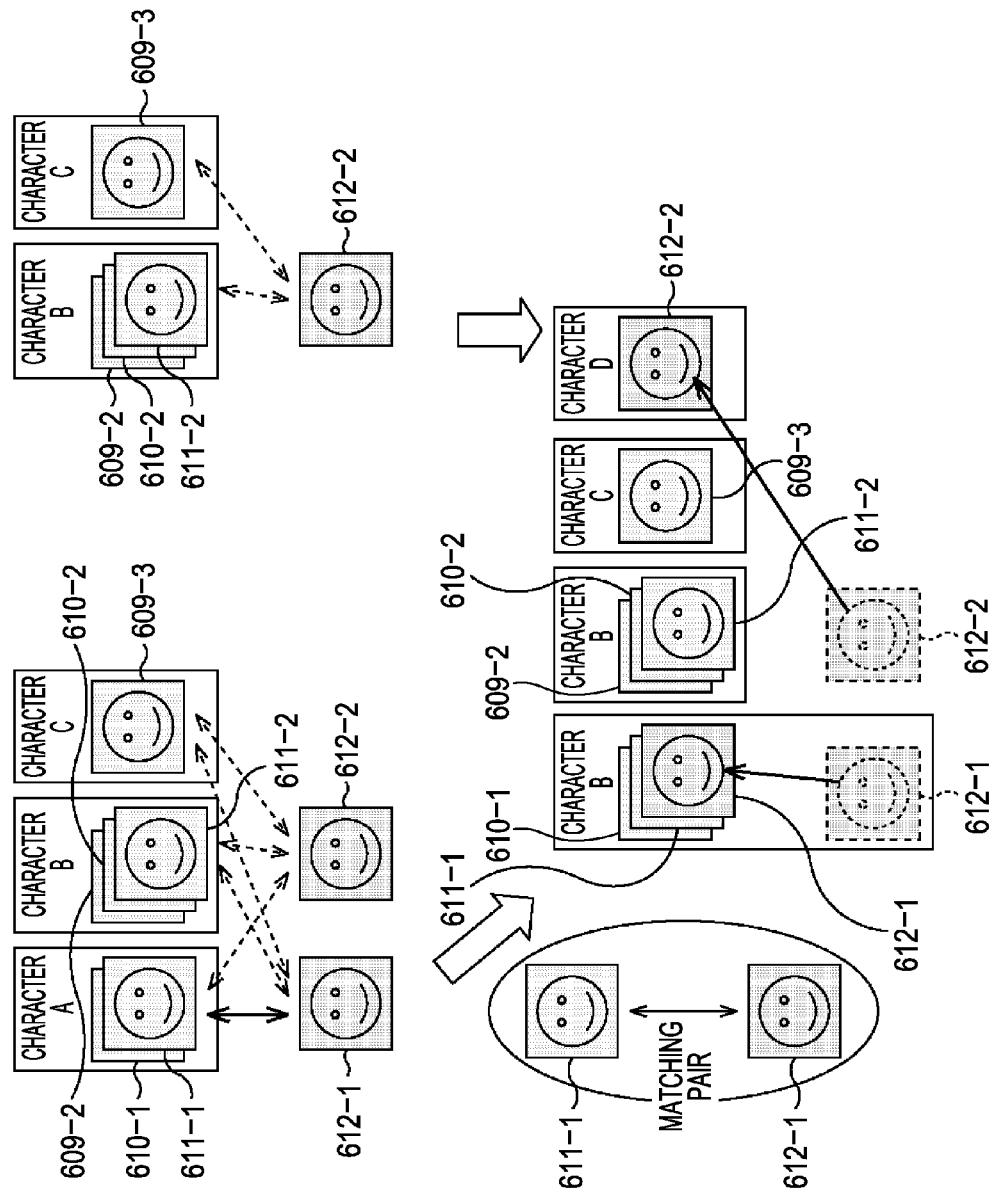

Concerning a combination which is not selected as a matching pair, the face processing means may add a character corresponding to a face image contained in the first comparison subject to the table as a new character (e.g., in the example in FIG. 41, the character having the face image 612-2 of the first comparison subject, which is not selected as a matching pair, is set to be a new character D).

Figure 40:
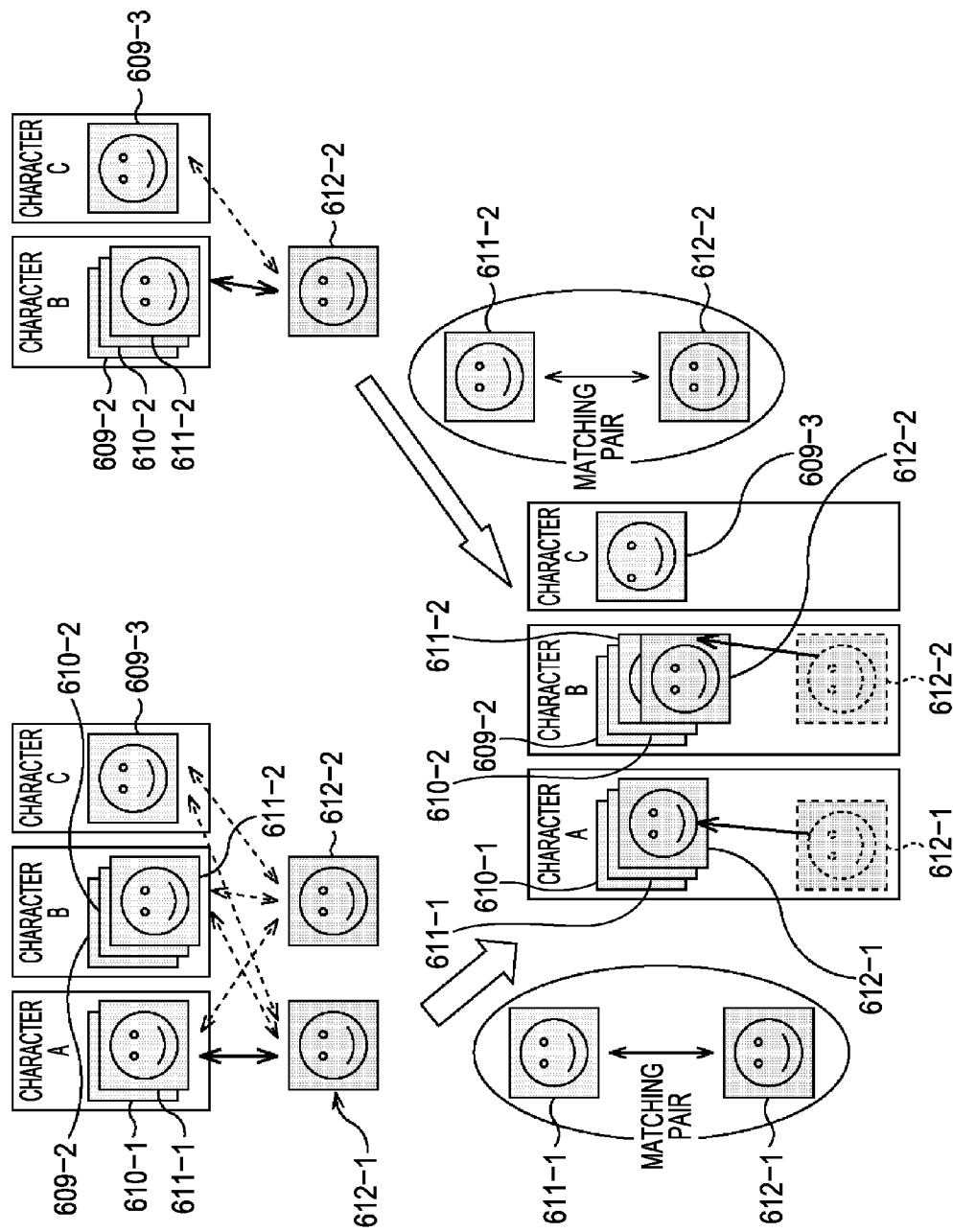

The face processing means may exclude, among all the combinations, a combination whose score is smaller than or equal to a predetermined threshold from selection candidates of the matching pair (e.g., in the example in FIGS. 40 and 41, the combination of the face images 611-2 and 612-2 having the highest score, which exceeds the predetermined threshold, is selected as a matching pair in the example in FIG. 40, but the same combination having the highest score, which does not exceed the predetermined threshold, is excluded from selection candidates for a matching pair in the example in FIG. 41, and as a result, the character of the face image 612-2 included in the combination is set to be the new character D).

If a zone in which a first comparison subject is generated and a zone in which a second comparison subject is generated are separated from each other by a predetermined interval or greater (e.g., in the example in FIG. 36, a combination of a face image of GOP number n−5 and a face image of GOP number 4), the face processing means may exclude a combination including the first comparison subject and the second comparison subject from selection candidates of the matching pair.

According to another embodiment of the present invention, there is provided an information processing method (e.g., a method implemented by the resource data generating/recording processing shown in FIG. 31) for an information processing apparatus (e.g., the image recording apparatus 401 shown in FIG. 28) that generates resource information used for playing back image content that can be divided into a plurality of zones. The information processing method includes the steps of setting each of the plurality of zones to be a target zone (e.g., step S101 in FIG. 31), generating a still image from the target zone (e.g., step S102 in FIG. 31), determining whether a face of a specific character which is determined to continuously appear in at least one zone before the target zone is contained in the still image generated from the target zone (e.g., steps S104 through S109 in FIG. 30, in particular, step S109, i.e., the face image table generating/updating processing in FIG. 42), and specifying, on the basis of a determination result obtained for each of the plurality of zones, at least one zone in which the face of the specific character continuously appears as a face zone and generating information concerning the face zone as one item of the resource information (e.g., step S111 in FIG. 31).

According to another embodiment of the present invention, there is provided a program corresponding to the above-described information processing method, and is executed by a personal computer shown in FIG. 44.

Figure 1:
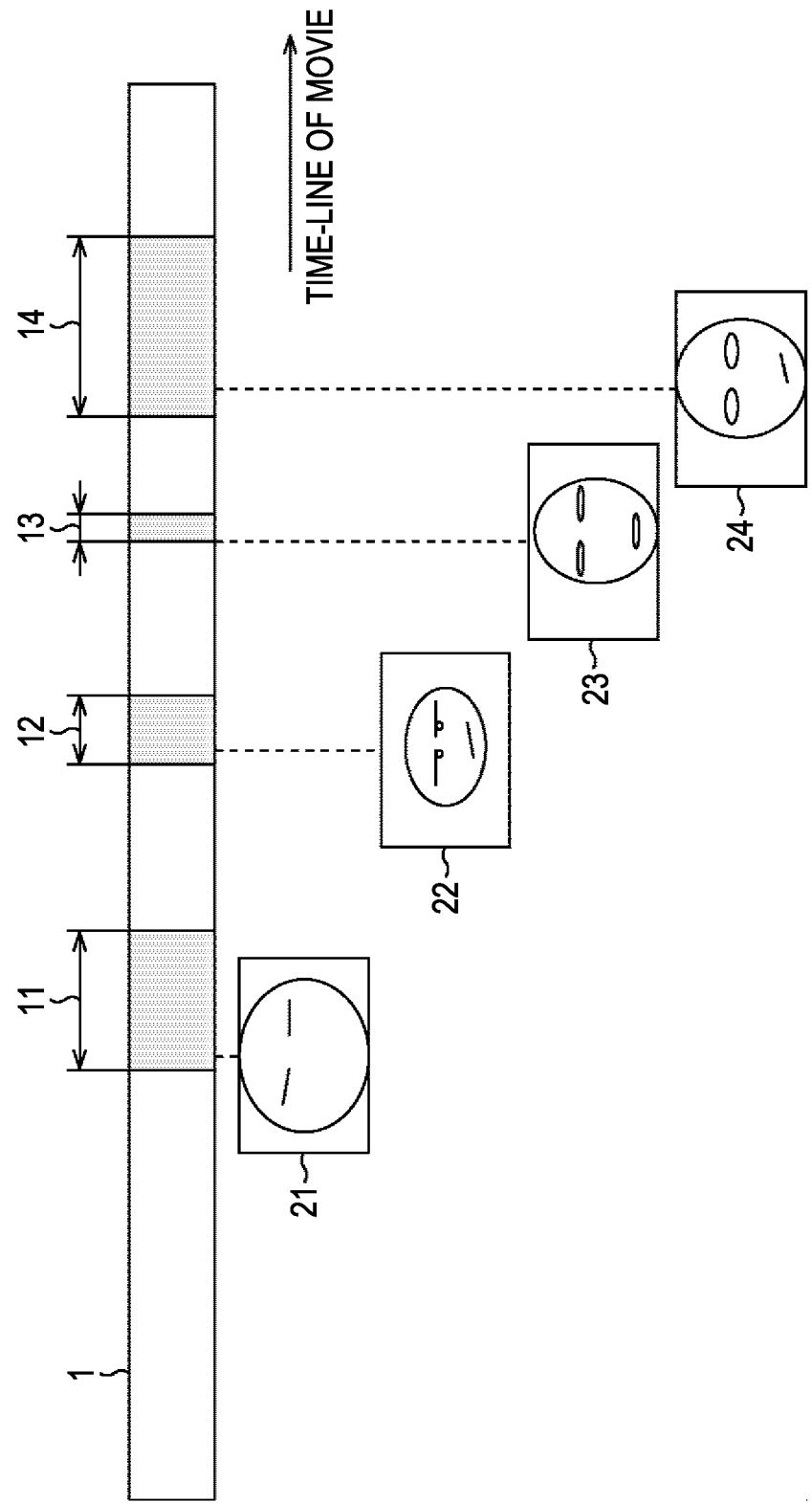
FIG. 1 illustrates an example of a playback instruction operation for playing back moving picture content that can be implemented by an embodiment of the present invention.

For easy understanding of the present invention, reference is first given to FIG. 1 to discuss an overview of an operation for giving an instruction to play back moving picture content that can be implemented by an embodiment of the present invention.

Content includes products created from humans' creative activity, and among the content pieces, content at least including images is referred to as "image content". The image content can be largely divided into moving picture content mainly including moving pictures and still image content mainly including still images. In this specification, so-called "content data", namely, products created from humans' creative activity and then converted into a form that can be processed by a machine, such as electric signals or data recorded on recording media, are also referred to as "content".

In the following description, content is recorded on a recording medium on a file-by-file basis, and the number of content pieces is also indicated by the number of files. That is, one piece of content is content that can be recorded on a recording medium as a single file.

The following playback instruction operation for giving an instruction to play back a desired piece of content from among a plurality of moving picture content pieces is known. A list of thumbnail images, which serves as an index of a plurality of moving picture content pieces, is presented to a user. The user then selects the thumbnail image corresponding to a desired piece of moving picture content from the list.

In this embodiment of the present invention, in addition to the above-described playback instruction operation, the playback instruction operation shown in FIG. 1, for example, can be performed.

In the example shown in FIG. 1, moving picture content 1 to be played back includes a zone 11 in which a specific character continuously appears, and the image of the face of this specific character is associated with the zone 11 as a thumbnail image 21.

As in the zone 11, a zone in which a specific character continuously appears in moving pictures is hereinafter referred to as a "face zone". If the image of a face is represented by a thumbnail image, as in the thumbnail image 21, the thumbnail image is referred to as a "face thumbnail image".

In addition to the face zone 11, the moving picture content 1 includes face zones 12 through 14, and face thumbnail images 22 through 24 are associated with the face zones 12 through 14, respectively.

In the above-configured moving picture content 1, the following playback instruction operation can be implemented. A list of the face thumbnail images 21 through 24 is presented to the user as a list of the indexes of the face zones 11 through 14 of the moving picture content 1. The user then selects the face thumbnail image corresponding to a desired face zone from the list. Details of this playback instruction operation and processing performed by an apparatus in response to this instruction operation are discussed below with reference to FIGS. 4 through 26.

In other words, in order to present characters and positions thereof appearing in moving picture content to a user such that the user can easily understand and recognize them, a face zone is introduced as one of the measures to indicate the position at which the character appears, and a face thumbnail image including the face of the character appearing in the face zone is introduced as the index of the face zone. Accordingly, the use of face thumbnail images and face zones makes it possible to respond to the above-described demand that the user wishes to understand the type of content from characters or to search for scenes of a specific character from among various characters and to play them back.

An overview of a technique for specifying face zones and a technique for generating face thumbnail images are discussed below with reference to FIGS. 2 and 3. In the following description, the entity that performs processing is simply referred to as an "apparatus".

In the example shown in FIG. 2, the moving picture content 1 is formed as a Moving Picture Experts Group (MPEG) data. That is, the moving picture content 1 includes a plurality of group of pictures (GOPs).

In this case, the apparatus divides the moving picture content 1 into predetermined base units, and generates one still image from each base unit. The base unit for dividing the moving picture content 1 is not particularly restricted. In another example discussed below, one GOP is used as the base unit (hereinafter referred to as the "1GOP unit", and the base unit including k GOPs is referred to as the "kGOP unit"). In this example, two GOPs are used as the base unit, i.e., one still image is generated from the 2GOP unit.

The approach to generating still images is not particularly restricted, and, in the example shown in FIG. 2, a still image is generated from the first GOP of the 2GOP unit. The technique for generating a still image from the first GOP is not particularly restricted, either, and the technique shown in FIG. 3, for example, can be employed.

Figure 3:
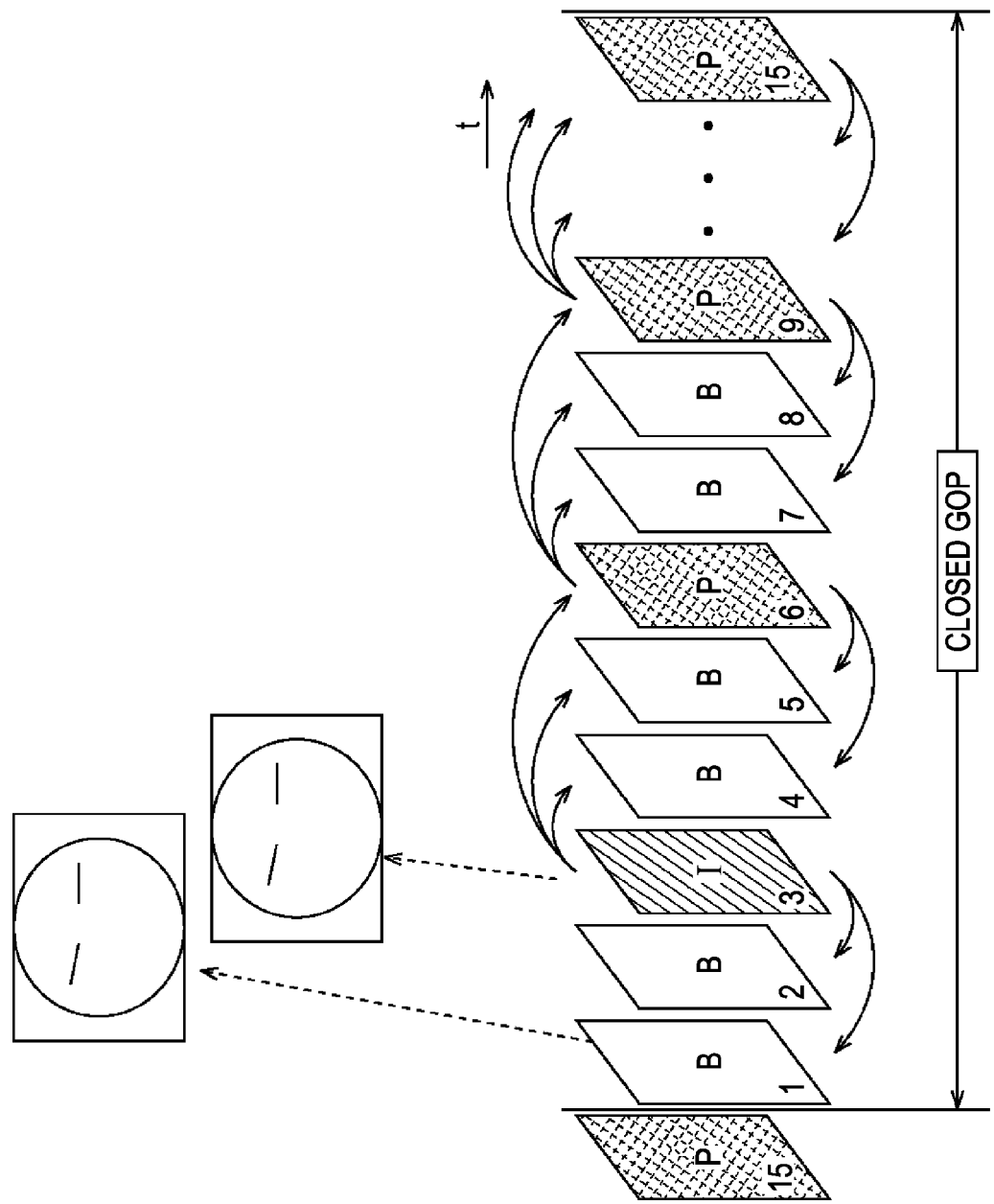
FIG. 3 illustrates an example of a technique for generating still images necessary for specifying face zones and creating face thumbnail images.

In FIG. 3, the quadrilaterals indicated by B represent bidirectionally predictive-coded pictures (B-pictures). The quadrilaterals indicated by I represent intra-coded pictures (I-pictures). The quadrilaterals indicated by P represent predictive-coded pictures (P-pictures). The number shown at the bottom left of each picture indicates the number of the picture to be disposed from the head in the order of the associated GOP. In the example shown in FIG. 3, one GOP is formed of 15 pictures.

In this case, for example, a still image is generated from a B-picture. More specifically, the apparatus reads the I-picture as a reference picture and then generates a still image from the B-picture on the basis of the reference I-picture. In the example shown in FIG. 3, a still image is generated from the first B-picture with reference to the third I-picture.

Alternatively, the apparatus may sequentially read the pictures from the head of the GOP, and when reading the I-picture for the first time, it can generate a still image from the read I-picture. In the example shown in FIG. 3, a still image is generated from the third I-picture.

Referring back to FIG. 2, after the apparatus generates a still image from the 2GOP unit, it attempts to detect a face from the still image.

It is now assumed that the third 2GOP unit from the left in FIG. 2 is the target unit and that a still image 31-1 is generated from the target unit. In the example shown in FIG. 2, an oval shape represents a face. In this case, since the still image 31-1 includes a face, an area containing the face is detected. The apparatus then extracts an image 32-1 including the detected face area (such an image is hereinafter referred to as a "face image") from the still image 31-1.

In this case, if no face is detected from the 2GOP unit immediately before the target unit, i.e., the second 2GOP unit in the example shown in FIG. 2, the apparatus determines the head position of the target unit, i.e., the head position of the third 2GOP unit in FIG. 2, as the start position of the face zone 11.

If, for example, the base unit for generating a still image is the 2GOP unit or a greater number of GOPs, there is a possibility that the faces of the same character be contained in the second and subsequent GOPs of the previous unit. Thus, instead of determining the head position of the third 2GOP unit as the start position of the face zone 11, the apparatus determines the head position of the third 2GOP unit merely as a candidate of the start position. The apparatus then makes a further determination as to whether to contain the face of the same character in several GOPs before the candidate. If no GOP that contains the face of the same character is found, the apparatus sets the candidate of the start position as the start position of the face zone 11. If a GOP that contains the face of the same character is found, the apparatus sets the head position of the first GOP that contains the face of the same character as the start position of the face zone 11.

After setting the start position of the face zone 11, the apparatus sequentially sets every 2GOP unit as the target unit, generates a still image from each target unit, and then extracts a face image from the still image. This procedure is repeatedly performed.

In the example in FIG. 2, if the fourth 2GOP unit is the target unit, a still image 31-2 is generated and a face image 32-2 is extracted from the still image 31-2. In this case, the apparatus compares the face image 32-2 with the previous face image 32-1, and if the two face images indicate the face of the same character, the apparatus determines that the 2GOP unit from which the face image 32-2 is extracted, i.e., the fourth 2GOP unit, is also contained within the face zone 11.

Similarly, the apparatus sets the fifth 2GOP unit as the target unit, and generates a still image 31-3 and extracts a face image 32-3 from the still image 31-3. Then, the apparatus compares the face image 32-3 with the previous face image 32-2, and if the two face images indicate the face of the same character, the apparatus determines that the 2GOP unit from which the face image 32-3 is extracted, i.e., the fifth 2GOP unit, is also contained within the face zone 11.

The apparatus then sets the sixth 2GOP unit as the target unit, and generates a still image 31-4 and attempts to detect a face in the still image 31-4. However, since no face is contained in the still image 31-4, no face is detected. Accordingly, the apparatus sets the head position of the 2GOP unit from which no face is detected, i.e., the head position of the sixth 2GOP unit, namely, the end position of the fifth 2GOP unit, as a candidate of the end position of the face zone 11.

The reason for setting the head position of the sixth 2GOP unit merely as a candidate is as follows. To humans, the time corresponding to the 2GOP unit is a short period of time, and even if no face is detected for such a short period of time, the user can feel as if a face zone were still continuing if the face of the same character is detected once again after the short period of time. That is, even after determining a candidate for the end position of the face zone 11, the apparatus continues detecting faces for subsequent several 2GOP units, and if the period during which no faces are detected continues for a certain period of time, the apparatus sets the candidate as the end position of the face zone 11.

After specifying the face zone 11, the apparatus generates the face thumbnail image 21 as the index of the face zone 11 and associates the face thumbnail image 21 with the face zone 11. The face thumbnail image 21 of the face zone 11 is not particularly restricted as long as the user can recognize the same face as that of the faces detected from the still images 32-1 through 32-3. Accordingly, after determining the face zone 11, the apparatus may generate a new face image from the face zone 11 and uses the generated image as the face thumbnail image 21. Alternatively, the apparatus may set one of the face images used while specifying the face zone 11 as the face thumbnail image 21. In the example shown in FIG. 2, the second approach is adopted, and, among the face images 32-1 through 32-3, the first face image 32-1 is adopted as the face thumbnail image 21.

For the user's convenience, the apparatus may generate, not only the face thumbnail image 21, but also a thumbnail image 41 as the index of the face zone 11, from the entire still image including the face of the face thumbnail image 21. In the example shown in FIG. 2, since the face image 32-1 is used as the face thumbnail image 21, the entirety of the still image 31-1 from which the face image 32-1 is extracted is used as the thumbnail image 41.

That is, as the indexes of the face zones 11 through of the moving picture content 1, not only the face thumbnail images 21 through 24, respectively, thumbnail images may be generated from the associated entire still images, though they are not shown in FIG. 1. In this case, the following playback instruction operation can be implemented. A list of such thumbnail images is presented to the user, and the user selects a thumbnail image corresponding to a desired face zone. Details of the playback instruction operation and corresponding processing performed by the apparatus are discussed below with reference to FIGS. 4 through 26.

An overview of a technique for specifying face zones and a technique for generating face thumbnail images have been described with reference to FIGS. 2 and 3. Details of the individual techniques are further discussed below with reference to FIG. 31.

Figure 4:
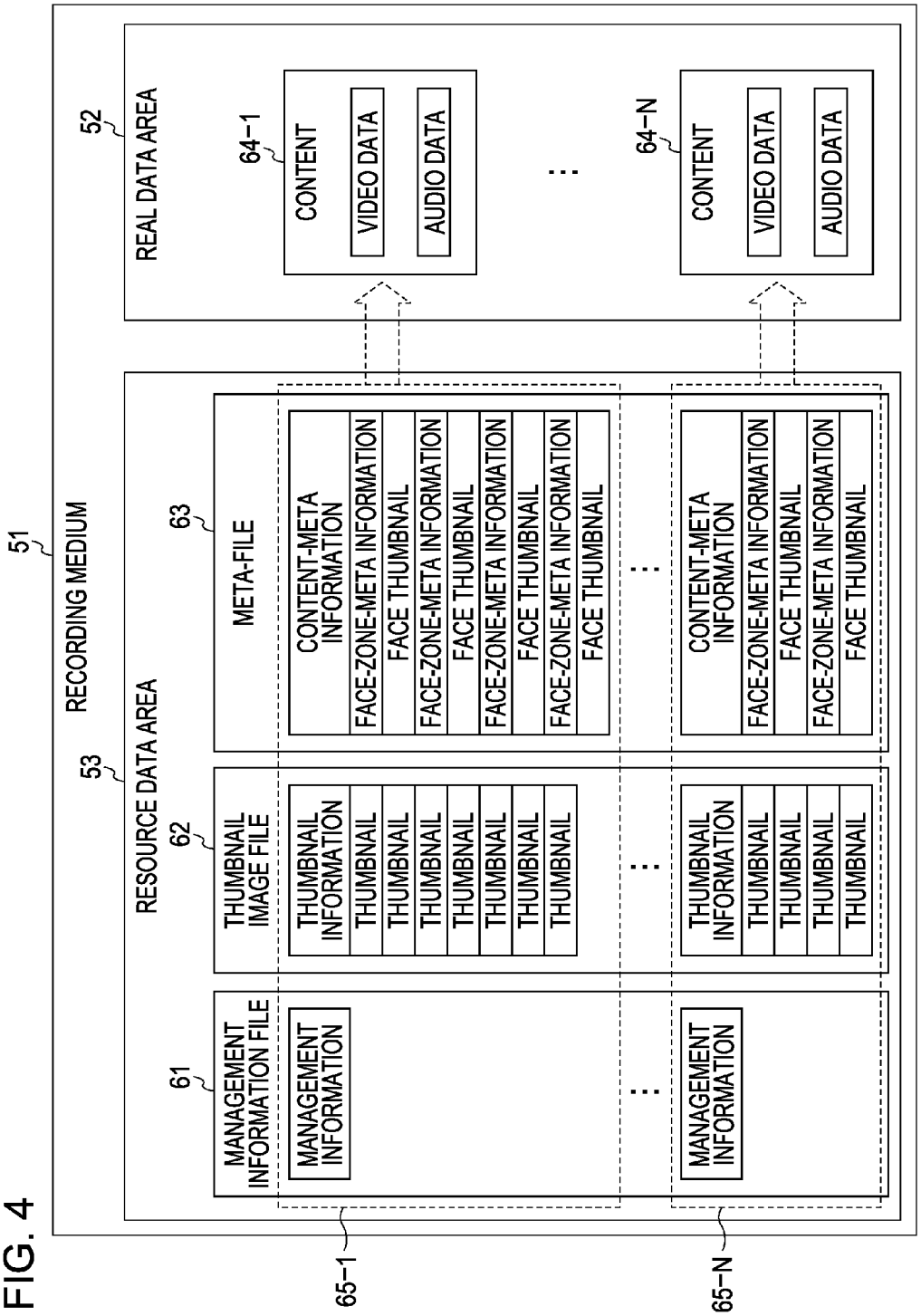
FIG. 4 illustrates an example of the structure of a recording medium to which an embodiment of the present invention is applied.

When recording content on a recording medium so that a face zone can be played back by specifying a face thumbnail image, the recording medium having a structure, such as that shown in FIG. 4, can be used.

On a recording medium 51 shown in FIG. 4, a real data area 52 and a resource data area 53 are formed.

In the real data area 52, N (N is an integer of 0 or greater) pieces of content 64-1 through 64-N are recorded. In the example shown in FIG. 4, one piece of content 64-K (K is one of the values from 1 to N) includes video data and audio data. That is, the content 64-K is equal to one file including video data and audio data.

For one piece of content 64-K, resource data 65-K necessary for playing back the content 64-K is recorded in the resource data area 53.

The resource data 65-K includes information and data concerning the content 64-K, such as management information, thumbnail information and individual thumbnails, content-meta information, face-zone-meta information, and face thumbnails.

The management information includes a set of various items of information for managing the entirety of the content 64-K.

The thumbnail is an image, such as the thumbnail image 41 shown in FIG. 2, as an index of a predetermined playback period of the content 64-K. Such an image is recorded in the resource data area 53 as image data having a predetermined format.

The thumbnail information includes a set of various items of information concerning the above-described individual thumbnails.

The content-meta information is meta-information concerning the content 64-K, and includes, for example, basic information necessary for playing back the content 64-K, except for the subsequent face-zone-meta information.

The face-zone-meta information includes a set of various items of information necessary for playing back face zones, such as the face zones 11 through 14 shown in FIG. 1. In this embodiment, the face-zone-meta information includes, as shown in FIG. 5, playback information, start time, playback time, and recording position. The playback information is so-called "codec information" concerning the content 64-K. The start time is information concerning the start position of a face zone in terms of, for example, the playback time or the GOP number of the GOP associated with the start position of the face zone. The playback time is information concerning the length of a face zone in terms of, for example, the playback duration or the number of GOPs. The recording position is information for specifying the position in the real data area 52 at which a face zone is recorded, for example, information indicating a sector if the recording medium 51 is an optical disc.

Referring back to FIG. 4, the face thumbnail is an image used as the index of a face zone, such as the face thumbnail images 21 through 24 shown in FIG. 1. Such thumbnail images are recorded in the resource data area 53 as image data having a predetermined format. The face thumbnail is recorded in association with the face-zone-meta information of the associated face zone.

In the example shown in FIG. 4, the resource data 65-K associated with the content 64-K is not recorded as a single file, but is recorded by being divided into a management information file 61, and a thumbnail image file 62, a meta-file 63.

In other words, the management information concerning the content 64-1 through the management information concerning the content 64-N are collectively included in the management file 61. The thumbnail information and the corresponding thumbnails of the content 64-1 through the content 64-N are collectively included in the thumbnail image file 62. The content-meta information, the face-zone-meta information, and the face thumbnails of the content 64-1 through the content 64-N are collectively included in the meta-file 63.

That is, a plurality of pairs of face-zone-meta information and associated face thumbnails are included in the meta-file 63 as one piece of meta-information concerning the content 64-K. More specifically, if the content 64-K is the moving picture content 1 shown in FIG. 1, a pair of the face-zone-meta information concerning the face zone 11 and the face thumbnail image 21, a pair of the face-zone-meta information concerning the face zone 12 and the face thumbnail image 22, a pair of the face-zone-meta information concerning the face zone 13 and the face thumbnail image 23, and a pair of the face-zone-meta information concerning the face zone 14 and the face thumbnail image 24, and a set of content-meta information of the content 1 are included in the meta-file 63.

The use of resource data, such as the resource data 65-K, implements high-speed display of a list of the faces of a character and positions thereof without the need for conducting re-search. Additionally, in response to a search request for information concerning content from an external source, it is sufficient that resource data is sent. As a result, the responsiveness can be improved.

The use of resource data also makes it possible to extract a portion in which a specific character is recorded and to generate new moving picture data, or to play back or backup moving picture data in which only a specific character is recorded. Accordingly, resource data can be used for extracting data when automatic editing, automatic playback, or automatic backup is performed.

Figure 6:
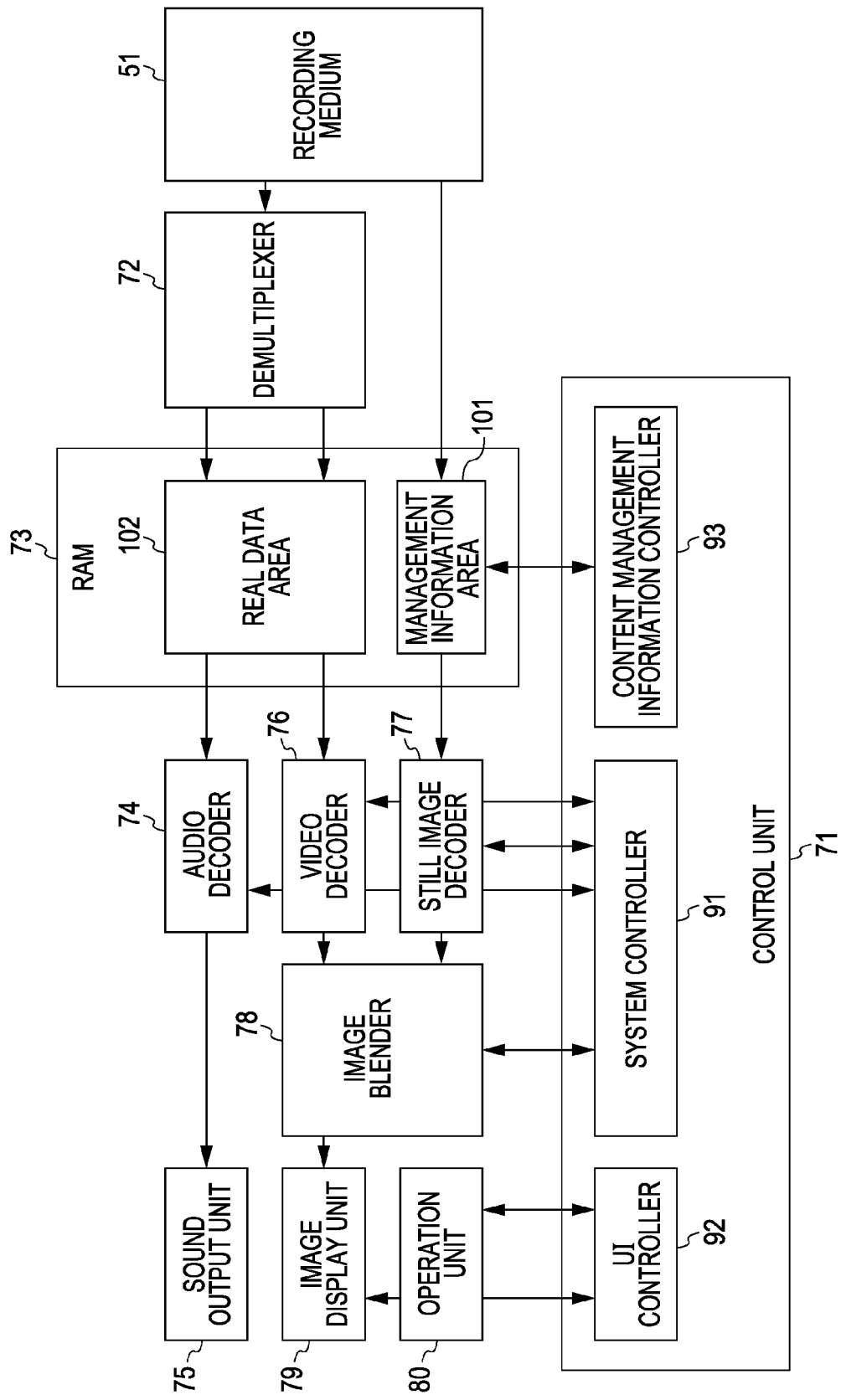
FIG. 6 illustrates an example of the functional configuration of a playback apparatus, which serves as an information processing apparatus according to an embodiment of the present invention.

FIG. 6 is a block diagram illustrating the functional configuration of a playback apparatus for playing back the content 64-K recorded on the recording medium 51 having the structure shown in FIG. 4. The playback apparatus shown in FIG. 6 serves as an information processing apparatus according to an embodiment of the present invention.

By using the playback apparatus shown in FIG. 6, the user can perform the playback instruction operation discussed with reference to FIG. 1, i.e., an operation for giving an instruction to play back a face zone, by specifying a face thumbnail image. In other words, the playback apparatus shown in FIG. 6 can execute processing corresponding to the above-described playback instruction operation and can also execute processing for extracting a face zone, which is instructed by the playback instruction operation, from the content 64-K recorded on the recording medium 51 and for playing back the extracted face zone.

To implement the above-described processing, the playback apparatus shown in FIG. 6 includes a control unit 71, a demultiplexer 72, a random access memory (RAM) 73, an audio decoder 74, a sound output unit 75, a video decoder 76, a still image decoder 77, an image blender 78, an image display unit 79, and an operation unit 80.

The control unit 71 includes a system controller 91, a user interface (UI) controller 92, and a content management information controller 93. The RAM 73 includes a management information area 101 and a real data area 102.

The system controller 91 executes various types of control processing on the audio decoder 74, the video decoder 76, the still image decoder 77, and the image blender 78.

The UI controller 92 performs various types of control on graphical user interfaces (GUIs) by using the operation unit 80 and GUI images displayed on the image display unit 79, for example, GUI images shown in FIGS. 10 through 13, which are discussed below.

If necessary, the content management information controller 93 expands management information for playing back the content 64-K shown in FIG. 4 recorded on the recording medium 51, i.e., necessary information selected from among the resource data 65-K, into the management information area 101 of the RAM 73. The content management information controller 93 also generates or updates the GUI images shown in FIGS. 10 through 13 in the form of image data by using various information items expanded into the management information area 101, and provides the image data to the still image decoder 77. Specific examples of the information expanded into the management information area 101 are discussed below with reference to FIGS. 7 and 8.

The demultiplexer 72 reads at least part of the content 64-K to be played back among the content 64-1 through the content 64-N recorded on the recording medium 51. The demultiplexer 72 then demultiplexes the read data into audio data and video data and stores them in the real data area 102 of the RAM 73. The term "reading at least part of the content 64-K" is used because a certain zone of the content 64-K, for example, a face zone, can be played back.

In the real data area 102 of the RAM 73, data, such as video data and audio data, read from the recording medium 51 is stored. In the management information area 101, several pieces of information among the resource data 65-K recorded on the recording medium 51 are stored as management information. Details of the management information area 101 are further discussed below with reference to FIGS. 7 and 8.

Under the control of the system controller 91, the audio decoder 74 reads out audio data from the real data area 102 and converts the audio data into a sound signal having a format that is compatible with the sound output unit 75, and supplies the resulting sound signal to the sound output unit 75. The sound output unit 75 outputs the sound corresponding to the sound signal supplied from the audio decoder 74, i.e., the sound corresponding to the audio data of the content 64-K.

Under the control of the system controller 91, the video decoder 76 reads out video data from the real data area 102 and converts the video data into an image signal having a format that is compatible with the image display unit 79. If the video data is MPEG data, the video decoder 76 performs MPEG decode processing and supplies the resulting image signal to the image blender 78.

Under the control of the system controller 91, the still image decoder 77 reads out still image data, for example, a GUI still image, from the management information area 101, and converts the still image data into an image signal having a format that is compatible with the image display unit 79, and supplies the resulting image signal to the image blender 78.

Figure 13:
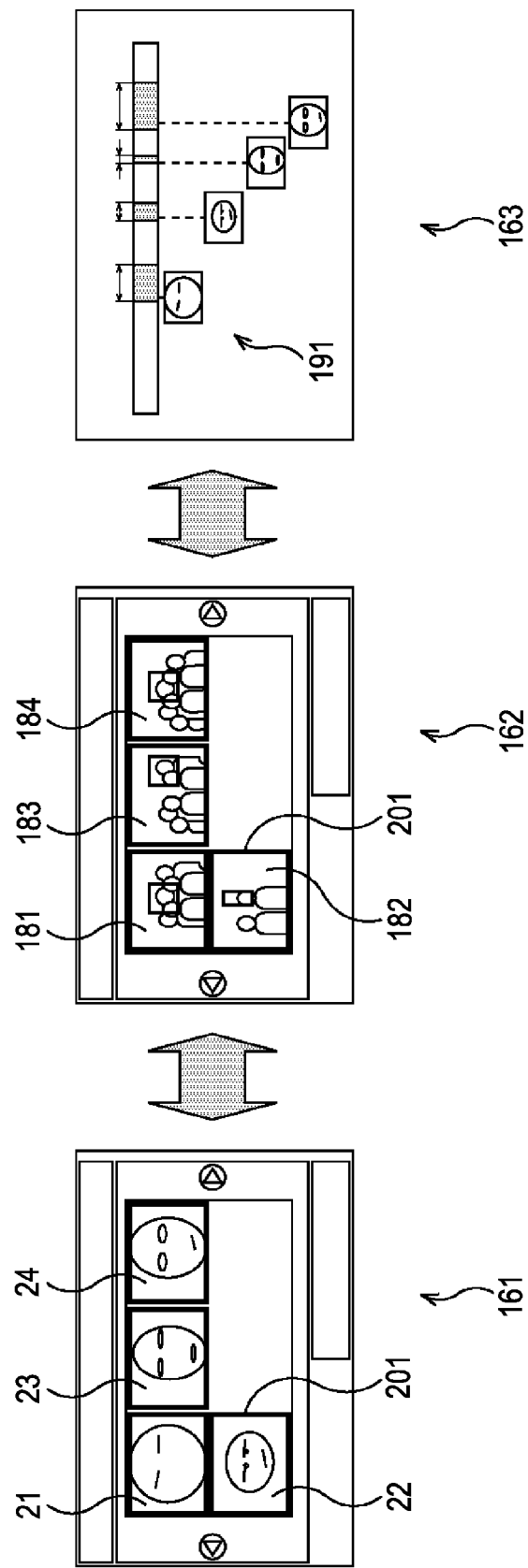
Figure 14:
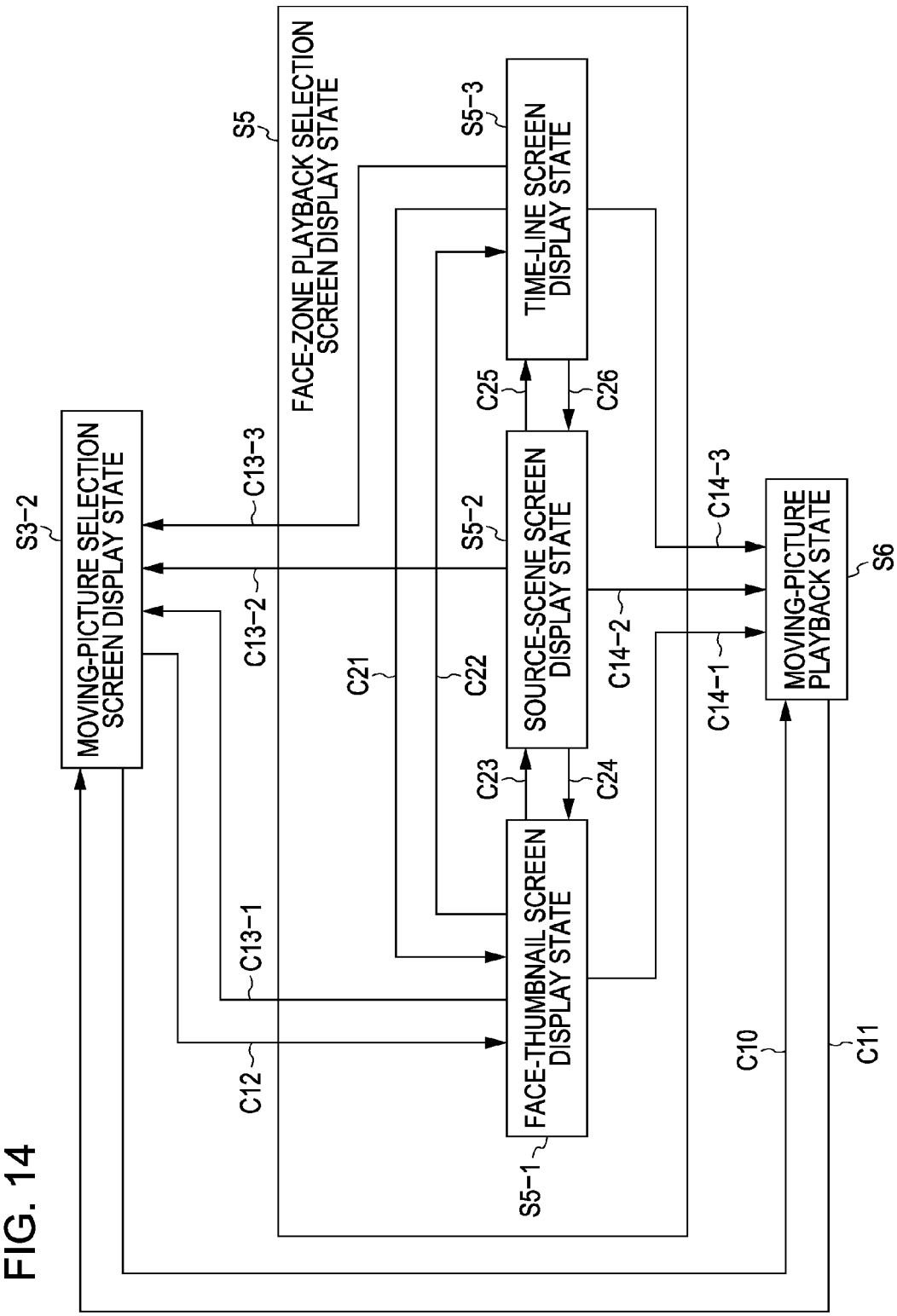
FIG. 14 is a state transition diagram illustrating details of the face-zone playback selection screen display state shown in FIG. 9.
Figure 15:
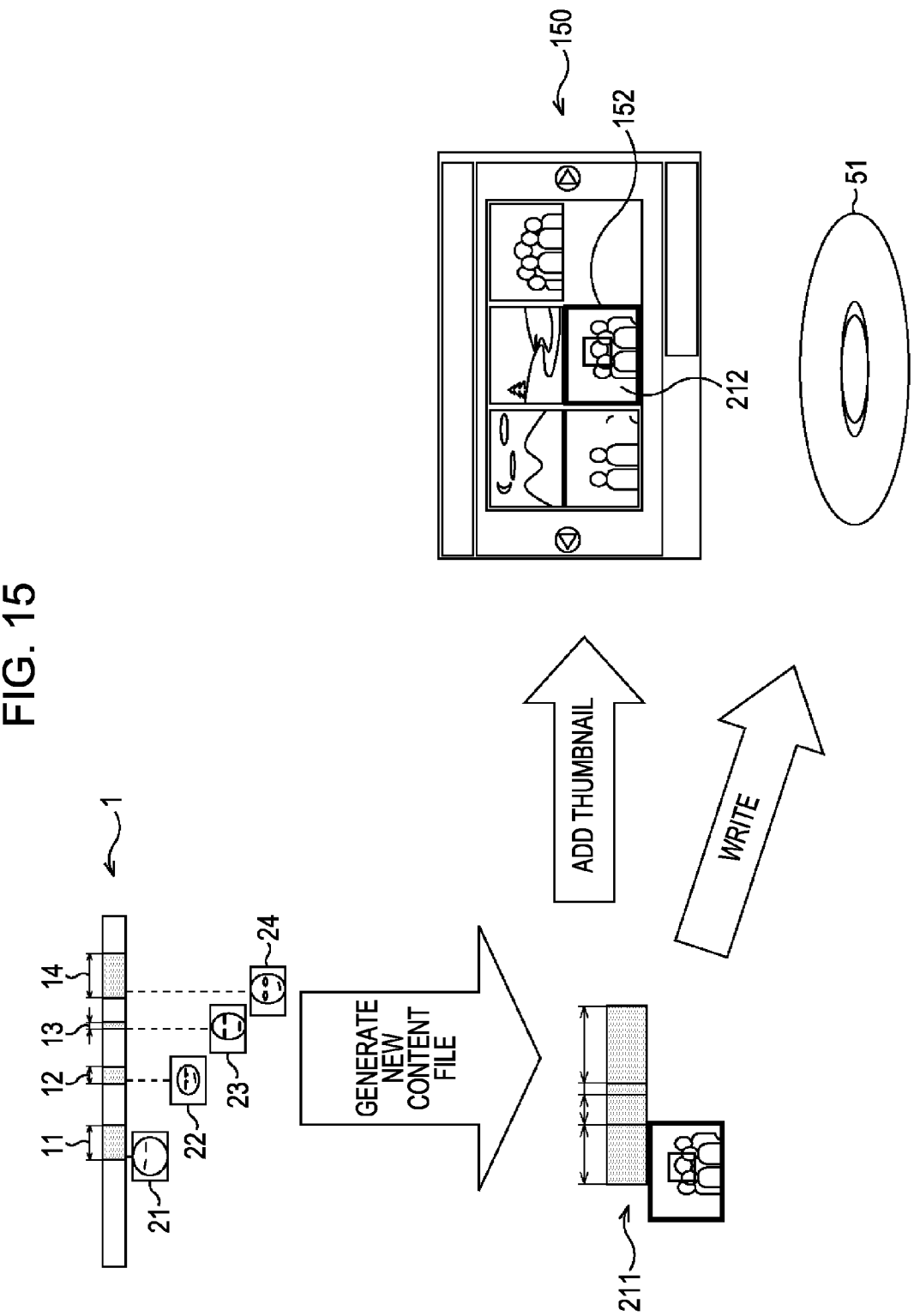
FIG. 15 illustrates a collective write/transfer technique to which an embodiment of the present invention is applied.

The image blender 78 combines the image signal output from the video decoder 76 with the image signal output from the still image decoder 77 and provides the resulting composite image signal to the image display unit 79. The image display unit 79 displays the image corresponding to the image signal output from the image blender 78, i.e., moving pictures corresponding to the video data of the content 64-K or GUI images, such as those shown in FIGS. 10 through 13. Still images, which are discussed below with reference to FIGS. 14 through 16, are also displayed on the image display unit 79.

Details of the management information area 101 of the RAM 73 are given below with reference to FIGS. 7 and 8.

Figure 7:
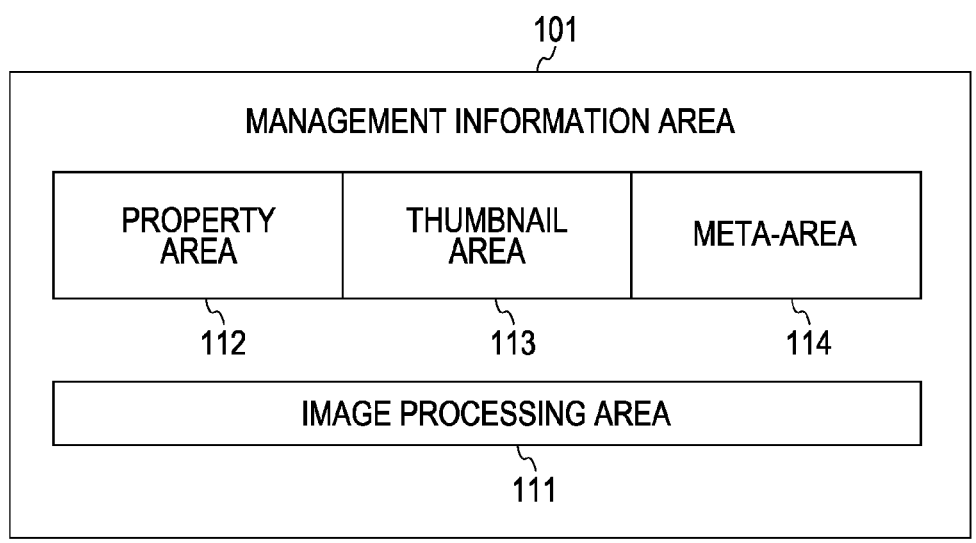
FIG. 7 illustrates an example of the structure of a management information area of the random access memory (RAM) shown in FIG. 6.

The management information area 101 includes, as shown in FIG. 7, an image processing area 111, a property area 112, a thumbnail area 113, and a meta-area 114.

In the image processing area 111, the image data of the GUI image data shown in FIGS. 10 through 13, which are discussed below, and various items of information necessary for performing image processing on the image data by the content management information controller 93 are stored.

In the property area 112, common information necessary for accessing the recording medium 51 shown in FIG. 4, such as the number of entries and the size of the content 64-K, and property data of each entry (hereinafter referred to as the "property entry") are stored.

The entry is a zone for which a playback instruction is given, and for example, the face zones 11 through 14 shown in FIG. 1 can be entries. Accordingly, the property entry includes various items of information necessary for playing back a corresponding zone.

In the thumbnail area 113, information concerning the thumbnail of each entry (hereinafter referred to as a "thumbnail entry") is stored.

In the meta-area 114, information concerning metadata of each entry (hereinafter referred to as a "meta-entry") is stored. If a face zone is an entry, a pair of corresponding face-zone-meta information and a face thumbnail (see FIG. 4) is contained in the meta-entry of the entry.

Figure 8:
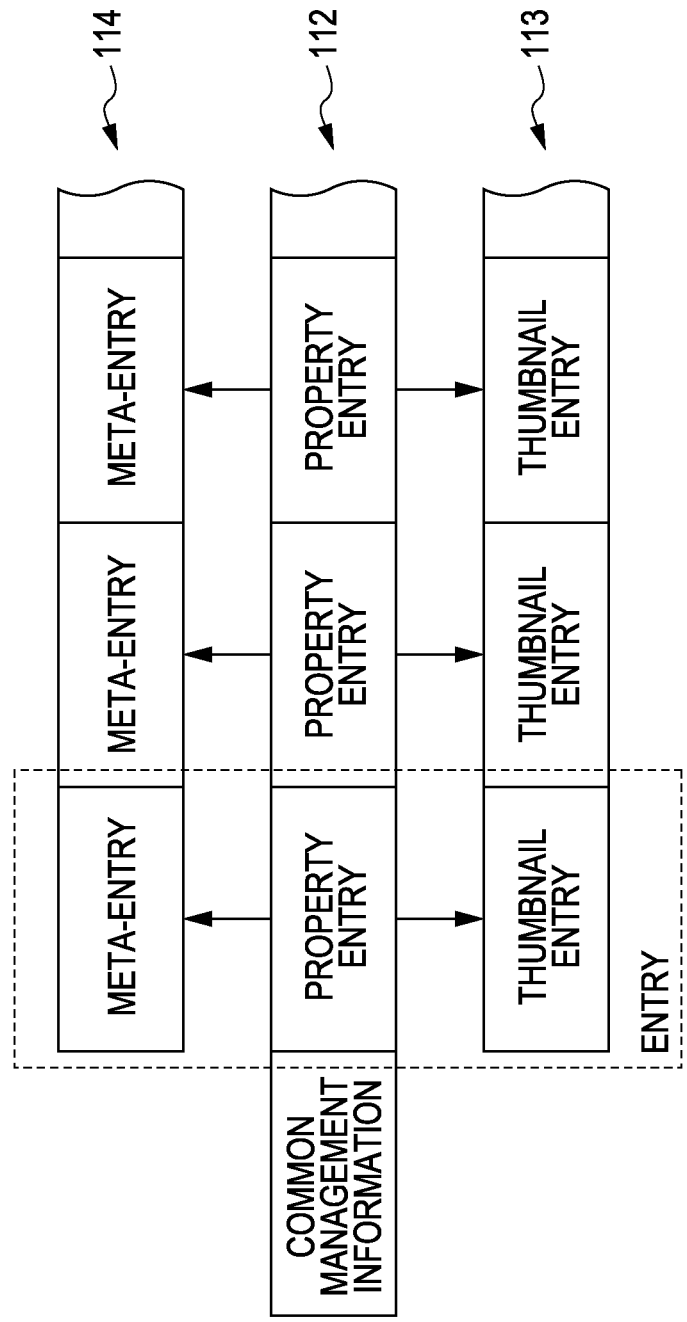
FIG. 8 illustrates an example of data that can be recorded in the management information area shown in FIG. 7.

It should be noted that the property entry, the thumbnail entry, and the meta-entry of each entry are not separately stored in the property area 112, the thumbnail area 113, and the meta-area 114, respectively, and instead, they are stored for each entry in association with each other, as indicated by the arrows in FIG. 8.

A description is given below of the playback instruction operation performed by the user by using the playback apparatus shown in FIG. 6 and processing performed by the playback apparatus in response to the playback instruction operation.

Figure 9:
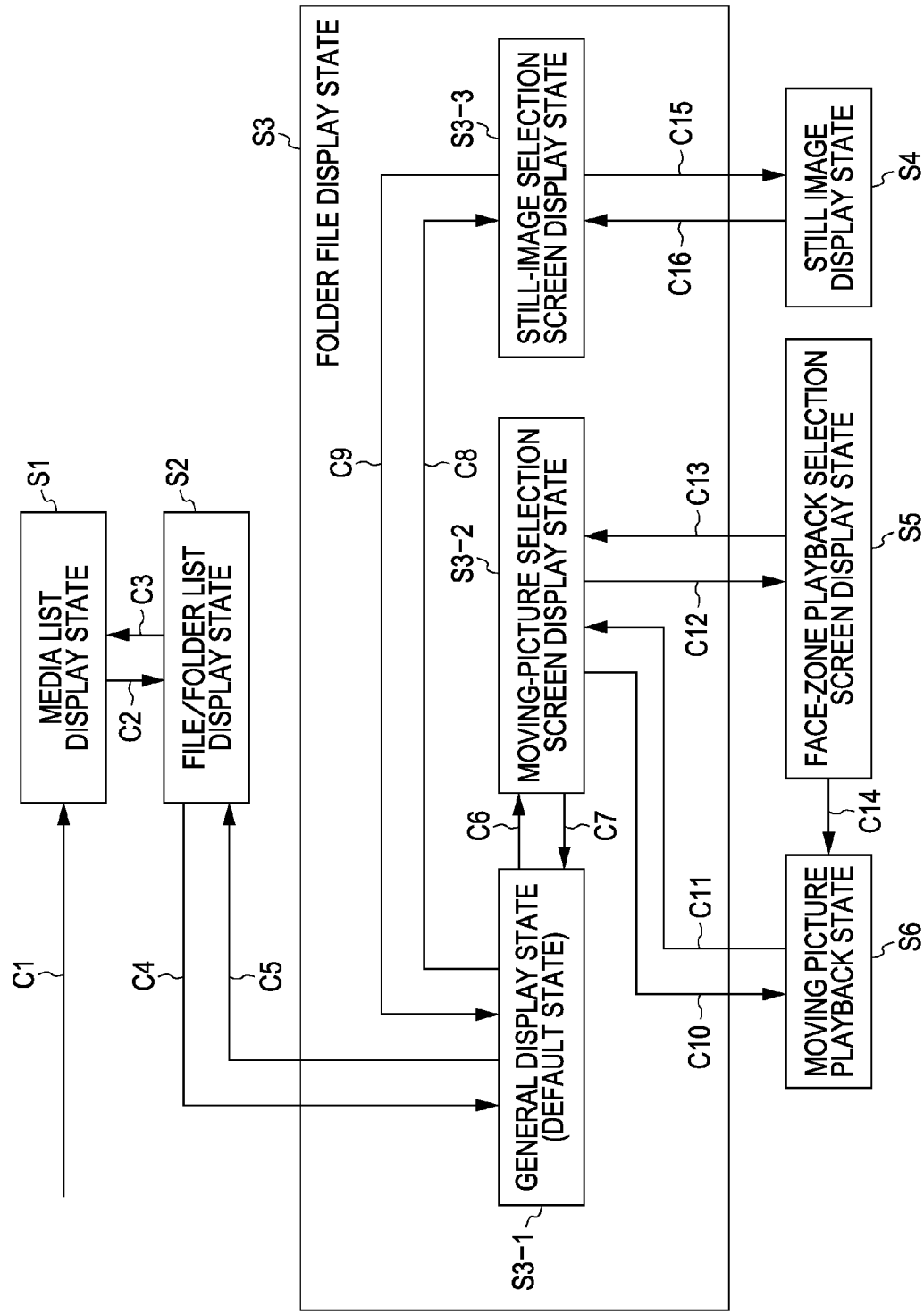
FIG. 9 illustrates a state transition diagram illustrating possible states of the playback apparatus shown in FIG. 6 in response to a playback instruction operation performed by a user.

FIG. 9 illustrates an example of possible states of the playback apparatus in response to a playback instruction operation.

In FIG. 9, each state is indicated by one block, and the block is identified by the sign with "S" extended from the block. The state transition from one state to another state, indicated by the arrows in FIG. 9 (including the case where the playback apparatus remains in the same state), is executed if a predetermined condition (hereinafter referred to as the "state transition condition") is satisfied. In FIG. 9, the state transition conditions are indicated by the sign with "C" appended to the arrows. The same applies to other state transition diagrams.

For example, in response to a start operation for giving a playback instruction by the operation unit 80, the UI controller 92 determines that the state transition condition C1 is satisfied and shifts the state of the playback apparatus to a media list display state S1.

After the state of the playback apparatus is shifted to the media list display state S1, the content management information controller 93 generates a media list GUI image in the management information area 101 of the RAM 73 in the form of image data, and supplies the media list GUI image to the still image decoder 77. The system controller 91 controls the still image decoder 77 and the image blender 78 to convert the media list GUI image from the image data into an image signal, and supplies the converted media list GUI image to the image display unit 79. Then, on the image display unit 79, the media list GUI image is displayed. As a result, a GUI using the media list GUI image and the operation unit 80 can be implemented.

The media list is an index list of each recording medium that can be played back by the playback apparatus. That is, a GUI image that allows the media list to be displayed and that receives an operation for selecting the index corresponding to a desired recording medium from the list is the media list GUI image, though it is not shown.

A series of processing for displaying another GUI image on the image display unit 79 and implementing a GUI using the GUI image and the operation unit 80 is basically similar to the processing for the above-described media list GUI image. Thus, such a series of processing is simply referred to as the "GUI image display processing" and a detailed explanation is omitted.

After the operation for selecting a desired recording medium from the media list is performed through the operation unit 80, the UI controller 92 determines that the state transition condition C2 is satisfied, and shifts the state of the playback apparatus from the media list display state S1 to the file/folder list display state S2.

After the state of the playback apparatus is shifted to the file/folder list display state S2, the control unit 71 executes processing for displaying a file/folder list GUI image.

The file/folder list is a list of icons of folders and files, in the form of a tree structure, contained in the selected recording medium. That is, though a GUI image that allows a file/folder list to be displayed and that receives an operation for selecting the icon corresponding to a desired file/folder is the file/folder list GUI image, though it is not shown.

The file/folder list GUI image contains a software button for redisplaying, for example, the media list GUI image. If the software button is operated, it is determined that the state transition condition C3 is satisfied, and the state of the playback apparatus is shifted from the file/folder list display state S2 to the media list display state S1.

In response to an operation for selecting a desired file/folder from the file/folder list GUI image performed through the operation unit 80, the UI controller 92 determines that the state transition condition C4 is satisfied, and shifts the state of the playback apparatus from the file/folder list display state S2 to the folder file display state S3.

More specifically, in this embodiment, the folder file display state S3 includes three states, such as a general display state S3-1, a moving-picture selection screen display state S3-2, and a still-image selection screen display state S3-3. Among the three states, the state of the playback apparatus shifts from the file/folder list display state S2 to the general display state S3-1. That is, the general display state S3-1 is the default state of the folder file display state S3.

After the state of the playback apparatus is shifted to the general display state S3-1, the control unit 71 executes processing for displaying a file selection GUI image.

The file selection GUI image contains a software button for redisplaying, for example, the file/folder list GUI image, though it is not shown. If the software button is operated, it is determined that the state transition condition C5 is satisfied, and the state of the playback apparatus is shifted from the general display state S3-1 to the file/folder list display state S2.

The file selection GUI image is a GUI image that allows icons of individual files contained in the folder of the selected recording medium to be displayed and that receives an operation for selecting a predetermined icon. To select an icon is to select the file associated with the icon.

In this case, if the selected recording medium is the recording medium 51 shown in FIG. 4, the content 64-1 through the content 64-N, which serve as moving picture content, are formed as files. Accordingly, to select the file of the content 64-K is to give an instruction to play back the content 64-K.

However, it is difficult for the user to visually determine whether an icon represents a file of moving picture content or a file of another type of content. Even if the user can identify that the icon represents a file of moving picture content, it is very difficult to understand the type of moving picture content.

Figure 10:
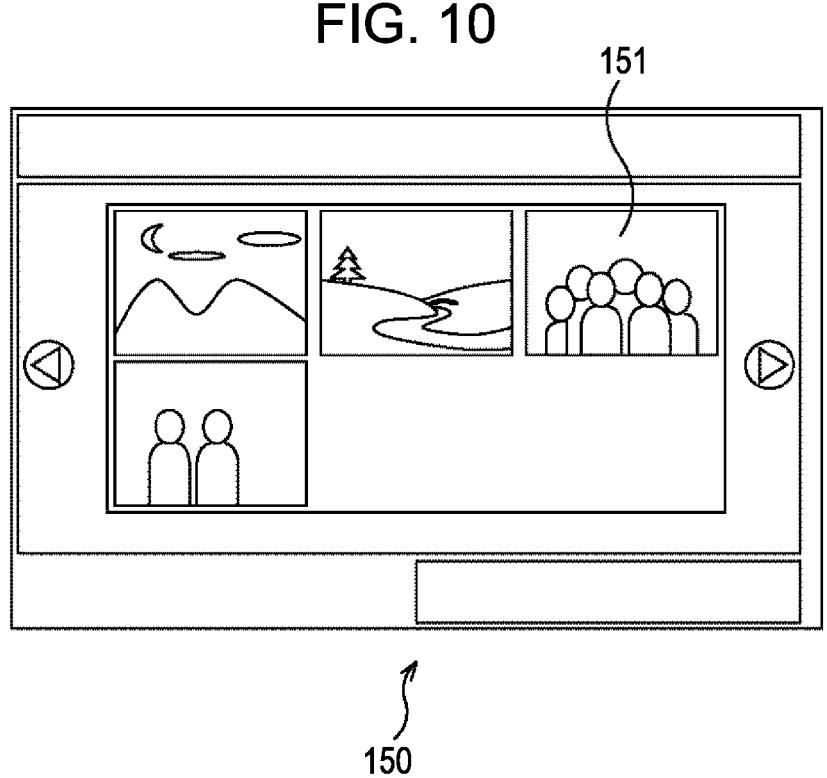
FIGS. 10 and 11 illustrate examples of images displayed when the playback apparatus is in the moving-picture selection screen display state shown in FIG. 9.

Accordingly, in this embodiment, a moving-picture selection GUI image 150, such as that shown in FIG. 10, is provided. That is, the moving-picture selection GUI image is a GUI image that allows a list of typical images of individual pieces of moving picture content, as indexes of the moving picture content, to be displayed as thumbnail images 151 and that receives an operation for selecting a predetermined thumbnail image 151 from the list.

The file selection GUI image contains a software button for displaying, for example, the moving-picture selection GUI image 150, though it is not shown. If the software button is operated, it is determined that the state transition condition C6 shown in FIG. 9 is satisfied, and the state of the playback apparatus is shifted from the general display state S3-1 to the moving-picture selection screen display state S3-2.

After the state of the apparatus is shifted to the moving-picture selection screen display state S3-2, the control unit 71 performs processing for displaying the moving-picture selection GUI image 150 shown in FIG. 10.

The moving-picture selection GUI image contains a software button for redisplaying, for example, the file selection GUI image, though it is not shown. If the software button is operated, it is determined that the state transition condition C7 is satisfied, and the state of the playback apparatus is shifted from the moving-picture selection screen display state S3-2 to the general display state S3-1.

Figure 11:
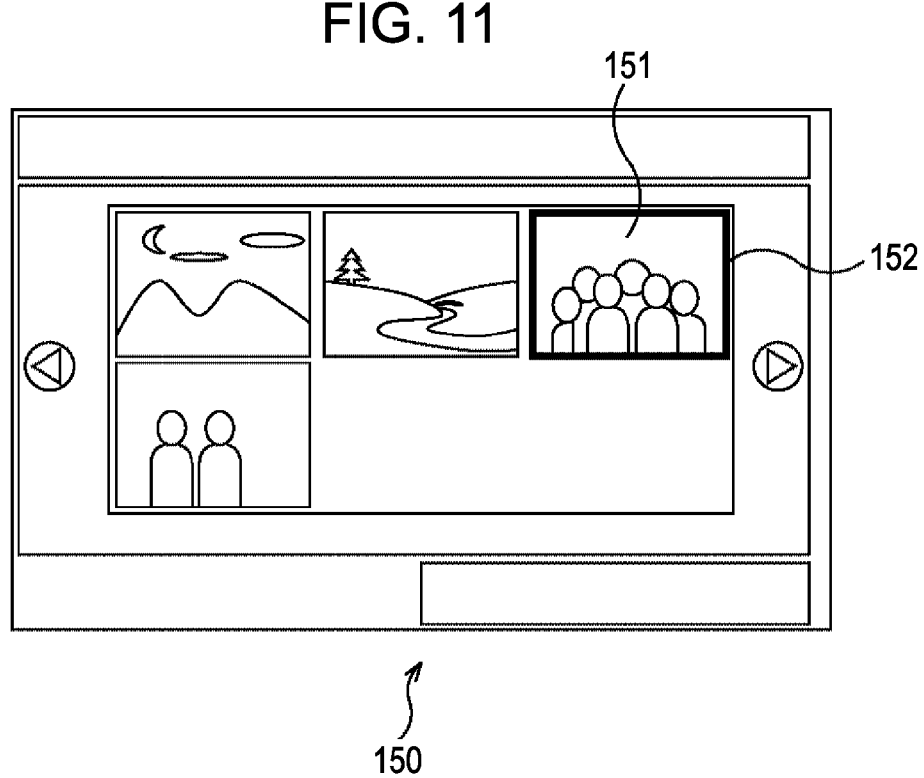

While the moving-picture selection GUI image 150 shown in FIG. 10 is being displayed, the user operates the operation unit 80, as shown in FIG. 11, to move a cursor 152 to the desired thumbnail image 151, and sets the thumbnail image 151 indicated by the cursor 152 by performing a predetermined operation using the operation unit 80.

In this case, to select the thumbnail image 151 is to give an instruction to play back the moving picture content associated the thumbnail image 151. In this embodiment, there are at least two types of playback instruction operations, as discussed with reference to FIG. 1, such as the playback instruction operation for giving an instruction to play back the entire moving picture content (hereinafter referred to as the "entire playback instruction operation") and the playback instruction operation for giving an instruction to play back a face zone, which is part of the moving picture content, (hereinafter referred to as the "face-zone playback instruction operation).

Accordingly, the selection operation for the thumbnail image 151 also includes two types of playback instruction operations, such as a first selection operation corresponding to the entire playback instruction operation and a second selection operation corresponding to the face-zone playback instruction operation.

If the first selection operation is performed, it is determined that the state transition condition C10 shown in FIG. 9 is satisfied and the state of the playback apparatus is shifted from the moving-picture screen display state S3-2 to the moving-picture playback state S6.

After the state of the playback apparatus is shifted to the moving-picture playback state S6, the control unit 71 plays back the moving picture content for which the entire playback instruction operation is performed. That is, the entire moving picture content is read from the recording medium and is played back from the start. The playback operation for the entire moving picture content can be easily understood from the description of the playback apparatus with reference to FIG. 6, and an explanation thereof is thus omitted here.

After the playback of the moving picture content is finished or in response to an operation for interrupting the playback of the moving picture content, it is determined that the state transition condition C11 is satisfied, and the state of the playback apparatus is shifted from the moving-picture playback state S6 to the moving-picture selection screen display state S3-2.

In contrast, if the second selection operation corresponding to the face-zone playback instruction operation is performed, it is determined that the state transition condition C12 is satisfied and the state of the playback apparatus is shifted from the moving-picture selection screen display state S3-2 to the face-zone playback selection screen display state S5.

After the state of the playback apparatus is shifted to the face-zone playback selection screen display state S5, processing for displaying the face-zone playback selection GUI images is performed.

The face-zone playback selection GUI images are GUI images that instruct the user to select a desired face zone from the moving picture content selected in the moving-picture selection screen GUI image.

Figure 12:
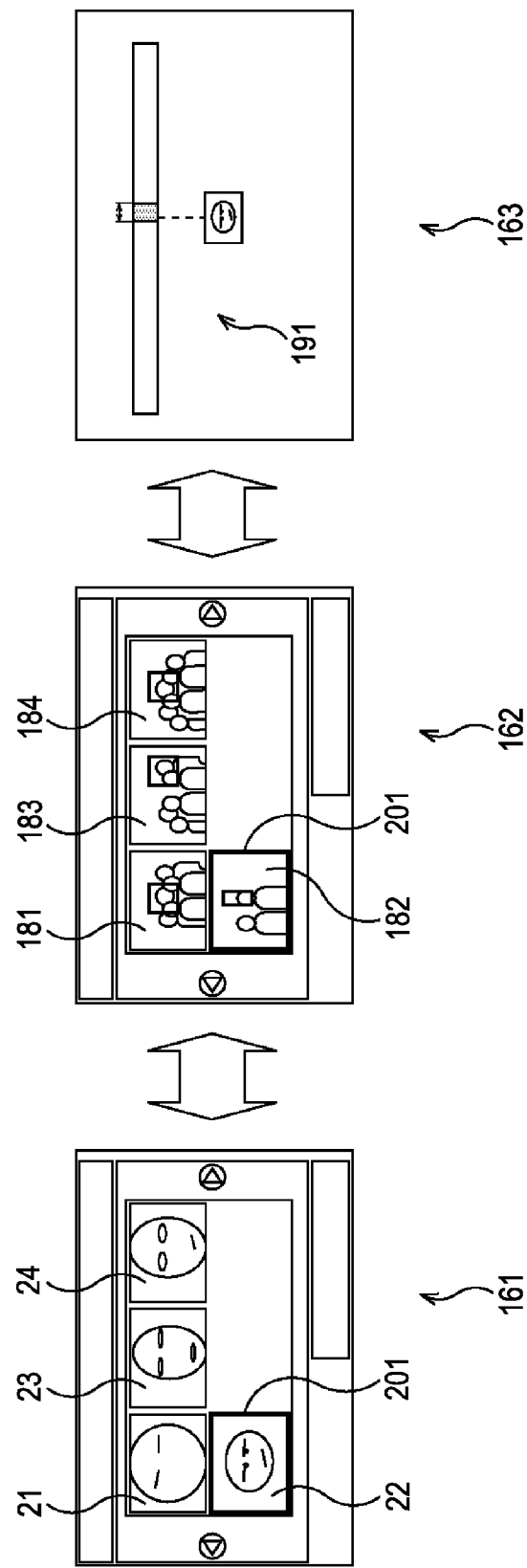
FIGS. 12 and 13 illustrate examples of images displayed when the playback apparatus is in the face-zone playback selection screen display state shown in FIG. 9.

In this embodiment, as the face-zone playback selection GUI images, three GUI images 161 through 163, such as those shown in FIG. 12, are provided.

In FIG. 12, the GUI image 161 shown at the left side is a GUI image that allows a list of face thumbnail images to be displayed as an index list of face zones contained in the moving picture content and that receives an operation for selecting a desired face image thumbnail from the list. The GUI image 161 is hereinafter referred to as the "face thumbnail GUI image 161".

In the example shown in FIG. 12, it is assumed that the content 1 shown in FIG. 1 is selected, and a list of the face thumbnail images 21 through 24 associated with the face zones 11 through 14, respectively, included in the content 1 is displayed as the face thumbnail GUI image 161.

While the face thumbnail GUI image 161 is being displayed, the user can operate the operation unit 80 to move a cursor 201 to a desired face thumbnail image, as shown in FIG. 12, and can perform a predetermined operation through the operation unit 80 to give an instruction to play back the face zone corresponding to the face thumbnail image indicated by the cursor 201.

In the example shown in FIG. 12, since the cursor 201 is positioned at the face thumbnail image 22, the user is to give an instruction to play back the face zone 12 shown in FIG. 1. In this case, the face zone 12 of the moving picture content 1 is read from the recording medium 51 and is played back. The playback operation for the face zone 12 can be easily understood from the description of the playback apparatus with reference to FIG. 6, and an explanation thereof is thus omitted here.

An example of the technique for specifying a range of the moving picture content 1 to be read as the face zone 12 is briefly discussed below. As stated above, it is possible to specify the range of the moving picture content 1 corresponding to the face zone 12 by means of the face-zone-meta information (FIG. 5) concerning the face zone 12 recorded on the recording medium 51. Accordingly, if the face zone 12 has already been entered before selecting the face thumbnail image 22, the face-zone-meta information concerning the face zone 12 is recorded in the management information area 101 (FIG. 8) as the meta-entry of the face zone 12. Then, by the use of this meta-entry, the range of the moving picture content 1 to be read as the face zone 12 can be specified. If the face zone 12 has not been entered when selecting the face thumbnail image 22, it is entered at this point.

In contrast to the face thumbnail GUI image 161, instead of face images, a GUI image 162 contains thumbnail images corresponding to the entireties of the source-scene still images from which the face images are extracted. The GUI image 162 is hereinafter referred to as the "source-scene GUI image 162".

In the example shown in FIG. 12, thumbnail images 181 through 184 corresponding to the source-scene still images from which the face thumbnail images 21 through 24, respectively, are extracted are displayed in the source-scene GUI image 162 as the indexes of the face zones 11 through 14, respectively.

Accordingly, while the source-scene GUI image 162 is being displayed, the user can operate the operation unit 80 to move the cursor 201 to a desired thumbnail image, as shown in FIG. 12, and can perform a predetermined operation through the operation unit 80 to give an instruction to play back the face zone corresponding to the thumbnail image at which the cursor 201 is positioned.

In the example shown in FIG. 12, since the cursor 201 is positioned at the thumbnail image 182, the user is to give an instruction to play back the face zone 12 shown in FIG. 1. Then, the face zone 12 of the moving picture content 1 is read from the recording medium 51 and is played back.

In this embodiment, after locating the cursor 201 at a desired face thumbnail image in the face thumbnail image 161, or after locating the cursor 201 at a desired thumbnail image in the source-scene GUI image 162, that is, after selecting a desired face zone in the face thumbnail GUI image 161 or the source-scene GUI image 162, the user can perform a predetermined operation through the operation unit 80 to display a GUI image 163 including a time line 191 indicating the time position of the predetermined face zone in the moving picture content 1. In the example shown in FIG. 12, since the face zone 12 is selected, as stated above, a band-like image corresponding to the moving picture content 1 shown in FIG. 1 is displayed as the time line 191, and only the image representing the face zone 12 is displayed in the band-like image. The GUI image 163 is hereinafter referred to as the "time-line GUI image 163".

While the time-line GUI image 163 is being displayed, the user can perform a predetermined operation through the operation unit 80 to give an instruction to play back the face zone represented by the image displayed in the time line 191.

In the example shown in FIG. 12, since the image representing the face zone 12 shown in FIG. 1 is displayed in the time line 191, the user can give an instruction to play back the face zone 12. Then, the face zone 12 of the moving picture content 1 is read from the recording medium 51 and is played back.

In the example shown in FIG. 12, only one face thumbnail image 22 or one thumbnail image 182 is selected. However, all the face thumbnail images 21 through 24 or all the thumbnail images 181 through 184 can be selected, as shown in FIG. 13, or some of the face thumbnail images 21 through 24 or some of the thumbnail images 181 through 184 can be selected. That is, it is possible to select a plurality of face zones by one playback instruction operation.

In this case, the face zones selected by one playback instruction operation, for example, in FIG. 13, the face zones 11 through 14 (see FIG. 1), are continuously played back by turns.

As discussed above, in this embodiment, as the face zone playback selection GUI images, three GUI images, such as the face thumbnail GUI image 161, the source-scene GUI image 162, and the time-line GUI image 163 shown in FIG. 12, are provided. Accordingly, the face-zone playback selection screen display state S5 includes, as shown in FIG. 14, a face-thumbnail screen display state S5-1 in which the face thumbnail GUI image 161 is displayed, a source-scene screen display state S5-2 in which the source scene GUI image 162 is displayed, and a time-line screen display state S5-3 in which the time-line GUI image 163 is displayed.

If the above-described face-zone playback instruction operation is performed at least for once in the face-thumbnail screen display state S5-1, the source-scene screen display state S5-2, and the time-line screen display state S5-3, it is determined that the state transition conditions C14-1, C14-2, and C14-3, respectively, are satisfied, and the state of the playback apparatus is shifted to the moving-picture playback state S6.

After the state of the playback apparatus is shifted to the moving-picture playback state S6, the control unit 71 continuously plays back one or more face zones for which the playback instruction operation is performed, as discussed above.

After finishing the playback operation for one or more face zones to the end or in response to an instruction to stop the playback operation, it is determined that the state transition condition C11 is satisfied, and the state of the playback apparatus is shifted from the moving-picture playback state S6 to the moving-picture selection screen display state S3-2.

A software button for redisplaying, for example, the moving-picture selection GUI image 150, is contained in each of the face thumbnail GUI image 161, the source-scene GUI image 162, and the time-line GUI image 163, though it is not shown. If the software button is operated, it is determined that the state transition condition C13-1, C13-2, or C13-3 is satisfied, and the state of the playback apparatus is shifted to the moving-picture selection screen display state S3-2.

Another software button for redisplaying, for example, another face-zone selection GUI image, is contained in each of the face thumbnail GUI image 161, the source-scene GUI image 162, and the time-line GUI image 163, though it is not shown. If the software button is operated, it is determined that one of the state transition conditions C21 through C26 is satisfied, and the state of the playback apparatus is shifted to the corresponding one of the face-thumbnail screen display state S5-1, the source-scene screen display state S5-2, and the time-line screen display state S5-3.

As discussed above, the above-configured playback apparatus shown in FIG. 6 according to an embodiment of the present invention presents the face thumbnail GUI image 161, the source-scene GUI image 162, or the time-line GUI image 163 to the user and instructs the user to select a face thumbnail image so that the face zone corresponding to the selected face thumbnail can be played back.

The user may select a plurality of face thumbnail images. In this case, a plurality of face zones corresponding to the selected plurality of face thumbnail images are continuously played back. In the example shown in FIG. 13, the face thumbnail images 21 through 24 or thumbnail images 181 through 184 corresponding to the face zones 11 through 14, respectively, of the moving picture content 1 shown in FIG. 1 are selected. Accordingly, the face zones 11 through 14 are continuously played back in that order.

Additionally, one or more selected face zones may be formed into a new piece of content, i.e., a new file, and recorded on, an external medium, such as the recording medium 51. Alternatively, one or more selected face zones may be transferred to an external apparatus (not shown) via a network. Such a technique is referred to as a "collective write/transfer technique".

More specifically, in the example shown in FIG. 15, the following collective write/transfer technique can be implemented. After selecting the face thumbnail images 21 through 24 corresponding to the face zones 11 through 14, respectively, of the moving picture content 1, new content 211 may be generated so that the face zones 11 through 14 are played back in that order by performing a predetermined operation. Then, a thumbnail image 212 may be added to the moving-picture selection GUI image 150 as the index of the new content 211, or the new content 211 may be recorded on the recording medium 51.

Figure 17:
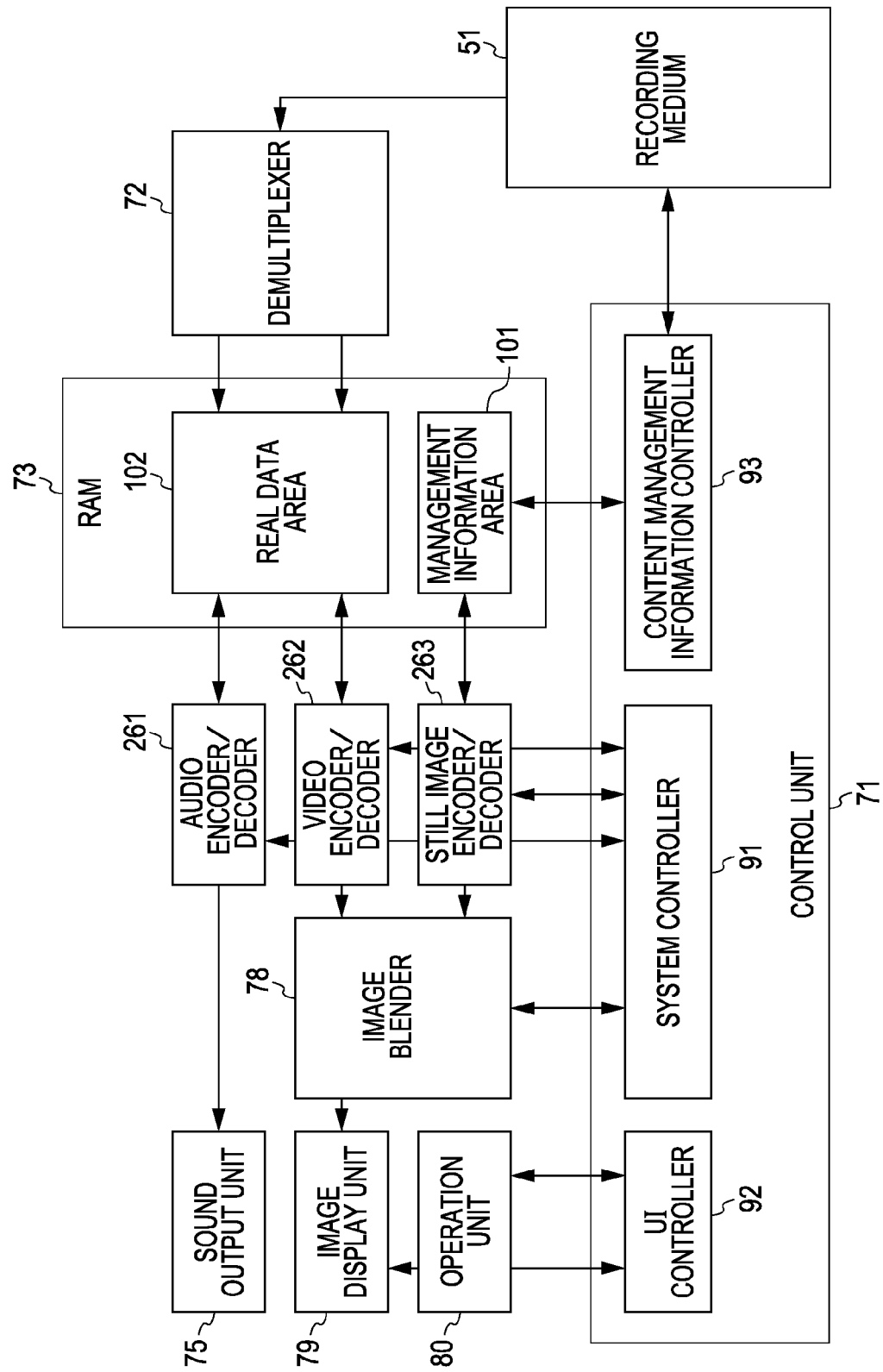
FIG. 17 is a functional block diagram illustrating an example of the functional configuration of a recording/playback apparatus that can implement a collective write/transfer technique and that serves as an information processing apparatus according to another embodiment of the present invention is applied.
Figure 18:
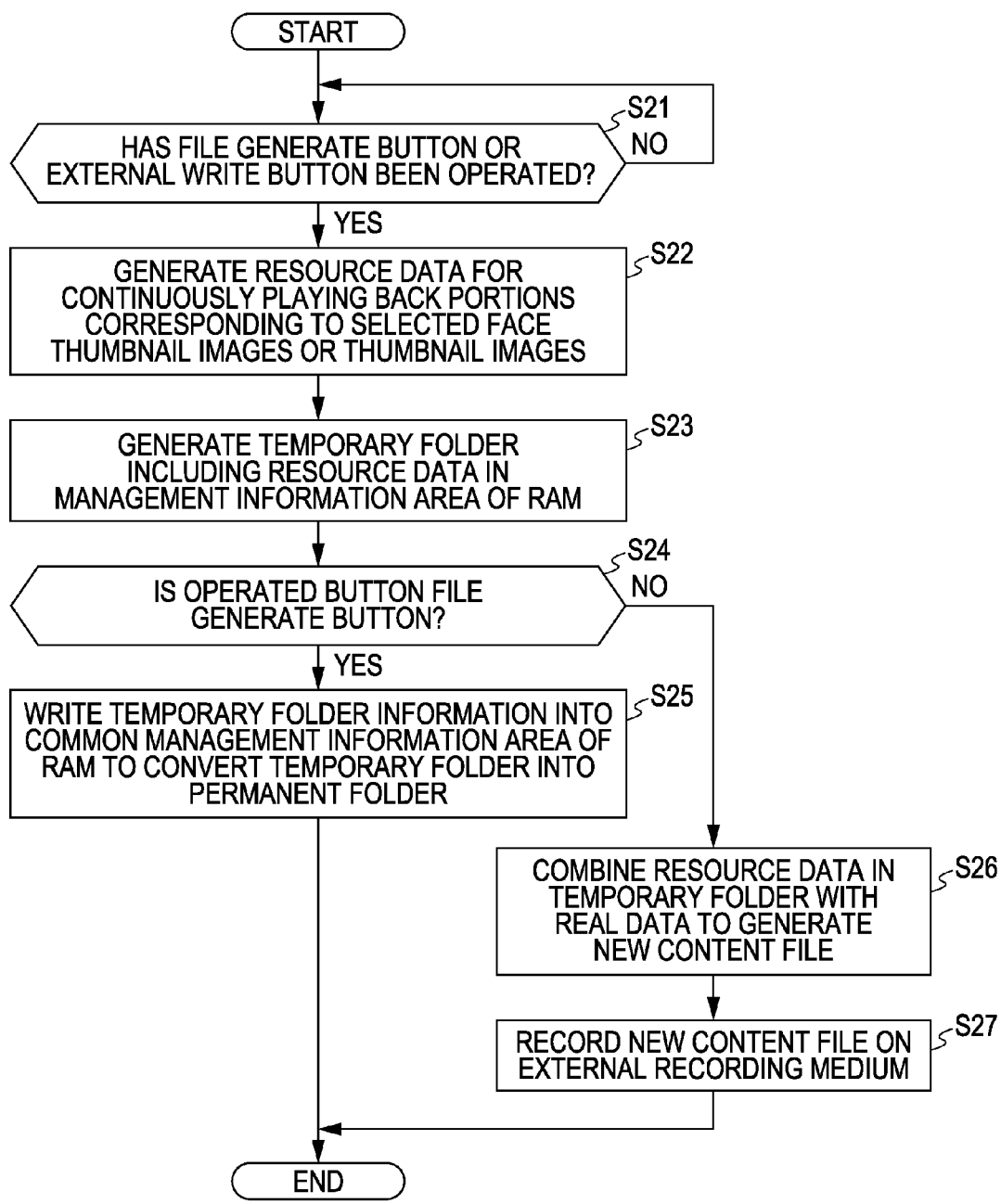
FIG. 18 is a flowchart illustrating collective write processing executed by the recording/playback apparatus shown in FIG. 17.

To apply the collective write/transfer technique to the playback apparatus, in addition to the above-described configuration and operation discussed with reference to FIGS. 4 through 14, extra measures shown in FIGS. 16 through 18 are necessary.

That is, in order to implement the collective write/transfer technique by using the face thumbnail GUI image 161 and the source-scene GUI image 162 shown in FIG. 12, software buttons 251-1 through 253-1 may added to the face thumbnail GUI image 161 and software buttons 251-2 through 253-2 may be added to the source-scene GUI image 162, as shown in FIG. 16.

The software buttons 251-1 through 253-1 and 251-2 through 253-2 are hereinafter simply referred to as the "software buttons 251 through 253" unless it is not necessary to individually distinguish them from each other. The software buttons 251 through 253 are also referred to as a playback button 251, a file generate button 252, and an external write button 253, respectively, as shown in FIG. 16.

The playback button 251 is a software button for performing a playback instruction operation for continuously playing back one or more face zones in that order associated with one or more selected face thumbnail images or thumbnail images.

The file generate button 252 is a software button for generating new content, as a new file, from one or more face zones associated with one or more selected face thumbnail images or thumbnail images and for storing the new file in a built-in memory of the playback apparatus, for example, the RAM 73 shown in FIG. 17, which is discussed below. By operating the file generate button 252, a thumbnail image corresponding to the generated new content is added to the moving-picture selection GUI image 150, as in the new content 211 shown in FIG. 15. Accordingly, the user can select the additional thumbnail image to give an instruction to play back the new content.

The external write button 253 is a software button for generating new content, as a new file, from one or more face zones associated with one or more selected face thumbnail images or thumbnail images and for recording the generated new content in an external medium, such as the recording medium 51, or transferring the new content to an external apparatus via a network. By operating the external write button 253, the user can record new content, such as the new content 211 shown in FIG. 15, on, for example, the recording medium 51.

FIG. 17 illustrates an example of the configuration of a recording/playback apparatus to implement the collective write/transfer technique. That is, the recording playback apparatus serves as an information processing apparatus according to an embodiment of the present invention, and is different from the playback apparatus shown in FIG. 6.

In the recording/playback apparatus shown in FIG. 17, elements corresponding to those of the playback apparatus shown in FIG. 6 are designated with like reference numerals, and an explanation thereof is thus omitted.

As stated above, according to the collective write/transfer technique, one or more face zones selected by using face thumbnail images or thumbnail images can be formed into one piece of content, i.e., a new file. In this case, however, if more than one face zone are selected, an editing operation for splicing those face zones becomes necessary. In this embodiment, this editing operation is performed on face zones when they are in the form of a baseband signal. Thus, in the recording/playback apparatus shown in FIG. 17, instead of the audio decoder 74, the video decoder 76, and the still image decoder 77 of the playback apparatus shown in FIG. 6, functional blocks, such as an audio encoder/decoder 261, a video encoder/decoder 262, and a still image encoder/decoder 263 having an encoding function (expansion-decoding processing) in addition to a decoding function (compression-coding), are disposed.

When generating, for example, the new content 211 shown in FIG. 15, the recording/playback apparatus shown in FIG. 17 executes the following processing. It is now assumed that the face zones 11 through 14 are stored in the RAM 73 in the form of MPEG data. In this case, the video encoder/decoder 262 performs so-called MPEG encoding (expansion-decoding processing) on each of the face zones 11 through 14 to convert the MPEG data into a baseband signal. Then, the face zones 11 through 14 in the form of the baseband signal are stored in the image processing area 111 (FIG. 7) of the management information area 101 of the RAM 73. The control unit 71 generates the new content 211 by splicing the face zones 11 through 14 in the form of the baseband signal, and supplies the new content 211 to the video encoder/decoder 262. Then, the video encoder/decoder 262 performs so-called MPEG decoding (compression-coding processing) on the new content 211 to convert the baseband signal into MPEG data, and then stores the MPEG data in the real data area 102 of the RAM 73.

If sound is included in the new content 211, the audio encoder/decoder 261 performs processing in a manner similar to the video encoder/decoder 262.

In the recording/playback apparatus shown in FIG. 17, in order to record new content, such as the new content 211, on the recording medium 51, direct access to the recording medium 51 by the content management information controller 93 is implemented.

The above-configured recording/playback apparatus shown in FIG. 17 can execute the processing discussed with reference to FIGS. 9 through 14 in a manner similar to the playback apparatus shown in FIG. 6. That is, the recording/playback apparatus shown in FIG. 17 can execute processing corresponding to a playback instruction operation performed by the user and processing for playing back content in response to the playback instruction operation.

The recording/playback apparatus shown in FIG. 17 can also perform collective write processing, as indicated by the flowchart in FIG. 18.

The collective write processing is executed when the state of the recording/playback apparatus is the face-zone playback selection screen display state S5 shown in FIG. 14. That is, in this embodiment, the collective write processing is executed while the face thumbnail GUI image 161 or the source-scene GUI image 162 shown in FIG. 16 is being displayed on the image display unit 79.

FIG. 18 is a flowchart illustrating an example of the collective write processing performed by the recording/playback apparatus.

In step S21, the UI controller 92 of the control unit shown in FIG. 17 determines whether the file generate button 252 or the external write button 253 has been operated.

If it is determined in step S21 that neither of the file generate button 252 or the external write button 253 has been operated, the process returns to step S21, and the determination processing in step S21 is repeated.

If it is determined in step S21 that the file generate button 252 or the external write button 253 has been operated, the process proceeds to step S22.

In step S22, the content management controller 93 generates resource data for continuously playing back portions corresponding to the selected face thumbnail images or thumbnail images.

In step S23, the content management controller 93 generates a temporary folder including the resource data in the management information area 101 of the RAM 73.

More specifically, it is now assumed, for example, that after the face thumbnail images 21 through 24 are selected by using the face thumbnail GUI image 161, the file generate button 252-1 or the external write button 253-1 is operated.

In this case, the face thumbnail images 21 through 24 serve as the indexes of the face zones 11 through 14, respectively. Accordingly, in step S22, resource data items 271 through 274 for playing back the face zones 11 through 14, respectively, are generated. Then, in step S23, a temporary folder 261 including the resource data items 271 through 274 is recorded in the management information area 101 of the RAM 73. The resource data items 271 through 274 are data including pairs of face thumbnails and face-zone-meta information concerning the face zones 11 through 14, respectively (see FIG. 4).

In step S24 in FIG. 18, the UI controller 92 determines whether the operated button is the file generate button 252.

If it is determined in step S24 that the file generate button 252 has been operated, the process proceeds to step S25.

In step S25, the content management information controller 93 writes information concerning the temporary folder into the common management information area of the RAM so that the temporary folder can be converted into a permanent folder. Then, the collective write processing is completed.

If it is determined in step S24 that the operated button is not the file generate button 252, i.e., the operated button is the external write button 253. The process then proceeds to step S26.

In step S26, the content management information controller 93 and the system controller 91 combine the resource data in the temporary folder with the real data to generate new content as a new file. The real data generating processing has been discussed above through a description of the video encoder/decoder 262.

In step S27, the content management information controller 93 records the new content on an external medium, such as the recording medium 51, as a new file. Then, the collective write processing is completed.

If the recording/playback apparatus shown in FIG. 17 has a function of communicating with another apparatus, though such a function is not shown, in step S27, new content may be transmitted to another apparatus by using the communication function.

In the above-described example, face thumbnail images are associated with moving picture content. However, they may be associated with still image content. Then, as in the moving picture content, the user can perform a search operation or a playback instruction operation on still image content by using a GUI image including a list of face thumbnail images.

It is possible that, in most cases, the number of pieces of still image content is much greater than the number of pieces of moving picture content. Accordingly, instead of displaying a list of face thumbnail images associated with all pieces of still image content, the following approach to arranging still image content pieces is more convenient for users. Still image content pieces that are determined to contain the same character are formed into one group, and then, one face thumbnail image is extracted from each group as a typical face thumbnail image. Then, a list of typical face thumbnail images is displayed.

Figure 20:
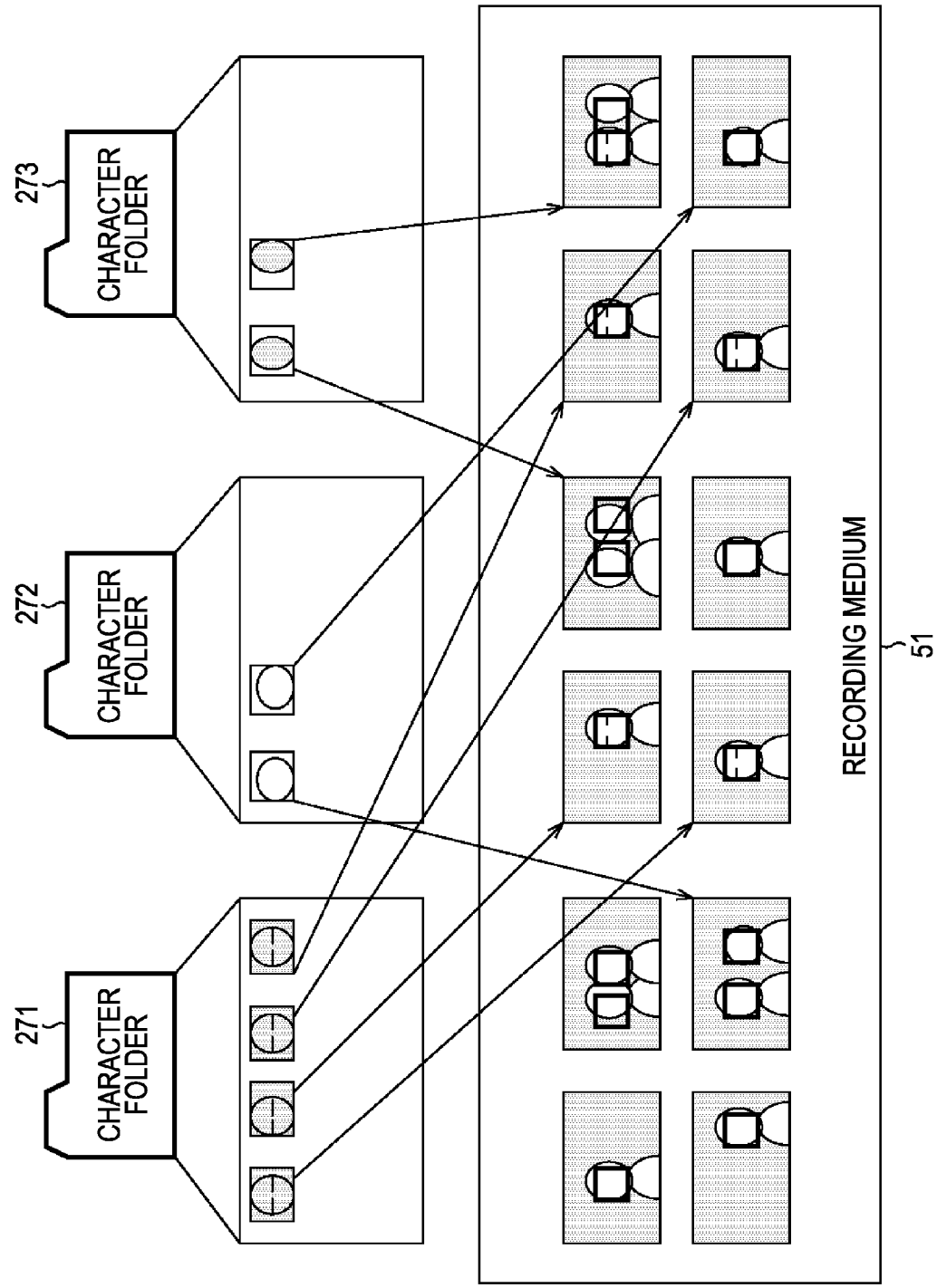
FIG. 20 illustrates an example of a case in which face thumbnail images are applied to still image content.

More specifically, if still image content pieces recorded on the recording medium 51 belong to three groups indicating three characters, as shown in FIG. 20, folders 271 through 273 for the three groups (hereinafter referred to as the "character folders 271 through 273) are provided. Then, resource data for displaying at least one still image belonging to each group is included in the corresponding one of the character folders 271 through 273. As the resource data, data including the corresponding face thumbnail image and link information for linking the face thumbnail image to still image content may be used.

In this case, the character folders 271 through 273 may be stored in the recording medium 51 beforehand, or may be generated by the playback apparatus shown in FIG. 6 and then stored in the management information area 101 of the RAM 73.

A description is now given of an example of processing performed by the playback apparatus shown in FIG. 6 when the character folders 271 through 273 are stored in the management information area 101 of the RAM 73.

In this case, among the states shown in FIG. 9, the state of the playback apparatus is the still-image selection screen display state S3-3, which has not been discussed.

The still-image selection screen display state S3-3 is the state in which a still-image selection GUI image is displayed.

The still-image selection GUI image is a GUI image that allows a corresponding typical face thumbnail image to be displayed as the index of each character file and that receives an operation for selecting a typical face thumbnail image associated with a desired character file. In this case, after selecting one character file from the GUI image, a list of thumbnail images included in the selected character file may be displayed as a GUI image, and such a GUI image is also referred to as the still-image selection GUI image. Specific examples of the still-image selection GUI image are described below with reference to FIGS. 22 through 25.

A software button for displaying such a still-image selection GUI image is included in the file selection GUI image displayed in the general display state S3-1, though it is not shown. If the software button is operated, it is determined that the state transition condition C8 is satisfied, and the state of the playback apparatus is shifted from the general display state S3-1 to the still-image selection screen display state S3-3.

After the playback apparatus is shifted to the still-image selection screen display state S3-3, the control unit 71 shown in FIG. 6 executes display processing for a still-image selection GUI image.

Figure 21:
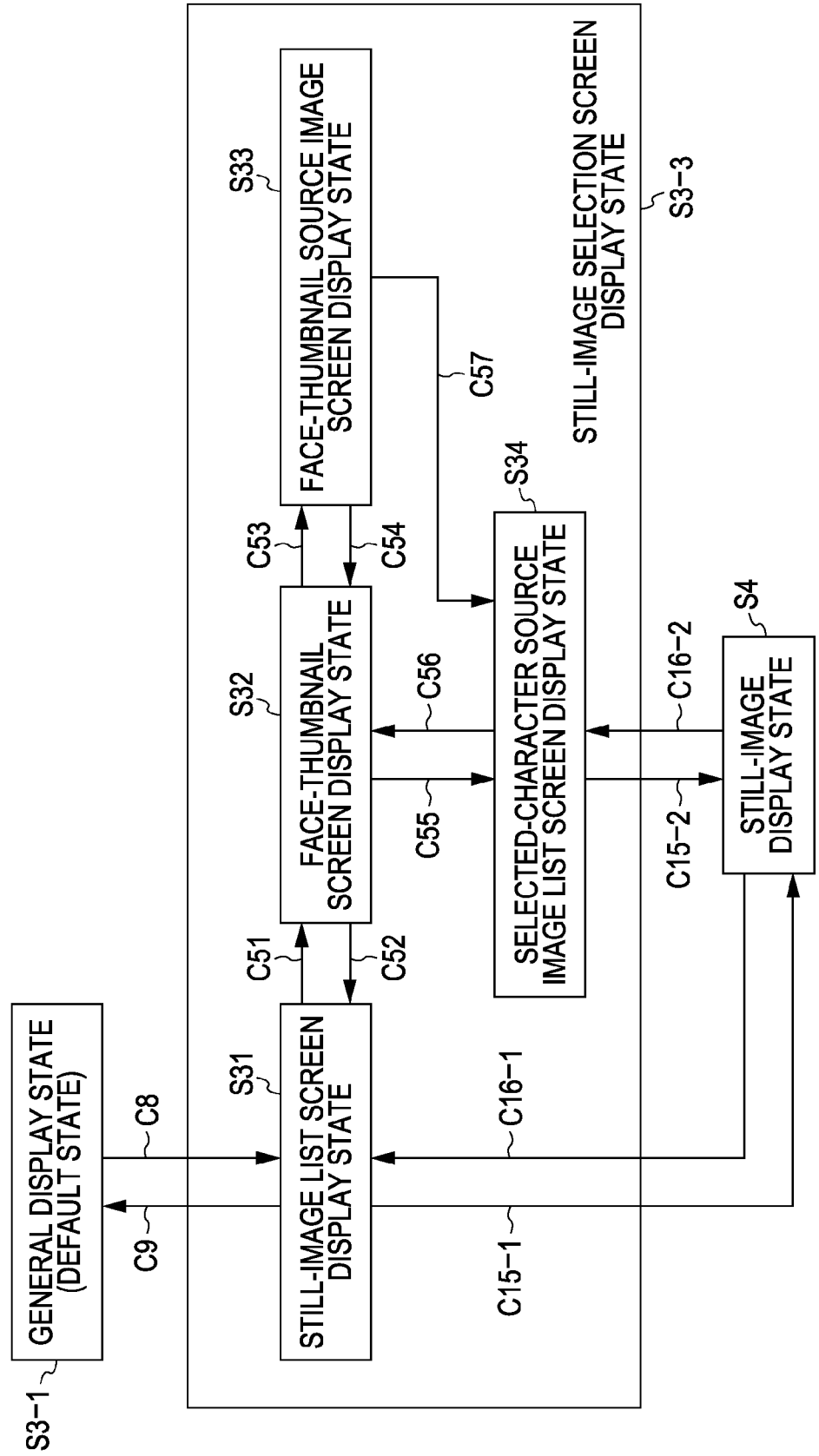
FIG. 21 is a state transition diagram illustrating details of a still-image selection screen display state shown in FIG. 9.

More specifically, in this embodiment, the still-image selection screen display state S3-3 includes, as shown in FIG. 21, four states, such as a still-image list screen display state S31, a face-thumbnail screen display state S32, a face-thumbnail source image screen display state S33, a selected-character source image list screen display state S34.

The playback apparatus shifts from the general display state S3-1 to the still-image list screen display state S31. That is, the still-image list screen display state S31 is the default of the still-image selection screen display state S3-3.

After the playback apparatus is shifted to the still-image list screen display state S31, the control unit 71 performs display processing for a still-image list GUI image.

A software button for redisplaying, for example, a file selection GUI image, is contained in the still-image list GUI image. If the software button is operated, it is determined that the state transition condition C9 is satisfied, and the state of the playback apparatus is shifted from the still-image list screen display state S31 to the general display state S3-1.

The still-image list GUI image is a GUI image that allows a list of thumbnail images associated with all pieces of still-image content included in a selected folder to be displayed as the index of the still-image content pieces and that receives an operation for selecting a desired thumbnail image from the list, though it is not shown.

If a predetermined thumbnail image is selected while the still-image list GUI image is being displayed, that is, if an instruction to play back the still image content corresponding to the selected thumbnail image is given, it is determined that the state transition condition 015-1 is satisfied, and the state of the playback apparatus is shifted from the still-image list screen display state S31 to the still-image display state S4.

After the playback apparatus is shifted to the still-image display state S4, the control unit 71 plays back the still-image content for which a playback instruction operation has been performed. That is, if the state of the playback apparatus is shifted to the still-image display state S4 since the state transition condition S15 is satisfied, the still-image content is read from the recording medium 51 and is played back. That is, the still image is displayed on the image display unit 79 shown in FIG. 6. The playback operation for the still image content is basically similar to the playback operation for moving-picture content, except that the still-image decoder 77 shown in FIG. 6 is used instead of the video decoder 76 shown in FIG. 6, and an explanation thereof is thus omitted.

If an instruction to stop the playback operation for the still-image content is given, it is determined that the state transition condition C16-1 is satisfied, and the state of the playback apparatus is shifted from the still-image display state S4 to the still-image list screen display state S31.

As stated above, in the still-image list GUI, all pieces of still-image content are displayed. Accordingly, if the number of still-image content pieces is large, the number of thumbnail images also becomes large. It is thus hard for the user to select a desired one of many thumbnail images.

Thus, in this embodiment, as stated above, a typical face thumbnail image representing each character is associated with the corresponding character folder. A GUI image that allows a list of the typical face thumbnail images to be displayed and receives an operation for selecting a desired typical face thumbnail image is provided. Such a GUI image is also referred to as the "face thumbnail GUI image".

A software button for displaying, for example, a face thumbnail GUI image, is contained in the still-image list GUI image, though it is not shown. If the software button is operated, it is determined that the state transition condition C51 is satisfied, and the state of the playback apparatus is shifted from the still-image list screen display state S31 to the face-thumbnail screen display state S32.

After the playback apparatus is shifted to the face-thumbnail screen display state S32, the control unit 71 executes display processing for a face thumbnail GUI image.

Figure 22:
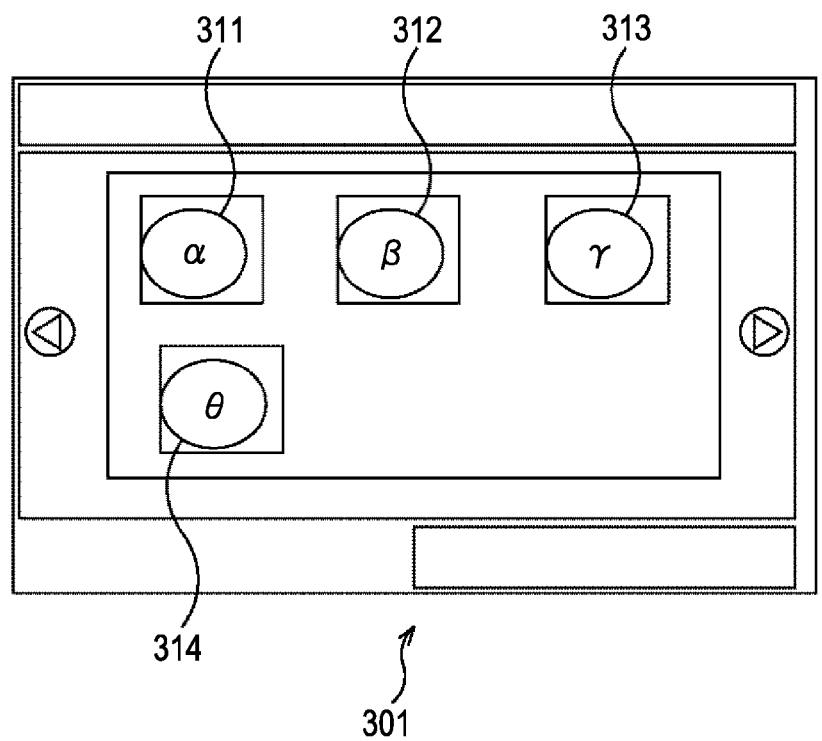
FIG. 22 illustrates an example of images displayed when the playback apparatus is in the face-thumbnail screen display state shown in FIG. 21.

Then, a face thumbnail GUI image 301, such as that shown in FIG. 22, is displayed. In the example shown in FIG. 22, a list of typical face thumbnail images 311 through 314 as the indexes of the four character folders is displayed in the face thumbnail GUI image 301.

In each of the typical face thumbnail images 311 through 314, an image of the corresponding character's face is contained. For easy understanding, however, in the example shown in FIG. 22, $\alpha$, $\beta$, $\gamma$, and $\theta$ representing the characters' names are shown. That is, in the example shown in FIG. 22, the typical face thumbnail image 311 is the index of the character folder of the character $\alpha$ and contains the face image of the character $\alpha$. Similarly, the typical face thumbnail image 312 is the index of the character folder of the character $\beta$ and contains the face image of the character $\beta$. The typical face thumbnail image 313 is the index of the character folder of the character $\gamma$ and contains the face image of the character $\gamma$. The typical face thumbnail image 314 is the index of the character folder of the character $\theta$ and contains the face image of the character $\theta$.

Figure 23:
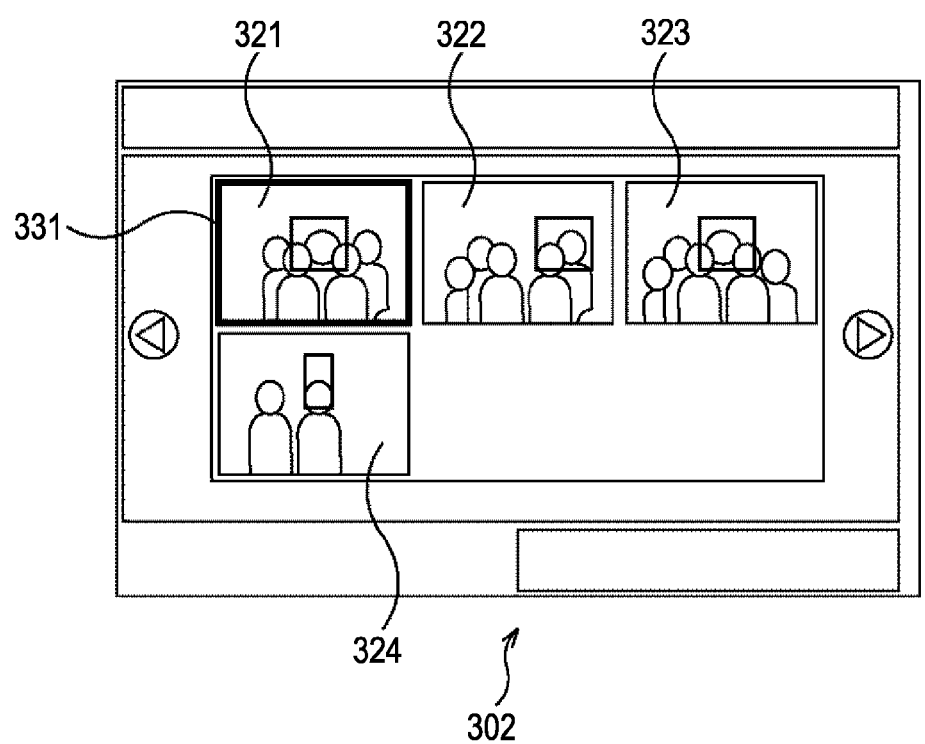
FIG. 23 illustrates an example of images displayed when the playback apparatus is in the face-thumbnail source image screen display state shown in FIG. 21.

In this embodiment, not only typical face images, but also a GUI image 302 including source still images from which the typical face images are extracted are displayed, as shown in FIG. 23, as the indexes of the character folders. The GUI image 302 is referred to as the "face-thumbnail source image GUI image 302".

In the example shown in FIG. 23, a list of thumbnail images 321 through 324, which are source still images from which the typical face thumbnail images 311 through 314, respectively, shown in FIG. 22 are extracted, is displayed in the face-thumbnail source image GUI image 302. A description of a cursor 331 is given below.

A software button for displaying the face-thumbnail source image GUI image 302 shown in FIG. 23 is contained in the face thumbnail GUI image 301 shown in FIG. 22, though it is not shown. If the software button is operated, it is determined that the state transition condition C53 shown in FIG. 21 is satisfied, and the state of the playback apparatus is shifted from the face-thumbnail screen display state S32 to the face-thumbnail source image screen display state S33.

After the playback apparatus is shifted to the face-thumbnail source image screen display state S33, the control unit 71 executes display processing for the face-thumbnail source image GUI image 302. Then, the face-thumbnail source image GUI image 302 shown in FIG. 23 is displayed.

A software button for displaying the face thumbnail GUI image 301 shown in FIG. 22 is contained in the face-thumbnail source image GUI image 302 shown in FIG. 23, though it is not shown. If the software button is operated, it is determined that the state transition condition C54 shown in FIG. 21 is satisfied, and the state of the playback apparatus is shifted from the face-thumbnail source image screen display state S33 to the face-thumbnail screen display state S32.

Figure 24:
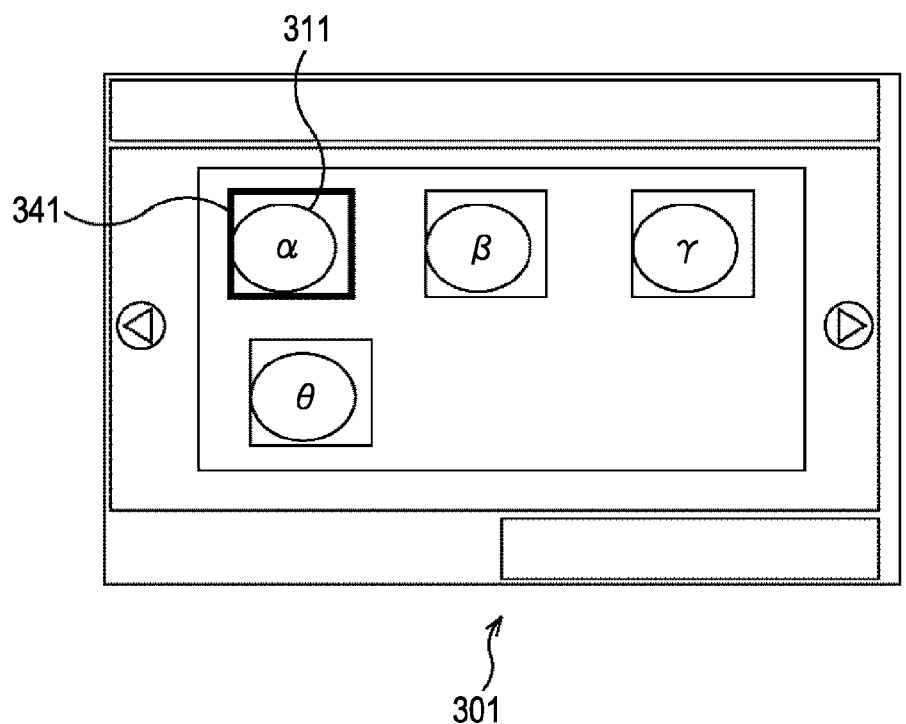
FIG. 24 illustrates an example of images displayed when the playback apparatus is in the face-thumbnail screen display state shown in FIG. 21.

While the face thumbnail GUI image 301 shown in FIG. 22 is being displayed, as shown in FIG. 24, the user can operate the operation unit 80 to move a cursor 341 to the desired typical face thumbnail image 311 and then performs a predetermined operation on the operation unit 80 to give an instruction to play back the character folder corresponding to the typical thumbnail image 311 at which the cursor 341 is positioned, i.e., the character folder of the character α.

Similarly, while the face thumbnail GUI image 302 shown in FIG. 23 is being displayed, as shown in FIG. 23, the user can operate the operation unit 80 to move the cursor 331 to the desired typical face thumbnail image 321 and then performs a predetermined operation through the operation unit 80 to give an instruction to play back the character folder corresponding to the typical thumbnail image 321 at which the cursor 331 is positioned, i.e., the character folder of the character α.

In this manner, if an instruction to play back the character folder of the character α is given in the state in which face thumbnail GUI image 301 shown in FIG. 24 is being displayed, it is determined the state transition condition C55 shown in FIG. 21 is satisfied. If an instruction to play back the character folder of the character α is given in the state in which face thumbnail source image GUI image 302 shown in FIG. 23 is being displayed, it is determined the state transition condition C57 shown in FIG. 21 is satisfied. As a result, the state of the playback apparatus is shifted to the selected-character source image list screen display state S34.

After the playback apparatus is shifted to the selected-character source image list screen display state S34, the control unit 71 executes display processing for the selected-character source image list GUI image.

The selected-character source image list GUI image is a GUI image that allows all still-image content pieces contained in the selected character folder, i.e., the still image content pieces containing the selected character, to be displayed as a list of thumbnail images and that receives an operation for selecting a predetermined thumbnail image.

Figure 25:
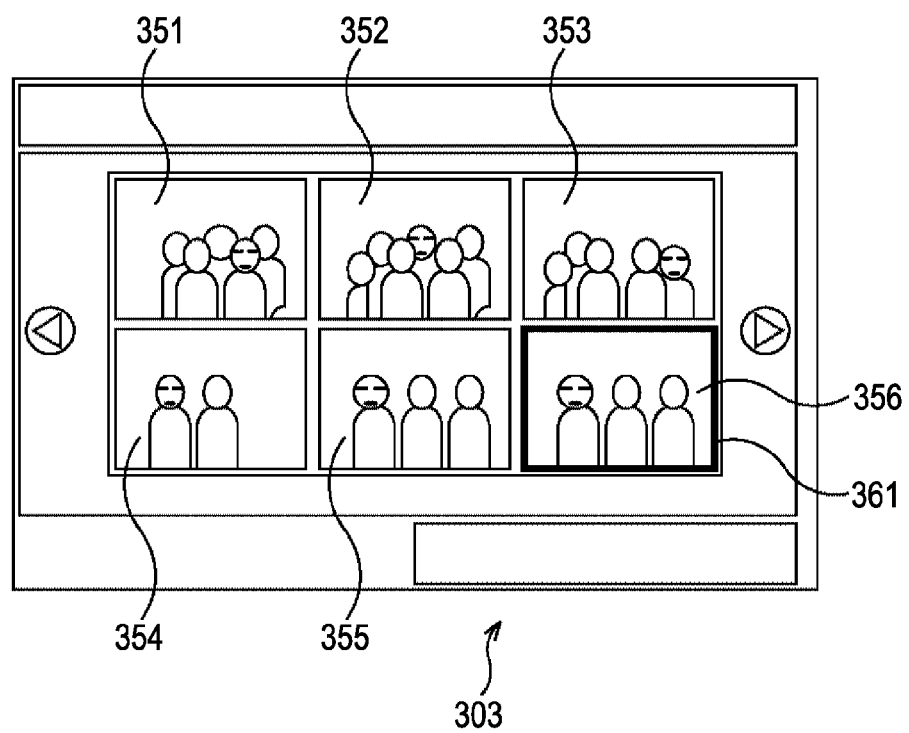
FIG. 25 illustrates an example of images displayed when the playback apparatus is in the selected-character source image list screen display state shown in FIG. 21.

For example, since the character folder of the character α is selected, still images 351 through 356 containing the images of the character α are displayed, as shown in FIG. 25, in a selected-character source image list GUI image 303 as a list of thumbnail images.

A software button for displaying, for example, the face thumbnail GUI image 301 shown in FIG. 22, is included in the selected-character source image list GUI image 303, though it is not shown. If the software button is operated, it is determined that the state transition condition C56 shown in FIG. 21 is satisfied, and the state of the playback apparatus is shifted from the selected-character source image list screen display state S34 to the face-thumbnail screen display state S32.

While the selected-character source image list GUI image 303 shown in FIG. 25 is being displayed, the user can operate the operation unit 80 to move a cursor 361 to the desired thumbnail image 356 and then performs a predetermined operation through the operation unit 80 to give an instruction to play back the still image content corresponding to the thumbnail image 356 at which the cursor 361 is positioned.

In response to an instruction to play back still image content, it is determined that the state transition condition C15-2 shown in FIG. 21 is satisfied, and the state of the playback apparatus is shifted from the selected-character source image list screen display state S34 to the still image display state S4.

After the playback apparatus is shifted to the still image display state S4, the control unit 71 plays back the still image content for which a playback instruction operation is performed. That is, if the playback apparatus is shifted to the still image display state S4 since the state transition state C15-1 is satisfied, the still image content is read from the recording medium 51 and is played back. More specifically, a GUI 304 including the still image 356 to be played back is displayed, as shown in FIG. 26.

Figure 26:
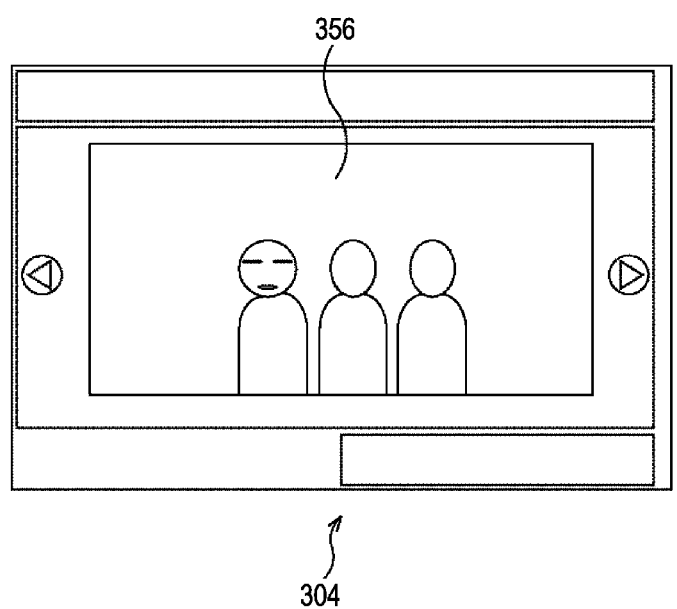
FIG. 26 illustrates an example of images displayed when the playback apparatus is in the still image display state shown in FIG. 21.

For the simplicity of description, the still images 356 shown in FIGS. 25 and 26 are indicated by the same reference numerals. In practice, however, the still image 356 shown in FIG. 26 is the original size (original resolution), and a reduced image of the real image having the original size is used as a thumbnail image in the selected-character source image list GUI image 303 shown in FIG. 25.

If an instruction to stop playing back the still image content, it is determined that the state transition condition C16-2 shown in FIG. 21 is satisfied, and the state of the playback apparatus is shifted from the still image display state S4 to the selected-character source image list screen display state S34.

The processing to be performed in response to an instruction to play back still image content has been discussed with reference to FIGS. 21 through 26. In this description, the entity executing the processing is the playback apparatus configured as shown in FIG. 6. However, the entity executing the processing is not restricted to the playback apparatus shown in FIG. 6, and the recording/playback apparatus shown in FIG. 17, for example, may be the entity performing the processing.

In this case, the collective write/transfer technique discussed with reference to FIG. 15 can be applied to the recording/playback apparatus shown in FIG. 17. Accordingly, by the application of the collective write/transfer technique to still image content, the following processing can be executed. In the recording/playback apparatus shown in FIG. 17, a new character folder may be generated and a typical face thumbnail image corresponding to the character folder may be added to the face thumbnail GUI image 301. Alternatively, the new character folder and the corresponding still image content pieces may be recorded on an external medium, such as the recording medium 51, or may be transferred to an external apparatus (not shown) via a network.

Figure 27:
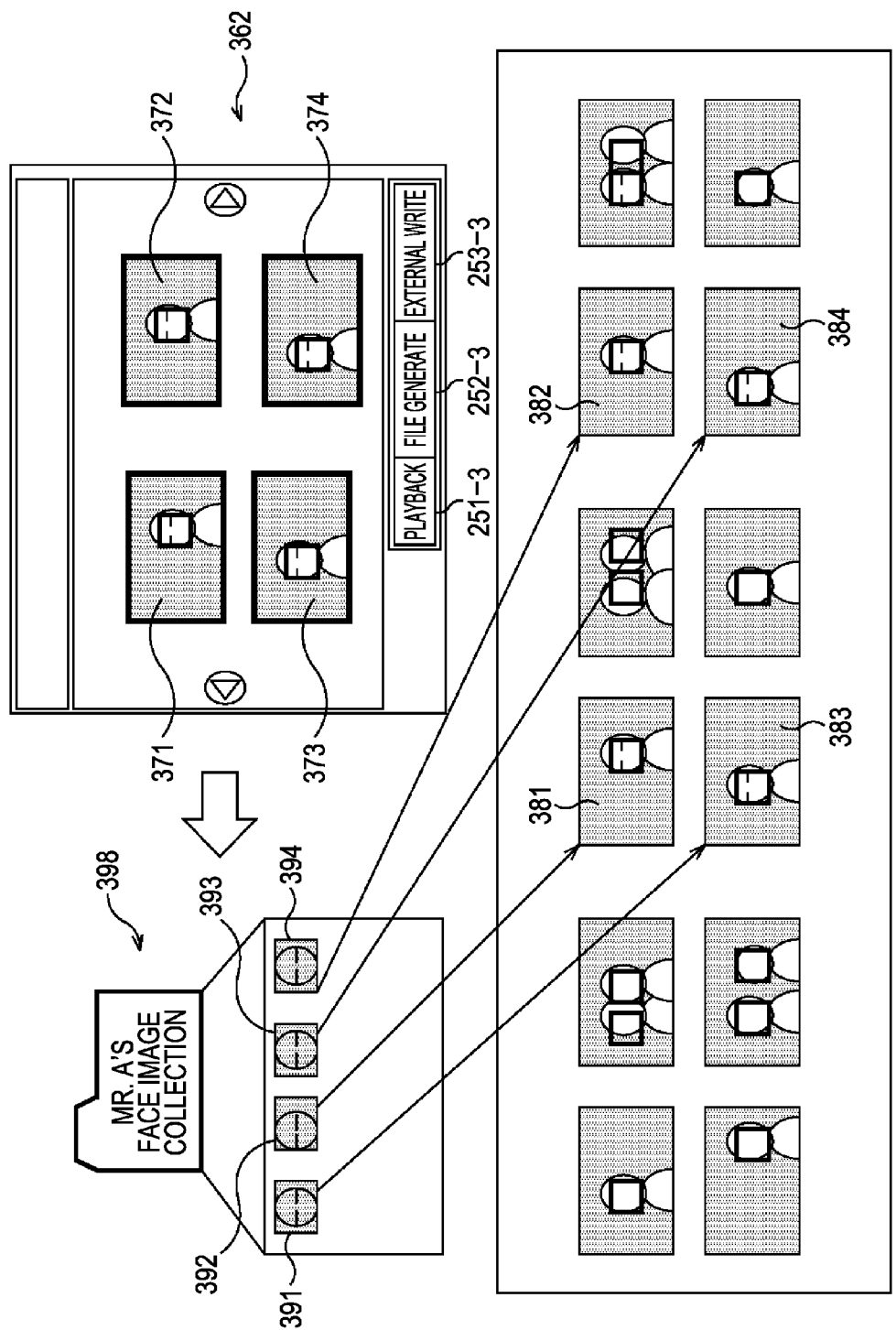
FIG. 27 illustrates an example of images displayed when a collective write transfer technique is applied to still image content.

More specifically, as shown in FIG. 27, a playback button 251-3, a file generate button 252-3, and an external write button 253-3, similar to the counterparts shown in FIG. 16, are added to a still-image list GUI image 362. With this arrangement, the recording/playback apparatus shown in FIG. 17 can perform the following processing.

In the example shown in FIG. 27, thumbnail images 371 through 374 in the still-image list GUI image 362 are formed as the indexes of still image content pieces 381 through 384, respectively.

It is now assumed, for example, that after selecting all the thumbnail images 371 through 374 in the still-image list GUI image 362, the file generate button 252-3 or the external write button 253-3 is operated.

In this case, the control unit 71 of the recording/playback apparatus shown in FIG. 17 generates resource data items 391 through 394 for playing back the still image content pieces 381 through 384, respectively, and records a temporary folder 398 including the resource data items 391 through 394 in, for example, the management information area 101 of the RAM 73. As the resource data items 391 through 394, the face thumbnail images associated with the still image content pieces 381 through 384 and link information for linking the face thumbnail images with the still image content pieces 381 through 384 may be used. In this case, one of the face thumbnail images can be used as the typical face thumbnail image.

If the file generate button 252-3 is operated, the content management information controller 93 shown in FIG. 17 writes the information concerning the temporary folder 398 into the common management information area of the RAM 73 to convert the temporary folder 398 into a permanent folder. Then, the collective write processing is completed.

In contrast, if the external write button 253-3 is operated, the content management information controller 93 and the system controller 91 shown in FIG. 17 combine the resource data items 391 through 394 in the temporary folder 398 with the still image content pieces 381 through 384 to generate a new content file. The content management information controller 93 then records the new content on an external medium, such as the recording medium 53, as a file, or transmits the new content to another apparatus (not shown).

A description has been given of, as an application of an information processing apparatus of an embodiment of the present invention, an apparatus that can play back moving picture content or still image content recorded on the recording medium 51 shown in FIG. 4 and that can present playback instruction operation GUIs utilizing face thumbnail images.

A description is now given, as another application of an information processing apparatus of an embodiment of the present invention, an image recording apparatus that records moving picture content or still image content on the recording medium 51 so that playback instruction operation GUIs utilizing face thumbnail images can be presented.

Figure 28:
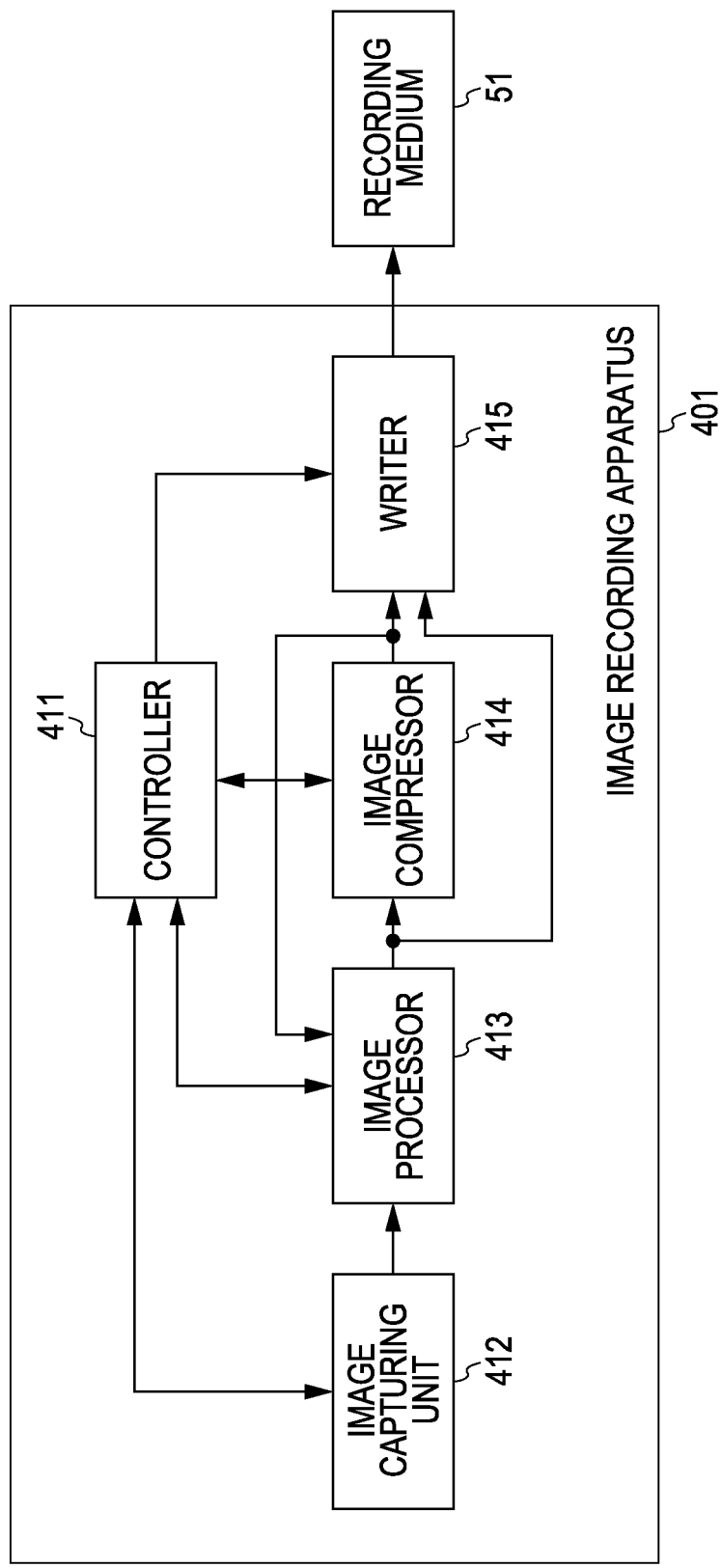
FIG. 28 is a functional block diagram illustrating an example of the functional configuration of an image recording apparatus, which serves as an information processing apparatus according to another embodiment of the present invention.

FIG. 28 illustrates an example of the functional configuration of such an image recording apparatus 401.

The image recording apparatus 401 includes a controller 411, an image capturing unit 412, an image processor 413, an image compressor 414, and a writer 415.

The controller 411 includes, for example, a central processing unit (CPU), and executes various types of control processing in accordance with a program stored in, for example, a read only memory (ROM) (not shown). That is, the controller 411 controls the operations of the image capturing unit 412, the image processor 413, the image compressor 414, and the writer 415.

The image capturing unit 412 includes, for example, a digital video camera, and captures an image of a subject and provides an image signal obtained as a result of the capturing operation to the image processor 413 in the form of a baseband signal.

The image processor 413 performs various types of image processing on the image signal supplied from the image capturing unit 412 so that the moving picture or still image corresponding to the image signal can be processed. The image processor 413 then supplies the resulting image signal to the image processor 414 in the form of a baseband signal. In this description, the image processing performed by the image processor 413 includes the above-described processing, such as specifying face zones and forming face thumbnail images and thumbnail images as the indexes of the face zones.

Information concerning the face zones and the face thumbnail images and thumbnail images are also output from the image processor 413 to the controller 411 or the writer 415 as predetermined data. Details of the image processing are discussed below.

The image compressor 414 performs predetermined compression-coding processing on the image signal supplied from the image capturing unit 412 via the image processor 413 in the form of a baseband signal. More specifically, the image compressor 414 performs, for example, MPEG decode processing, if the image signal is a moving picture signal, and then supplies the resulting compressed image data to the writer 415. The compressed image data, for example, MPEG data, may sometimes be supplied to the image processor 413 as the image signal for detecting a face zone.

The writer 415 writes the image data supplied from the image compressor 414 into the recording medium 51 as image content, i.e., a file, and also writes the resource data of the image content on the recording medium 51. The resource data includes information concerning the face thumbnail images and face zones supplied from the image processor 413 or the controller 411. That is, the information concerning the face thumbnail images and face zones is written into the resource data area 53 of the recording medium 51 as pairs of face thumbnails and face-zone-meta information discussed with reference to FIG. 4.

Figure 29:
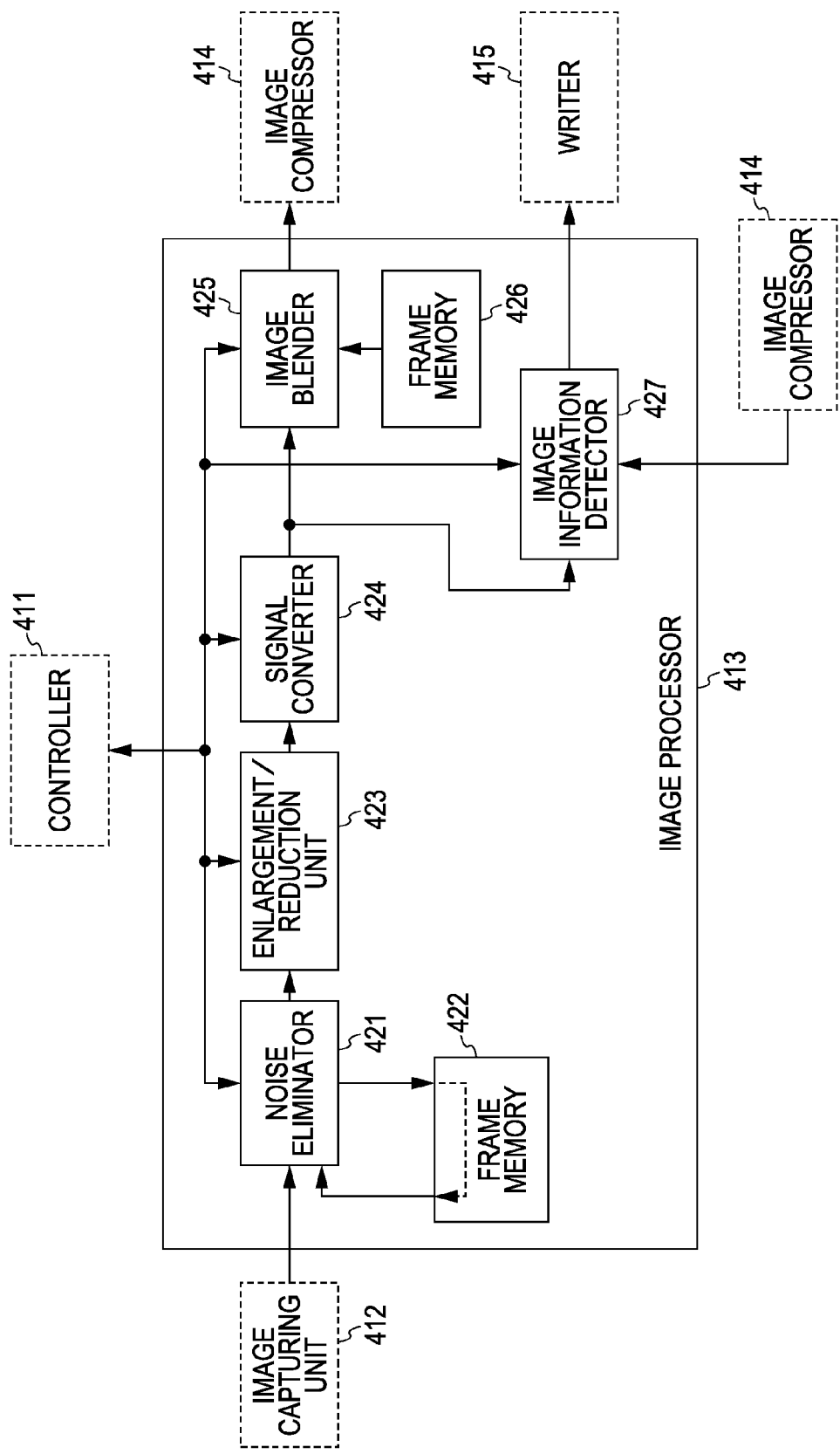
FIG. 29 is a functional block diagram illustrating an example of details of the functional configuration of an image processor of the image recording apparatus shown in FIG. 28.

FIG. 29 illustrates an example of the functional configuration of the image processor 413 of the image recording apparatus 401.

In the example shown in FIG. 29, the image processor 413 includes a noise eliminator 421, a frame memory 422, an enlargement/reduction unit 423, a signal converter 424, an image blender 425, a frame memory 426, and an image information detector 427.

The noise eliminator 421 performs noise elimination processing for eliminating unwanted noise contained in the captured image corresponding to the image signal supplied from the image capturing unit 412. The noise eliminator 421 then supplies the resulting image signal to the enlargement/reduction unit 423.

More specifically, the noise eliminator 421 performs the following processing as the noise elimination processing by using the frame memory 422. By using the image signal of the previous frame (one frame before a target frame) read from the frame memory 422 and the image signal of the target frame input from the image capturing unit 412, the noise eliminator 421 obtains noise components from the two image signals and then eliminates them from the image signal of the target frame. The noise eliminator 421 then supplies the image signal without noise to the enlargement/reduction unit 423. This image signal is written back to the frame memory 422 so that it can be used as the image signal one frame before the subsequent target frame. In this case, the parameter for adjusting the degree to which noise is eliminated is provided from the controller 411, and thus, the noise eliminator 421 can perform noise elimination processing in accordance with the image captured by the image capturing unit 412.

The enlargement/reduction unit 423 performs enlargement/reduction processing on the image signal supplied from the noise eliminator 421 in accordance with the predetermined enlargement/reduction ratio supplied from the controller 411, and then supplies the resulting image signal to the signal converter 424. If no instruction is given from the controller 411 or if the enlargement/reduction ratio is 100%, the enlargement/reduction unit 423 directly supplies the image signal to the signal converter 424 without changing the size thereof.

The signal converter 424 performs image processing concerning the type of video effect instructed by the controller 411 on the image signal supplied from the enlargement/reduction unit 423. The signal converter 424 then supplies the resulting image signal to the image blender 425 and also to the image information detector 427. The type of image processing performed by the signal converter 424 is not particularly restricted, and may be color conversion into a sepia or black-and-white color, or negative-positive inversion, or mosaic or blurring processing. The signal converter 424 may supply the image signal output from the enlargement/reduction unit 423 to the image blender 425 or the image information detector 427 without performing any image processing on the image signal.

The image blender 425 performs blending processing on the image signal supplied from the signal converter 424 in accordance with the type of blending processing instructed by the controller 411, and then supplies the resulting image signal to the image compressor 414. The type of image processing performed by the image blender 425 is not particularly restricted, and may be transparency blending processing by means of alpha (α) blending with a graphic image stored in the frame memory 426 or fader blending processing for gradually fading in or fading out with an image stored in the frame memory 426 along the time axis. The image blender 425 may output the image signal supplied from the signal converter 424 to the image compressor 414 without performing any image processing on the image signal.

Under the control of the controller 411, the image information detector 427 performs various types of image processing on the image signal supplied from the signal converter 424 or the image compressor 414 to extract character information or face information, and provides the extracted information to the writer 415 or the controller 411. The face information includes information concerning the above-described face zones and face thumbnail images.

Figure 30:
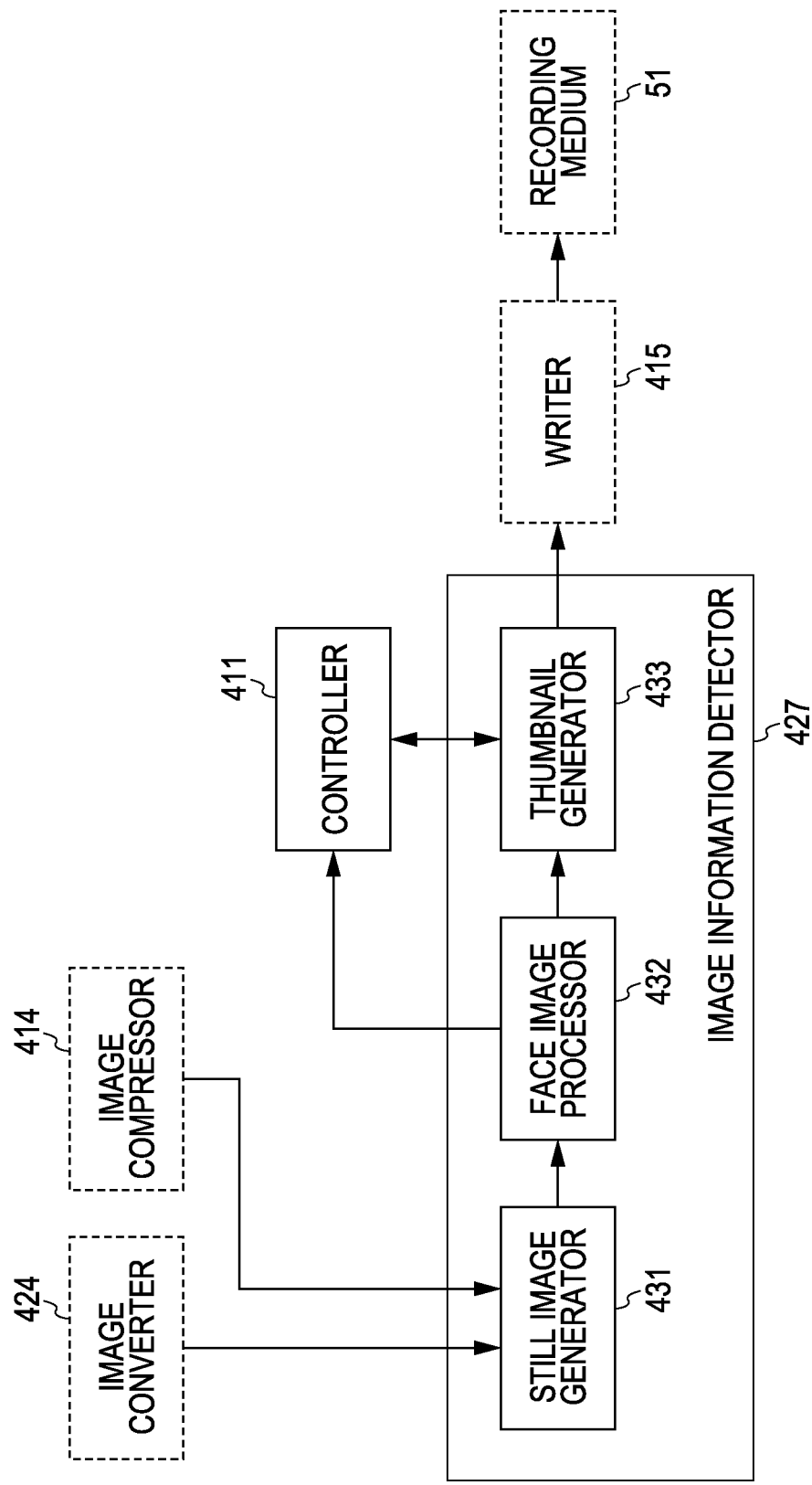
FIG. 30 is a functional block diagram illustrating an example of details of the functional configuration of an image information detector of the image processor shown in FIG. 29.

FIG. 30 illustrates an example of the functional configuration of the image information detector 427.

The image information detector 427 includes, as shown in FIG. 30, a still image generator 431, a face image processor 432, and a thumbnail generator 433.

The still image generator 431 generates a still image in the format of image data from the image signal supplied from the signal converter 424 or the image compressor 414, and then supplies the generated still image to the face image processor 432. If the image signal corresponding to a still image is supplied from the signal converter 424 or the image compressor 414, the image signal is directly supplied to the face image processor 432.

Under the control of the controller 411, the face image processor 432 performs various types of processing, such as detecting a character's face from the still image supplied from the still image generator 431 and extracting the face image from the still image. The results of the image processing are supplied to the controller 411 and the thumbnail generator 433. The results of the image processing include a face image table, which is described below with reference to FIG. 35.

Under the control of the controller 411, the thumbnail generator 433 specifies a face zone and generates a face thumbnail image as the index of the face zone by the use of the information from the face image processor 432 or the controller 411, and supplies information concerning the face zone and the face thumbnail image to the controller 411 and the writer 415.

An example of resource data generating/recording processing performed by the image information detector 427 or the controller 411 shown in FIG. 30 is described below with reference to the flowchart in FIG. 31.

The resource data generating/recording processing is processing for the resource data 65-K, in particular, a pair of a face thumbnail and face-zone-meta information of the resource data 65-K, to be recorded, together with the moving picture content 64-K, on the recording medium 51 shown in FIG. 4. More specifically, the resource data generating/recording processing is a series of processing from generating a pair of a face thumbnail and face-zone-meta information until recording the pair on the recording medium 51.

In the processing indicated by the flowchart shown in FIG. 31, the image signal supplied from the image compressor 414 is MPEG data. That is, a plurality of GOPs forming the MPEG data are sequentially supplied to the image information detector 427 in a predetermined order. In other words, the base unit for generating a still image discussed with reference to FIG. 2 is 1GOP. If the base unit is other than 1GOP, the resource data generating/recording processing discussed below can be executed by substituting the 1GOP by a corresponding base unit.

In step S101, the still image generator 431 of the image information detector 427 sets the latest GOP to be the target GOP.

In step S102, the still image generator 431 generates a still image from the target GOP. In step S102, the approach to generating a still image is not particularly restricted. In this case, since MPEG data is supplied in the form of GOPs, the approach discussed with reference to FIG. 3 can be employed.

In step S103, the still image generator 431 changes the size of the still image and supplies the resulting still image to the face image processor 432.

Then, in step S104, the face image processor 432 attempts to detect faces from the still image. The technique for detecting faces is not particularly restricted. In this case, if a plurality of faces are contained in the still image, they are detected one by one.

In step S105, the face image processor 432 determines whether a face has been detected.

If it is determined in step S105 that one face has been detected, the process proceeds to step S106. In step S106, the face image processor 432 generates face detection information concerning the detected face, which is discussed below.

Then, the process returns to step S104. That is, if a plurality of faces are contained in the still image, they are sequentially detected, and face detection information concerning each of the plurality of faces is generated.

Specific examples of the face detection information are described below with reference to FIGS. 32 and 33.

Figure 32:
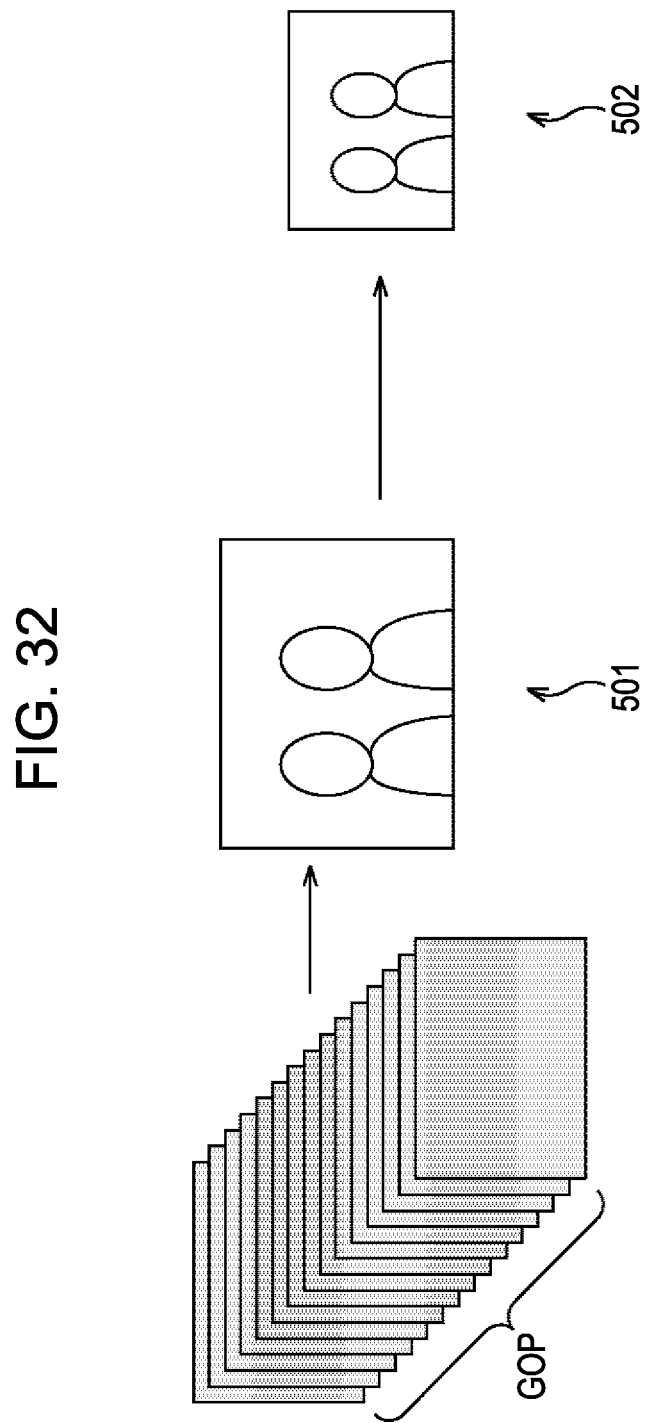
FIGS. 32 through 34 illustrate specific examples of processing results of the resource data generating/recording processing shown in FIG. 31.

For example, in step S101, the GOP shown in FIG. 32 is set to be the target GOP, and in step S102, a still image 501 is generated. Then, in step S103, the size of the still image 501 is changed, resulting in a still image 502.

Figure 33:
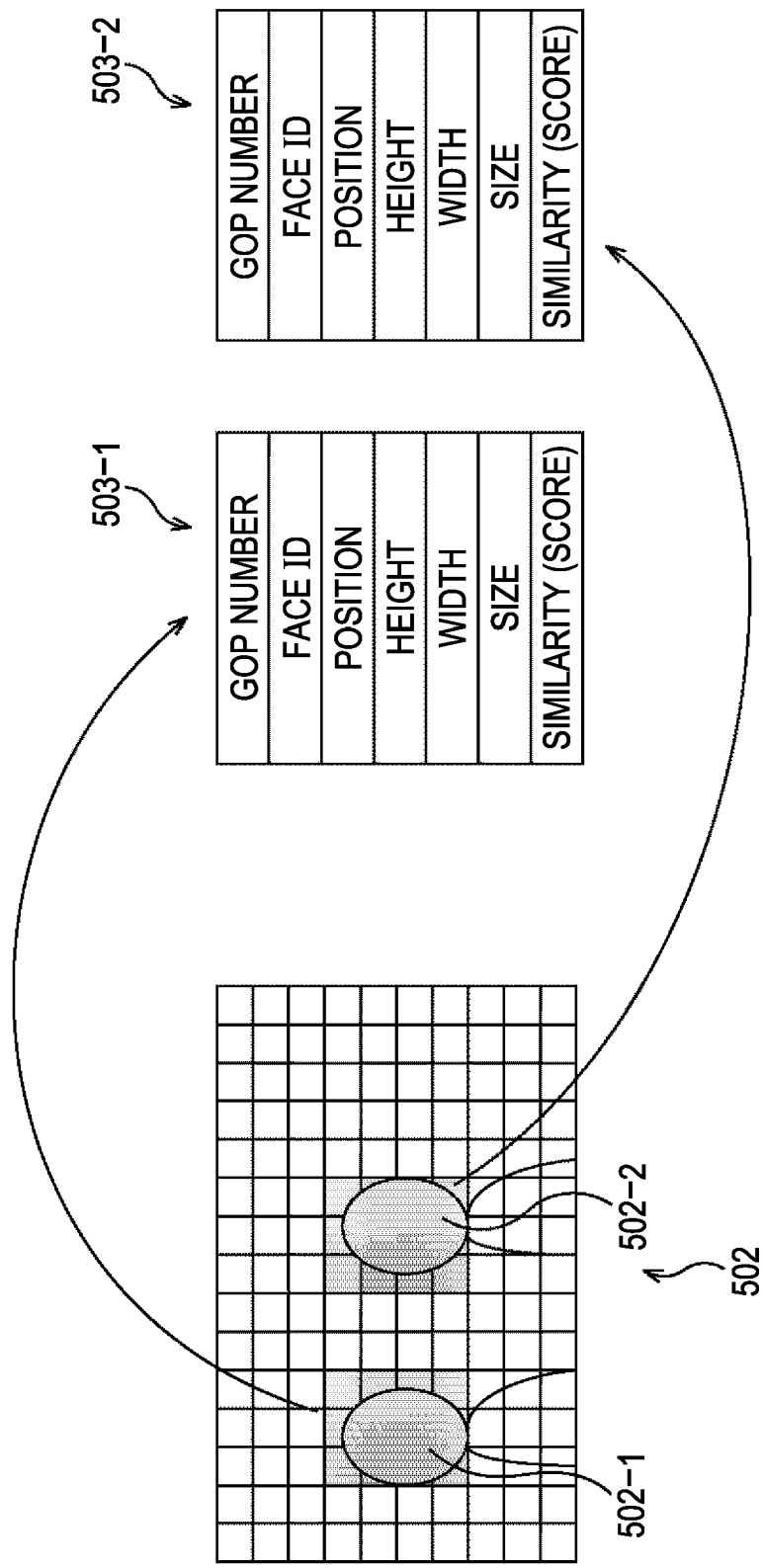

The still image 502 contains face areas 502-1 and 502-2 (hereinafter simply referred to as the "faces 502-1 and 502-2), as shown in FIG. 33.

In this case, in step S104, the face 502-1 is detected. After it is determined in step S105 that a face has been detected, in step S106, face detection information 503-1 is generated, as shown in FIG. 33.

In the example shown in FIG. 33, the face detection information 503-1 includes the GOP number, face ID, position, height, width, size, and similarity (score). The GOP number is the number appended to the target GOP. The face ID is an identifier for distinguishing the face 502-1 from other faces. The position is the position of the face 502-1 in the still image 502, and more specifically, the position of the pixel at the top left of the face 502-1. The height is the number of vertical pixels of the face 502-1. The width is the number of horizontal pixels of the face 502-1. The size is the size of the face 502-1, i.e., the resolution. The similarity (score) is discussed below, and at the time point in step S106, a predetermined initial value, for example, 0, is set.

After generating the face detection information 503-1, the process returns to step S104 in which the face 502-2 is detected. After it is determined in step S105 that a face has been detected, in step S106, face detection information 503-2 shown in FIG. 33 is generated.

Then, the process returns to step S104, and at this point, no face is contained in the still image 502. Accordingly, it is determined in step S105 that no face has been detected, and the process proceeds to step S107.

In step S107, the face image processor 432 determines whether at least one item of face detection information has been generated.

If no face is contained in the still image, though such a case is not shown, a face is not detected nor is face detection information generated. In this case, it is determined in step S107 that face detection information has not been generated, and the process proceeds to step S110.

In contrast, if at least one face is contained in the still image and has successfully been detected, at least one item of face detection information is generated. It is thus determined in step S107 that at least one item of face detection information has been generated, and the process proceeds to step S108.

In step S108, the face image processor 432 extracts each of at least one face image from the still image on the basis of the corresponding item of face detection information.

Figure 34:
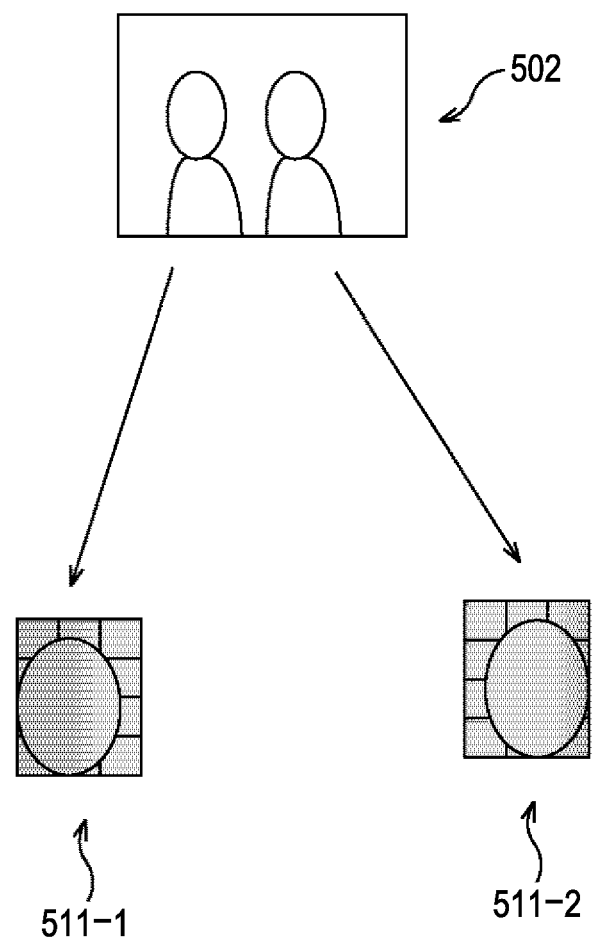

More specifically, if two items of face detection information 503-1 and 503-2, such as those shown in FIG. 33, are generated, face images 511-1 and 511-2 shown in FIG. 34 are extracted. The face image 511-1 is a still image corresponding to the face 502-1 of the still image 502 shown in FIG. 33, and the face image 511-2 is a still image corresponding to the face 502-2 of the still image 502 shown in FIG. 33.

In step S109, the face image processor 432 performs various types of processing necessary for generating or updating a table, such as that shown in FIG. 35.

If the GOP number of the target GOP is 1, a new table is generated. At this stage, the table includes columns representing the typical face image of the GOP number 1 and only one row representing the GOP number 1. Then, when the GOP number of the target GOP is i (in the example shown in FIG. 35, i is any value from 1 to n), the line corresponding to the GOP number i is added to the table, and "face information" or "no face information" is listed in the table shown in FIG. 35. In this manner, the table is updated.

More specifically, in the table shown in FIG. 35, the following information is indicated in the row of the GOP number i. Each column in the table shown in FIG. 35 represents a character appearing in the moving picture content for which resource data is to be generated. In the example in FIG. 35, for simple representation, characters' names A through H are indicated at the top of the columns. However, it is not essential that such characters' names be indicated in the actual table. It is assumed that, in this table, the character corresponding to one column is different from the character corresponding to another column. In the real world, however, they may be the same person. That is, for example, although the character B and the character D are the same person (person b in FIG. 36) in the real world, they are considered to be different characters in the example shown in FIG. 35. This is described in detail below with reference to FIG. 36.

For example, in the leftmost column of the table in FIG. 35, i.e., at the top of the column indicating the character A, the typical face image of the character A is stored in the form of image data. The typical face image of the character A is a predetermined face image of the face images of the character A extracted in step S108 in FIG. 31, which is performed on each of the GOP numbers 1 through n. In this embodiment, the first face image is used as the typical image.

In the column representing the character A, "face information" or "no face information" is indicated in the line i. If "face information" is indicated in the line i, it means that the character A is contained in the still image generated from the GOP number i. In contrast, if "no face information" is indicated in the line i, it means that the character A is not contained in the still image generated from the GOP number i. An approach to determining whether or not the character A is contained is not particularly restricted. A specific example of this approach is discussed below with reference to FIGS. 38 through 41.

The table shown in FIG. 35 is referred to as the "face image table". The above-described processing in step S109, and more specifically, the face image table shown in FIG. 35 is generated when the GOP number of the target GOP is 1, and "face information" or "no face information" is indicated in each column of the line of the GOP 1. If the GOP number of the target GOP is i, "face information" or "no face information" is indicated in each column of the line of the GOP i. Such processing is referred to as the "face image table generating/updating processing". Details of the face image table generating/updating processing in step S109 are given below with reference to FIGS. 38 through 42.

After step S109, in step S110, the face image processor 432 determines whether the target GOP is the final GOP.

If the target GOP is not the final GOP, the process returns to step S101. In the example shown in FIG. 35, since the final GOP is the GOP number n, loop processing from step S101 to step S110 is repeated on each of the GOP number 1 to the GOP number n.

After finishing the face image table generating/updating processing for the final GOP number n in step S109, the face image table is updated as shown in FIG. 35, and it is determined in step S110 that the target GOP is the final GOP. Then, the face image table is supplied to the thumbnail generator 433.

Then, in step S111, the thumbnail generator 433 generates a face thumbnail image and specifies a face zone for each character on the basis of the face image table. Step S111 is performed for each character registered in the face image table, and more specifically, each of the character A through the character H in the example shown in FIG. 35.

Step S111 is described in details below with reference to FIGS. 36 and 37.

FIG. 36 is timing charts illustrating information concerning the character A through the character E in the face image table shown in FIG. 35. In FIG. 36, the horizontal axis represents the GOP number, and the vertical axis designates the persons, a, b, c, and d. The timing charts are indicated by the accumulation of rectangles with oval shapes therein in the horizontal direction. Each rectangle with an oval shape indicates one face image extracted from a predetermined GOP. That is, if a face image is indicated in the GOP number i, it means that there is an indication of "face information" in the GOP number i in the table shown in FIG. 35. If no face image is indicated, it means that there is an indication of "no face information" in the GOP number i. The upper-case alphabets below the timing charts represent the characters' names in the example shown in FIG. 35.

It should be noted that, in the example in FIG. 35, upper-case alphabets are used as the characters' names, and in the example in FIG. 36, lower-case alphabets with the indication of real persons are used as the characters' names. That is, the characters A through E indicated by the upper-case alphabets in the example in FIG. 35 are characters detected by the image information detector 427, as discussed below. Conversely, the persons a through d indicated by the lower-case alphabets in the example in FIG. 36 are persons in the real world. The character B and the character D detected as different persons by the image information detector 427 are the same person b in the real world. The reason for this is discussed below.

Concerning the person a, face images are contained in the GOP numbers 1 through 3, and no face image is contained in the GOP number 4. Then, face images are again contained in the GOP numbers 5 and 6. In this manner, if face images are not generated only in a short interval, i.e., in a few GOPs, it is considered that the same character A is still appearing. That is, in this case, the thumbnail generator 433 specifies the face zone of the character A, not as a zone from the GOP 1 to the GOP 3, but as a zone 521-A from the GOP 1 to GOP 6, as shown in FIG. 37. The thumbnail generator 433 then generates a face thumbnail image 522-A as the index of the face zone 521-A of the character A.

The technique for generating the face thumbnail image 522-A is not particularly limited. For example, a new thumbnail image may be generated. In this case, however, since the typical image of the character A is contained in the face image table shown in FIG. 35, it is used as the face thumbnail image 522-A. The same applies to other face thumbnail images.

Concerning the person b, face images are contained in the GOP numbers 1 through 4, and face images are not contained for a long interval, and face images are again contained in the GOP numbers n-5 to n. In this manner, if face images have not been generated for a long interval, the face image processor 432 determines that the face images generated in a set of GOPs and the face images generated in another set of GOPs belong to different characters B and D. As a result, in the face image table in FIG. 35, the same person is registered as the different characters B and D. This is discussed in detail below with reference to FIG. 42.

In this case, the thumbnail generator 433 specifies, as shown in FIG. 37, the face zone of the character B as a zone 521-B from the GOP number 1 to the GOP number 4. The thumbnail generator 433 then generates a face thumbnail image 522-B as the index of the face zone 521-B of the character B.

The thumbnail generator 433 also specifies, as shown in FIG. 37, the face zone of the character D as a zone 521-D from the GOP number n-5 to the GOP number n. The thumbnail generator 433 then generates a face thumbnail image 522-D as the index of the face zone 521-D of the character D.

The interval, which is used as the reference for determining whether characters appearing in different zones are the same person, is not particularly restricted. That is, if the interval for which no face image appears is only a short interval, it is considered to be part of a continuous face zone. In contrast, if such an interval is a long interval, it is not considered to be part of a continuous face zone. An approach to determining whether such an interval is a short interval or a long interval is not particularly restricted. The following approach, for example, may be employed. A predetermined integral multiple of the base unit for generating a face image, that is, in the example shown in FIG. 36 or 37, an integral multiple of 1GOP, is preset as a threshold, and if the interval for which no face image appears is smaller than or equal to the threshold, it is considered to be part of a face zone. If such an interval exceeds the threshold, it is not considered to be part of the face zone. Processing employing this approach is step S124 in FIG. 42, which is described below.

Concerning other persons, face zones are specified and face thumbnails are generated in a manner similar to that described above.

More specifically, concerning the person c, the thumbnail generator 433 specifies, as shown in FIG. 37, the face zone of the character C as a zone 521-C from the GOP number 2 to the GOP number n. The thumbnail generator 433 also generates a face thumbnail image 522-C as the index of the face zone 521-C of the character C.

Concerning the person d, the thumbnail generator 433 specifies, as shown in FIG. 37, the face zone of the character E as a zone 521-E from the GOP number n-3 to the GOP number n. The thumbnail generator 433 also generates a face thumbnail image 522-E as the index of the face zone 521-E of the character E.

Concerning the characters F through H shown in FIG. 35, face zones are specified and face thumbnail images corresponding to the face zones are generated, though they are not shown.

Then, step S111 in FIG. 31 is finished, and the processing result, i.e., each pair of a face zone and a face thumbnail concerning each character is supplied from the thumbnail generator 433 to the controller 411 or the writer 415.

In step S112, the controller 411 or the writer 415 generates meta-information including the face thumbnail and the face zone of each character, i.e., meta-information including each pair of face-zone-meta information and a face thumbnail. If the meta-information is generated by the controller 411, it is supplied to the writer 415.

In step S113, the writer 415 records the meta-information generated in step S112, together with the management information, on the recording medium 51 as the resource data of the content.

Then, the resource data generating/recording processing is completed.

A description is now given of, with reference to FIGS. 38 through 43, processing in step S109 of the resource data generating/recording processing shown in FIG. 31, i.e., details of the face image table generating/updating processing.

As discussed through the use of the face image table shown in FIG. 35, in the face image table generating/updating processing, "face information" or "no face information" is listed in each column of the line corresponding to the GOP number i. More specifically, for example, concerning the character A, if a face image of the character A appears in the GOP number i, "face information" is listed in the line of the GOP number i corresponding to the column representing the character A. If no face image of the character A appears in the GOP number i, "no face information" is listed in the line of the GOP number i corresponding to the column representing the character A. The same applies to the characters B through H.

In the face image table generating/updating processing, a determination as to whether a face image of a specific character appears in the target GOP number i is necessary. The algorithm for this determination, i.e., a determination technique, is not particularly restricted. In this embodiment, the technique shown in FIGS. 38 through 41 is employed. That is, the technique shown in FIGS. 38 through 41 is one of the techniques according to an embodiment of the present invention and is hereinafter referred to as the "face-image presence/absence determination technique".

Figure 38:
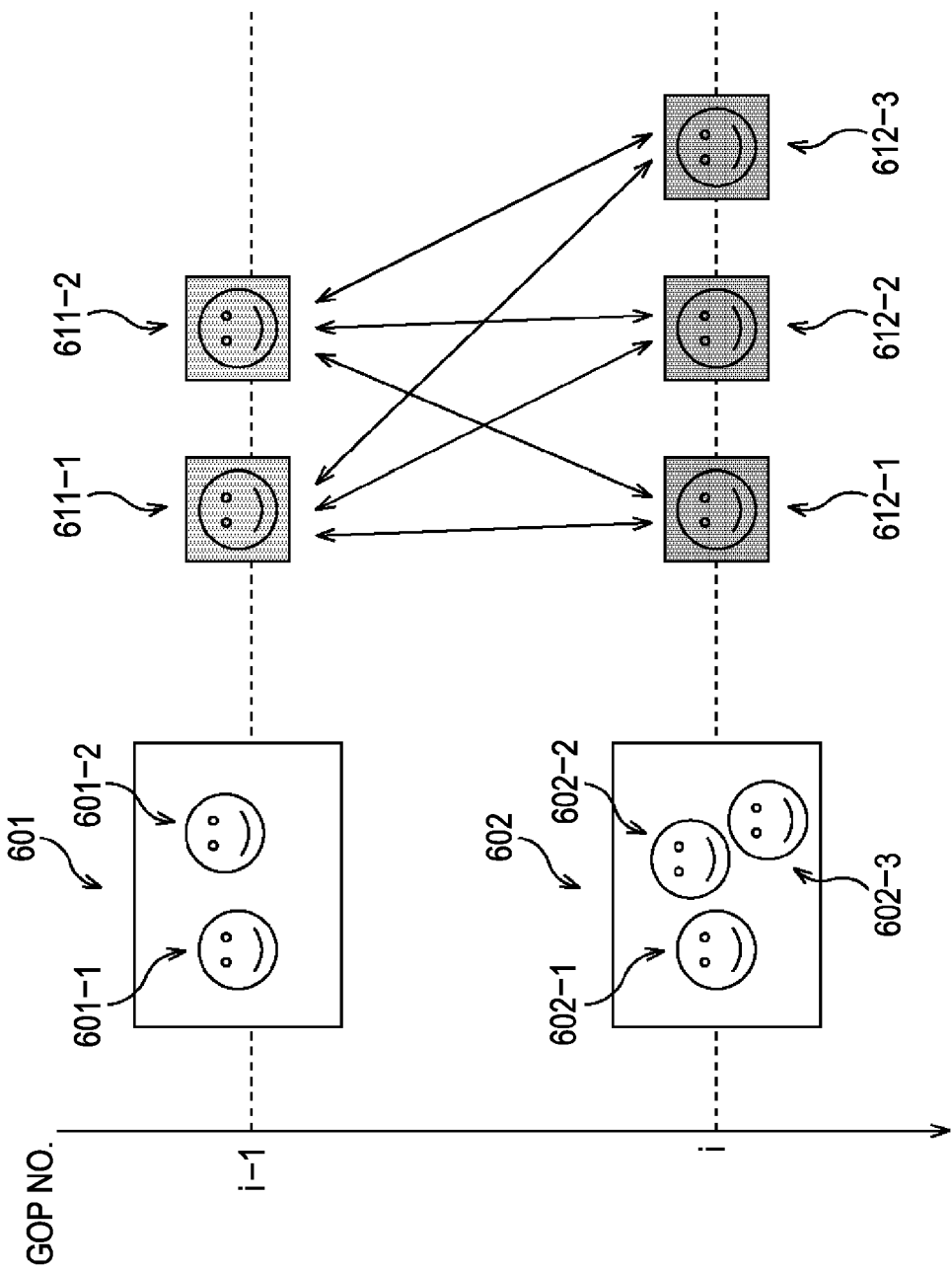
FIGS. 38 through 42 illustrate examples of operations of face image table generating/updating processing of the resource data generating/recording processing shown in FIG. 31.

In FIG. 38, a still image 602 is a still image generated from the target GOP number i in step S102 in FIG. 31. Face images 612-1 through 612-3 are face images corresponding to faces 602-1 through 602-3, respectively, detected from the still image 602 in step S104. That is, the face images extracted from the still image 602 in step S108 are the face images 612-1 through 612-3.

A still image 601 is a still image generated from the GOP one before the target GOP number i, i.e., from the GOP number i−1. Face images 611-1 and 611-2 are face images corresponding to faces 601-1 and 601-2, respectively, detected from the still image 601. That is, the face images extracted from the still image 601 are the faces images 611-1 and 611-2.

In this case, the face image processor 432 shown in FIG. 30 performs comparison processing, i.e., matching processing, on all combinations of the face images 612-1 through 612-3 of the target GOP number i with the face images 611-1 and 611-2 of the GOP number i−1. As a result of comparison, the face image processor 432 determines whether a face image in the target GOP number i and a face image in the previous GOP number i−1 belong to the same person.

The matching processing technique is not particularly restricted. In this embodiment, for example, the following technique is employed. Concerning a combination k (k is a combination number and may be any value from 1 to the total number of combinations), a predetermined computation is performed by the use of the similarity (hereinafter referred to as "ak") between a face image in the target GOP number i and a face image in the previous GOP number i−1 and the distance (hereinafter referred to as "bk") between the coordinates of the face image in the still image in the target GOP number i and the coordinates of the face image in the still image in the previous GOP number i−1. The score Sk as a result of performing the computation is used for determining whether the face image in the target GOP number i and the face image in the previous GOP number i−1 belong to the same person.

To compute the score Sk, it is sufficient that ak and bk are used. In this embodiment, for example, the score Sk is computed by the following equation (1):

$$Sk=\sqrt{\alpha *ak+\beta *bk} \quad (1)$$

where $\alpha$ and $\beta$ indicate parameters for allowing the distance and the similarity to be used for comparison processing, i.e., the parameters for normalization.

The computation method for ak is not particularly restricted, either, and for example, the similarity computation method using the principal component analysis, may be employed. For the computation method for bk, the following method may be used. Face images to be compared are generated on the basis of face detection information associated with the face images. The face detection information includes, as shown in FIG. 33, information concerning the position of a face in a still image. Accordingly, the difference between the positions indicated in the face detection information of the two face images may be set to be bk.

In this manner, the face image processor 432 shown in FIG. 30 computes the scores Sk for all combinations of face images subjected to comparison processing, and then selects pairs (matching pairs) of face images that can be determined to belong to the same person from all the combinations.

Figure 39:
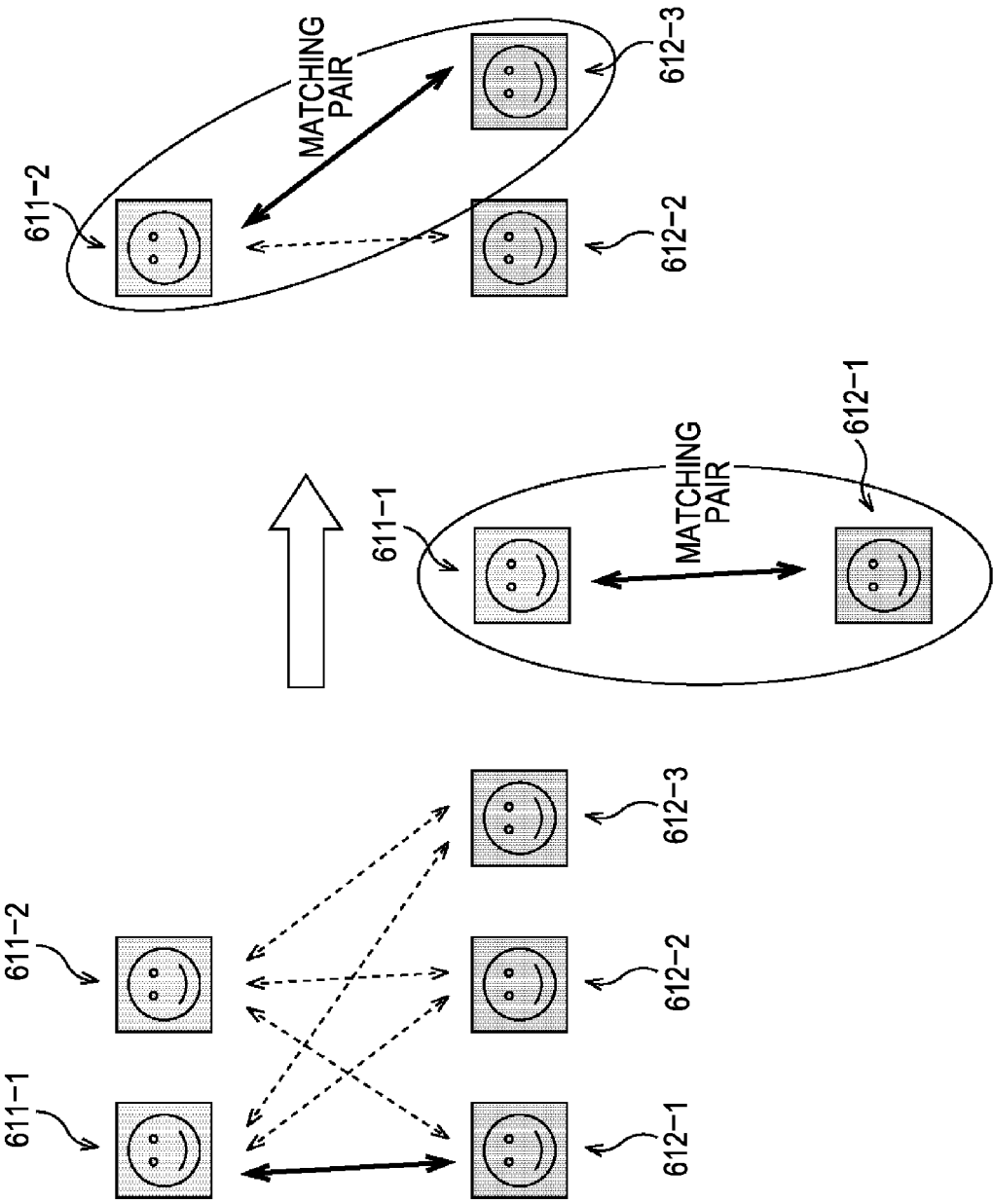

More specifically, in this embodiment, matching pairs are selected, as shown in FIGS. 39 through 41.

FIG. 39 illustrates the principle of selecting matching pairs. In FIG. 39, face images similar to those in FIG. 38, i.e., the face images 612-1 through 612-3 and the face images 611-1 and 611-2 subjected to comparison processing are shown.

In FIG. 39, a predetermined one of the face images 612-1 through 612-3 and a predetermined one of the face images 611-1 and 611-2 linked by the double-sided arrow represents a combination for which the score Sk is computed. The double sided arrow in the solid line represents the combination having the highest score Sk, and the double sided arrows in the broken lines designate other combinations. However, if a combination having the highest score Sk is smaller than or equal to a threshold, it is indicated by the double sided arrow in the broken line, and details of such a case are given below. The same applies to FIGS. 40 and 41.

As indicated by the double sided arrows shown in FIG. 39, the face image processor 432 shown in FIG. 30 selects, in principle, the combination having the highest score Sk among the existing combinations and determines the selected as a matching pair.

More specifically, as indicated by the leftmost side of FIG. 39, among all the combinations of the face images 612-1 through 612-3 and the face images 611-1 and 611-2, the face image 612-1 and the face image 611-1 are linked by the double sided arrow in the solid line, i.e., they have the highest score Sk. Accordingly, first of all, this combination is selected as a matching pair.

Then, the face image processor 432 excludes all the combinations including one of the face images 611-1 and 612-1, which are selected as a matching pair, from the candidates for the next matching pair. As a result, as indicated by the rightmost side in FIG. 39, all combinations of the face images 612-2 and 612-3 and the face image 611-2 are the candidates for the next matching pair. In this case, since the face image 612-3 and the face image 611-2 are linked by the double sided arrow in the solid line, i.e., since they have the highest score Sk, this combination is selected as a matching pair.

In the example in FIG. 39, if all the combinations including one of the face images 611-2 and 612-3, which are selected as a matching pair, are excluded, there is no combination of face images for which the score Sk is computed. Thus, matching processing is finished at this point. If combinations of face images still remain, the above-described series of processing is repeated for selecting matching pairs until no combination remain.

The principle of selecting matching pairs has been discussed with reference to FIG. 39, and in this embodiment, the technique for selecting matching pairs shown in FIGS. 40 and 41 on the basis of the principle is employed. In the examples shown in FIGS. 40 and 41, for simple representation, the face image 612-3 is omitted from comparison candidates. The matching-pair selection technique shown in FIGS. 40 and 41 is discussed below mainly by referring to the difference from the principle shown in FIG. 39.

In the example shown in FIG. 39, for simple representation, the face images in the target GOP number i are compared with only the face images 611-1 and 611-2 in the GOP number i−1, which is the GOP one before the target GOP number i. However, the still image generated from the GOP i−1 does not necessarily contain the faces of a specific character. Thus, in this embodiment, for comparing face images of a specific character, a face image in a target GOP is compared with a face image in the nearest preceding GOP (hereinafter referred to as the "latest face image").

More specifically, in the example in FIG. 40, the face image 611-1 of the character A and the face image 611-2 of the character B have been generated from the GOP number i−1, which is one before the target GOP i. A face image 610-1 of the character A and a face image 610-2 of the character B have been generated from the GOP number i−2, which is the GOP two before the target GOP number i. Then, a face image 609-2 of the character B and a face image 609-3 of the character C have been generated from the GOP number i−3, which is the GOP three before the target GOP number i.

In this case, the latest face images of the character A and the character B are the face images 611-1 and 611-2, respectively. Accordingly, as in the example in FIG. 39, the face images 611-1 and 611-2 are to be compared with the corresponding face images of the target GOP number i. However, the character C does not appear in the GOP number i−1 or the GOP number i−2, i.e., no face images of the character C have been generated. Accordingly, the face image 609-3 generated from the GOP number i−3 serves as the latest face image of the character C, and is thus compared with the face images of the target GOP number i.

In this manner, after determining face images to be compared with face images of the target GOP, in principle, the matching processing discussed with reference to FIG. 39 is conducted so that matching pairs are sequentially selected.

In the example shown in FIG. 40, as in the example shown in FIG. 39, a combination of the face images 612-1 and 611-1 is first selected as a matching pair. Accordingly, the face image 612-1 of the GOP number i is determined to be the face image of the character A, and as a result, "face information" is listed in the row number i and in the column of the character A of the face image table shown in FIG. 35.

Then, all combinations including at least one of the face images 611-1 and 612-1, which are selected as a matching pair, are excluded from possible candidates of the next matching pair. Then, in the example shown in FIG. 40, a combination of the face images 612-2 and 611-2 and a combination of the face images 612-2 and 609-3 are candidates of the next matching pair, and the next matching pair is selected from the two candidates. More specifically, since the face images 612-2 and 611-2 are linked by the double sided arrow in the solid line, i.e., since they have the highest score Sk, this combination is selected as the next matching pair. The face image 612-2 of the GOP number i is then determined to be the face image of the character B. As a result, "face information" is listed in the row number i and in the column of the character B of the face image table shown in FIG. 35.

However, even if the combination of the face images 612-2 and 611-2 has the highest score Sk among the existing combinations, if the highest score Sk is very low, it is difficult to determine that the face image 612-2 of the GOP number i is the face image of the character B. In this embodiment, by taking such a case into consideration, if the score Sk of a combination of face images is lower than or equal to a predetermined threshold, such a combination is not determined to be a matching pair (is excluded from matching-pair candidates), and the face image included in the combination is determined to be a face image of another character.

In the example shown in FIG. 41, the score Sk of a combination of the face images 612-2 and 611-2 is lower than or equal to the predetermined threshold, and as a result, the face image 612-2 is determined, not to be a face image of the character B, but to be a face image of the character D. In this case, a new column of the character D is registered in the face image table shown in FIG. 35, and "no face information" is listed in the row numbers 1 through i−1 and in the column of the character D, and "face information" is listed in the row number i and in the column of the character D.

Additionally, as shown in FIG. 36, concerning the person b in the real world, face images are not generated in a long interval after the GOP number 4, and then, a face image is again generated in the GOP number n−5. If the GOP number n−5 is the target GOP, the latest face image of the character B to be compared with the target GOP is the face image of the GOP number 4. In this case, even if the face image of the GOP number n−5 and the face image of the GOP number 4 have the highest score Sk, the interval between the two face images is too long, and thus, the face image of the GOP number n−5 is determined to a face image of the character D, which is different from the character B. In this case, the column of the character D is registered, and "no face information" is listed in the row numbers 1 through n−6, and "face information" is listed in the row number n−5.

The interval used for determining whether two face images appearing therebetween are different characters is not particularly restricted, and may be a desired value, such as an interval equivalent to three seconds.

The score of a matching pair selected as described above is listed in the field of "similarity (score)" (see FIG. 33) of the face detection information of the subject face image contained in the matching pair.

The face-image presence/absence determination technique, which is one of the techniques according to an embodiment of the present invention, has been discussed below with reference to FIGS. 38 through 41.

Figure 42:
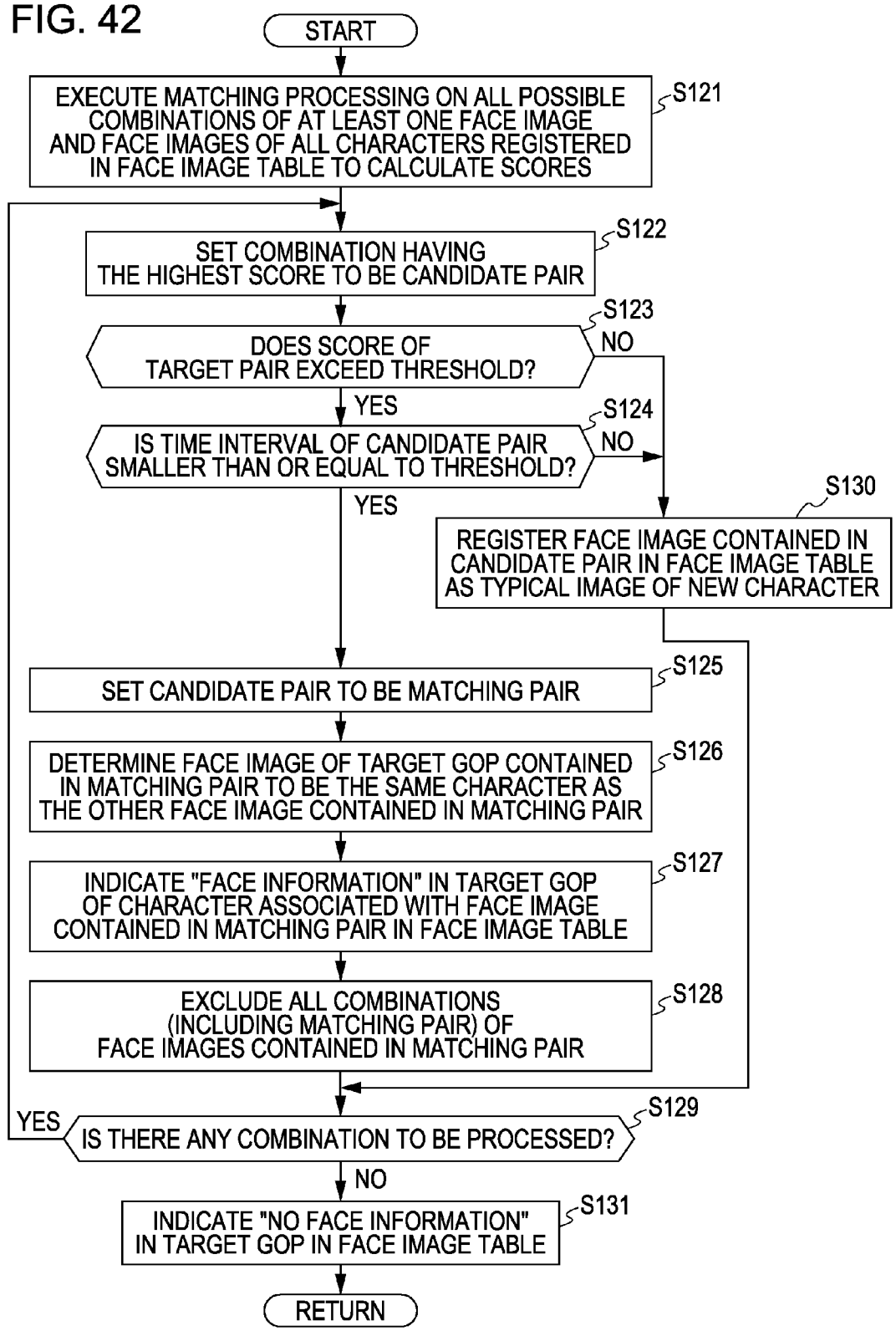

Details of step S109 in FIG. 31 to which the face-image presence/absence determination technique is applied, i.e., details of an example of the face image table generating/updating processing, are indicated by the flowchart in FIG. 42.

In step S121, the face image processor 432 shown in FIG. 30 executes matching processing on all combinations of at least one face image of a target GOP and each of the face images of all characters registered in the face image table to calculate the scores Sk.

More specifically, at least one face image of a target GOP is compared with each of the face images, which serve as the latest images, of all the characters registered in the face image table. All the characters registered in the face image table are the characters A through H in the example in FIG. 35.

In step S122, the face image processor 432 sets the combination having the highest score Sk to be a candidate pair.

In step S123, the face image processor 432 determines whether the score Sk of the candidate pair exceeds the threshold.

If it is determined in step S123 that the score Sk exceeds the threshold, the process proceeds to step S124 to determine whether the time interval of the candidate pair is smaller than or equal to a predetermined threshold. The time interval is the time interval of two GOPs between which the two images are generated. More specifically, if the target GOP number is i and if the GOP number having the face image included in the candidate pair is j (j is an integer smaller than or equal to i−1), i−j can be used as the time interval.

If the time interval of the candidate pair is found to be smaller than or equal to the threshold in step S124, the process proceeds to step S125.

In step S125, the face image processor 432 sets the candidate pair to be a matching pair.

Then, in step S126, the face image processor 432 determines that the character of the face image of the target GOP contained in the matching pair and the character of the other face image contained in the matching pair are the same person.

In step S127, the face image processor 432 indicates "face information" in the column of the target GOP of the character associated with the face image contained in the matching pair.

In step S128, the face image processor 432 excludes all combinations (including the matching pair) including at least one of the face images contained in the matching pair.

In step S129, the face image processor 432 determines whether there is any combination to be processed.

If it is determined in step S129 that there is a combination to be processed, the process returns to step S122. More specifically, in step S122, the combination having the highest score Sk is selected, and steps S123 through S130 are repeated.

If it is determined in step S123 that the score Sk is lower than or equal to the threshold, or if it is determined in step S124 that the time interval exceeds the threshold, the process proceeds to step S130.

In step S130, the face image processor 432 registers the face image contained in the candidate pair as the typical image of a new character. Then, the process proceeds to step S129.

If it is determined in step S129 that there is no combination to be processed after executing loop processing from step S122 to step S130, the process proceeds to step S131.

In step S131, the face image processor 432 indicates "no face information" in the remaining columns of the target GOP of the face image table.

Then, the face image table generating/updating processing is completed. That is, step S109 in FIG. 31 is finished, and the process proceeds to step S110.

The processing for generating and recording resource data for moving picture content by the image information detector 427 of the image processor 413 shown in FIG. 29, i.e., the resource data generating/recording processing shown in FIG. 31, has been discussed.

Figure 43:
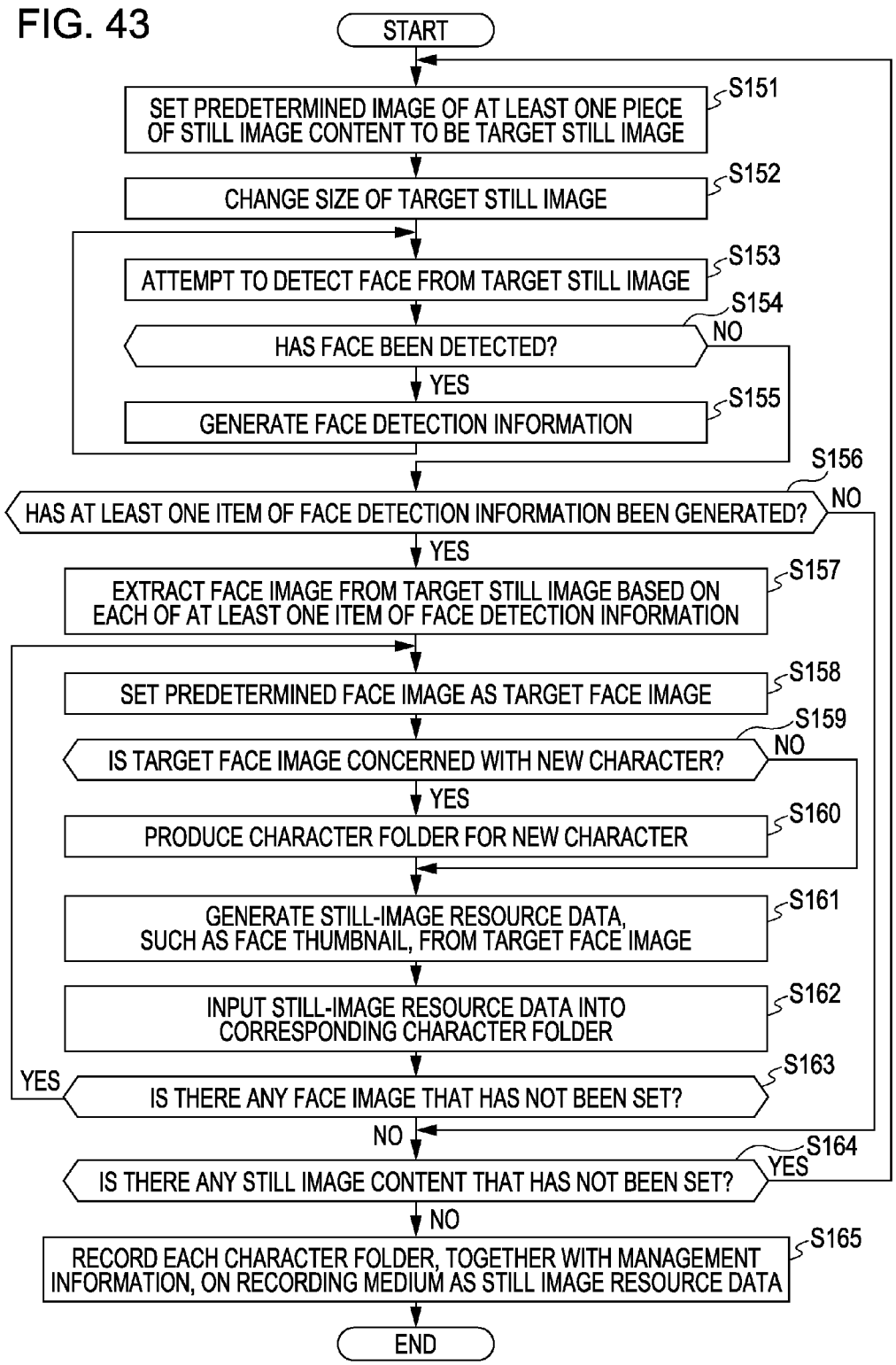
FIG. 43 is a flowchart illustrating details of face image table generating/updating processing of the resource data generating/recording processing shown in FIG. 31.

By performing still-image resource data generating/recording processing indicated by the flowchart in FIG. 43, the image information processor 427 can also record, for example, character folders 271 through 273 shown in FIG. 20, as resource data for still image content on the recording medium 51.

In step S151, the image information detector 427 sets a predetermined still image of at least one piece of still image content to be a target still image. At least one piece of still image content means all pieces of still image content recorded on the recording medium 51 in the example shown in FIG. 20.

After step S151, steps S152 through S157 are executed. Steps S152 through S157 are basically similar to step S103 through S108, respectively, in FIG. 31, and an explanation thereof is thus omitted here. However, in this processing, if it is determined in step S156 that no face detection information has been generated, the process proceeds to step S164.

After at least one face image is extracted from the target still image in step S157, the process proceeds to step S158.

In step S158, the image information detector 427 sets a predetermined face image to be a target face image.

Then, in step S159, the image information detector 427 determines whether the target face image is a face image of a new character.

If it is determined in step S159 that the target face image is a face image of a new character, the process proceeds to step S160. In step 3160, the image information detector 427 produces a character folder for the new character.

If it is determined in step S159 that the target face image is not a face image of a new character, i.e., that the target face image is a face image of an existing character, the image information detector 427 proceeds to step S161 by skipping step 3160.

In step S161, the image information detector 427 generates still-image resource data, such as a face thumbnail image, from the target face image. Then, in step S162, the image information detector 427 inputs the still-image resource data into the corresponding character folder.

In step S163, the image information detector 427 determines whether there is any face image that has not been set.

If it is determined in step S163 that there is a face image that has not been set among at least one face image extracted from the target still image in step S157, the process returns to step S158.

That is, for each of at least one face image extracted from the target still image in step S157, loop processing from step S158 to step S163 is repeated. Then, it is determined in step S163 that there is no face image that has not been set, and the process proceeds to step S164.

As stated above, if it is determined in step S156 that no face detection information has been generated, the process also proceeds to step S164.

In step S164, the image information detector 427 determines whether there is any piece of still image content that has not been set.

If there is a piece of still image content that has not been set, the process returns to step S151.

That is, for each of at least one piece of still image content, loop processing from step S151 to step S164 is repeated. Then, it is determined in step S164 that there is no piece of still image content, and the process proceeds to step S165.

In step S165, the image information detector 427 records each character folder, together with the management information, on the recording medium 51 as still image resource data.

Then, the still-image resource data generating processing is completed.

The above-described series of processing may be executed by hardware or software. If software is used for executing the series of processing, a corresponding software program is installed from a program recording medium into a computer built in dedicated hardware or a personal computer, such as a general-purpose computer, that can execute various functions by installing various programs thereinto.

FIG. 44 is a block diagram illustrating an example of the configuration of a personal computer that executes the above-described series of processing by means of a program. That is, the playback apparatus shown in FIG. 6, the recording/playback apparatus shown in FIG. 17, or the image recording apparatus 401 shown in FIG. 28 may be partially or entirely formed by the personal computer shown in FIG. 44.

In FIG. 44, a CPU 701 executes various types of processing in accordance with a program stored in a ROM 702 or a storage unit 708. In a RAM 703, programs and data executed by the CPU 701 are stored. The CPU 701, the ROM 702, and the RAM 703 are connected to each other with a bus 704 therebetween.

An input/output interface 705 is connected to the CPU 701 with the bus 704 therebetween. The input/output interface 705 is also connected to an input unit 706 including a keyboard, a mouse, a microphone, etc., and an output unit 707 including a display, a speaker, etc. The CPU 701 executes various types of processing in response to an instruction input from the input unit 706. The CPU 701 then outputs a processing result to the output unit 707.

The storage unit 708 connected to the input/output interface 705 is formed of, for example, a hard disk, and stores programs and various data to be executed by the CPU 701. A communication unit 709 communicates with external devices via a network, such as the Internet or a local area network (LAN).

A program may be obtained via the communication unit 709 and be stored in the storage unit 708.

A drive 710 connected to the input/output interface 705 drives a removable medium 711, such as a magnetic disk, an optical disc, a magneto-optical disk, or a semiconductor memory, loaded in the drive 710, and obtains a program or data stored in the removable medium 711. The obtained program or data is transferred to and stored in the storage unit 708 if necessary.

A program recording medium storing a program that is installed into a computer and is executable by the computer includes, as shown in FIG. 44, the removable medium 711, which is a package medium, formed of a magnetic disk (including a flexible disk), an optical disc (including a compact disc read only memory (CD-ROM) and a digital versatile disc (DVD)), a magneto-optical disk, or a semiconductor memory, or the ROM 702 in which the program is permanently or temporarily stored, or a hard disk forming the storage unit 708. The program may be stored in the program recording medium via the communication unit 709, which serves as an interface, such as a router or a modem, or a wired or wireless communication medium, such as a LAN, the Internet, or digital satellite broadcasting.

In this specification, steps forming the program stored in the program recording medium include processing executed in time-series manner in accordance with the order indicated in the specification. However, they are not restricted to processing executed in time-series manner, and may include processing executed in parallel or individually.

In this specification, the system is an entire apparatus or circuit including a plurality of apparatuses or circuits.

It should be understood by those skilled in the art that various modifications, combinations, sub-combinations and alterations may occur depending on design requirements and other factors insofar as they are within the scope of the appended claims or the equivalents thereof.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a face processor for determining whether a face is contained in a frame of a plurality of zones of moving image content; and
an information generator for specifying, on the basis of a determination result determined by the face processor, at least one zone in which the face appears as a face zone,
wherein, when a first continuous zone including at least one first group of pictures (GOP) determined not to contain the face by the face processor is present between a second continuous zone including at least one second GOP and a third continuous zone including at least one third GOP determined to contain the face by the face processor, and when a time period length of the first continuous zone is determined to be less than a time period length threshold, the information generator specifies the first continuous zone, the second continuous zone, and the third continuous zone as one face zone.

2. The information processing apparatus according to claim 1, wherein the information generator generates a face thumbnail image, which serves as an index of the face zone, on the basis of the face contained in a predetermined one frame of the at least one zone included in the face zone.

3. The information processing apparatus according to claim 1, wherein, when at least one zone which is determined to contain the face by the face processor is continuous, the information generator specifies the at least one continuous zone as the face zone.

4. The information processing apparatus according to claim 1, wherein the face processor attempts to detect a face of a specific character from a target zone, and when a face is detected, the face processor generates a face image by extracting an area containing the detected face from the target zone, sets the face image generated from the target zone to be a first comparison subject, sets the latest face image selected from among face images of the specific character generated from zones before the target zone to be a second comparison subject, compares the first comparison subject with the second comparison subject, and determines on the basis of comparison results whether the specific character is contained in the target zone.

5. The information processing apparatus according to claim 4, wherein the face processor includes a table representing information concerning the specific character and lists information concerning whether the specific character is contained in the target zone in the table, and the information generator specifies the face zone on the basis of the information of the table listed by the face processor.

6. The information processing apparatus according to claim 5, wherein information concerning each of at least one specific character is listed in the table, and when at least one face image is generated as a result of detecting at least one face from the target zone, the face processor sets each of the at least one face image generated from the target zone to be the first comparison subject, sets each of the at least one face image of the at least one specific character contained in the table to be the second comparison subject, performs matching processing on all combinations of the at least one face image in the first comparison subject and the at least one face image in the second comparison subject to calculate scores as a result of the matching processing, selects at least one matching pair which is determined to be a combination of face images of an identical person from all the combinations, determines that, among the at least one specific character contained in the table, a specific character of each of the at least one matching pair corresponding to the second comparison subject is contained in the target zone, determines that other characters are not contained in the target zone, and lists determination results in the table.

7. The information processing apparatus according to claim 6, wherein, concerning a combination which is not selected as a matching pair, the face processor adds a character corresponding to a face image contained in the first comparison subject to the table as a previously presented character.

8. The information processing apparatus according to claim 6, wherein the face processor excludes, among all the combinations, a combination whose score is smaller than a predetermined threshold from selection candidates of the matching pair.

9. The information processing apparatus according to claim 6, wherein, when a zone in which the first comparison subject is generated and a zone in which the second comparison subject is generated are separated from each other by a predetermined time interval or greater, the face processor excludes a combination including the first comparison subject and the second comparison subject from selection candidates of the matching pair.

10. An information processing method comprising:
    determining whether a face is contained in a frame of a plurality of zones of moving image content; and
    specifying, on the basis of a determination result from the determining, at least one zone in which the face appears as a face zone,
    wherein, when a first continuous zone including at least one first group of pictures (GOP) determined not to contain the face is present between a second continuous zone including at least one second GOP and a third continuous zone including at least one third GOP determined to contain the face, and when a time period length of the first continuous zone is determined to be less than a time period length threshold, specifying the first continuous zone, the second continuous zone, and the third continuous zone as one face zone.

11. A non-transitory computer-readable medium on which is stored a program, the program comprising:
    determining whether a face is contained in a frame of a plurality of zones of moving image content; and
    specifying, on the basis of a determination result from the determining, at least one zone in which the face appears as a face zone,
    wherein, when a first continuous zone including at least one first group of pictures (GOP) determined not to contain the face is present between a second continuous zone including at least one second GOP and a third continuous zone including at least one third GOP determined to contain the face, and when a time period length of the first continuous zone is determined to be less than a time period length threshold, specifying the first continuous zone, the second continuous zone, and the third continuous zone as one face zone.

* * * * *